United States Patent
Haase et al.

(10) Patent No.: US 11,906,786 B2
(45) Date of Patent: Feb. 20, 2024

(54) LIGHT COUPLING ELEMENT AND ASSEMBLY

(71) Applicant: 3M INNOVATIVE PROPERTIES COMPANY, St. Paul, MN (US)

(72) Inventors: Michael A. Haase, St. Paul, MN (US); Bing Hao, Woodbury, MN (US); Changbao Ma, Austin, TX (US); Terry L. Smith, Roseville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/102,855

(22) Filed: Jan. 30, 2023

(65) Prior Publication Data

US 2023/0176291 A1    Jun. 8, 2023

Related U.S. Application Data

(63) Continuation of application No. 17/851,478, filed on Jun. 28, 2022, now Pat. No. 11,592,622, which is a
(Continued)

(51) Int. Cl.
*G02B 6/36* (2006.01)
*G02B 6/38* (2006.01)

(52) U.S. Cl.
CPC ......... *G02B 6/3636* (2013.01); *G02B 6/3885* (2013.01)

(58) Field of Classification Search
None
See application file for complete search history.

(56) References Cited

U.S. PATENT DOCUMENTS

| 4,079,927 A | 3/1978 | Rocton |
| 5,706,371 A | 1/1998 | Pan |

(Continued)

FOREIGN PATENT DOCUMENTS

| JP | 2007-316475 | 12/2007 |
| JP | 2013-057721 | 3/2013 |

(Continued)

OTHER PUBLICATIONS

International Search report for PCT International Application PCT/IB2019/055345 dated Nov. 5, 2019, 7 pages.
(Continued)

*Primary Examiner* — Jerry Rahll
(74) *Attorney, Agent, or Firm* — Jonathan L. Tolstedt

(57) ABSTRACT

A light coupling element including a groove and a light redirecting member is described. The groove is for receiving and aligning an optical waveguide and incudes an open front end and a back end. The light redirecting member includes an input side for receiving light from an optical waveguide received and supported in the groove and a light redirecting side for changing a direction of light received from the input side. The groove may include a bottom surface extending between the front and back ends of the groove and including a raised bottom surface portion raised upwardly relative to an unraised bottom surface portion. The unraised bottom surface portion of the bottom surface may be disposed between the raised bottom surface portion of the bottom surface and the input side of the light redirecting member. Optical coupling assemblies including the light coupling element and an optical waveguide are described.

3 Claims, 39 Drawing Sheets

Related U.S. Application Data continuation of application No. 17/250,101, filed as application No. PCT/IB2019/055345 on Jun. 25, 2019, now Pat. No. 11,402,586.

(60) Provisional application No. 62/691,477, filed on Jun. 28, 2018.

(56) References Cited

U.S. PATENT DOCUMENTS

| | | | |
|---|---|---|---|
| 6,295,404 | B1 | 9/2001 | Ichigi et al. |
| 6,668,119 | B2 | 12/2003 | Matsumoto et al. |
| 7,473,038 | B2 | 1/2009 | Fujiwara |
| 7,534,052 | B2 | 5/2009 | Fujiwara |
| 7,726,885 | B2 | 6/2010 | Nishimura |
| 8,165,432 | B2 | 4/2012 | Ohta |
| 8,277,130 | B2 * | 10/2012 | Nishimura ........... G02B 6/4249 385/83 |
| 9,482,827 | B2 | 11/2016 | Haase |
| 9,645,329 | B2 | 5/2017 | De Jong et al. |
| 9,651,743 | B2 | 5/2017 | Costello, III et al. |
| 10,754,105 | B2 | 8/2020 | Mathews |
| 2002/0003933 | A1 | 1/2002 | Sherrer |
| 2003/0019838 | A1 | 1/2003 | Shaw |
| 2003/0235369 | A1 | 12/2003 | Grosjean et al. |
| 2009/0080831 | A1 | 3/2009 | Nakamura |
| 2011/0317959 | A1 | 12/2011 | Ohta |
| 2014/0178010 | A1 | 6/2014 | De Jong et al. |
| 2014/0363122 | A1 | 12/2014 | Bowen |
| 2015/0219863 | A1 | 8/2015 | Haase et al. |
| 2015/0301295 | A1 | 10/2015 | Smith et al. |

FOREIGN PATENT DOCUMENTS

| | | |
|---|---|---|
| JP | 2016-156868 | 9/2016 |
| WO | WO 2014-055226 | 4/2014 |
| WO | WO 2014-055361 | 4/2014 |
| WO | WO 2015-038941 | 3/2015 |
| WO | WO 2017-066018 | 4/2017 |
| WO | WO 2017-066022 | 4/2017 |
| WO | WO 2017-066135 | 4/2017 |
| WO | WO 2020-003124 | 1/2020 |

OTHER PUBLICATIONS

Search Report for CN Appl. No. 201980042069.1, dated Oct. 20, 2021, 2 pp.

* cited by examiner

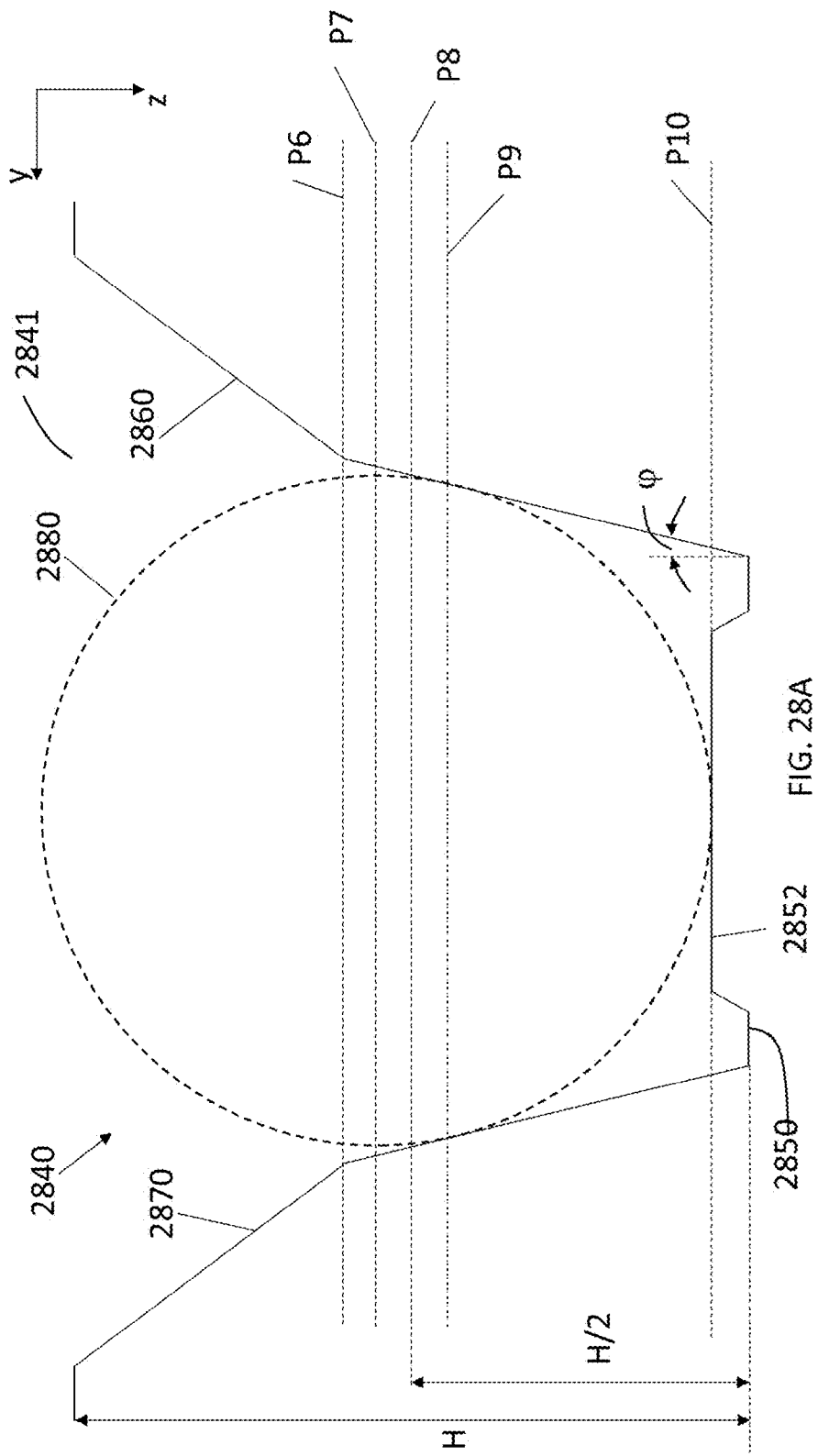

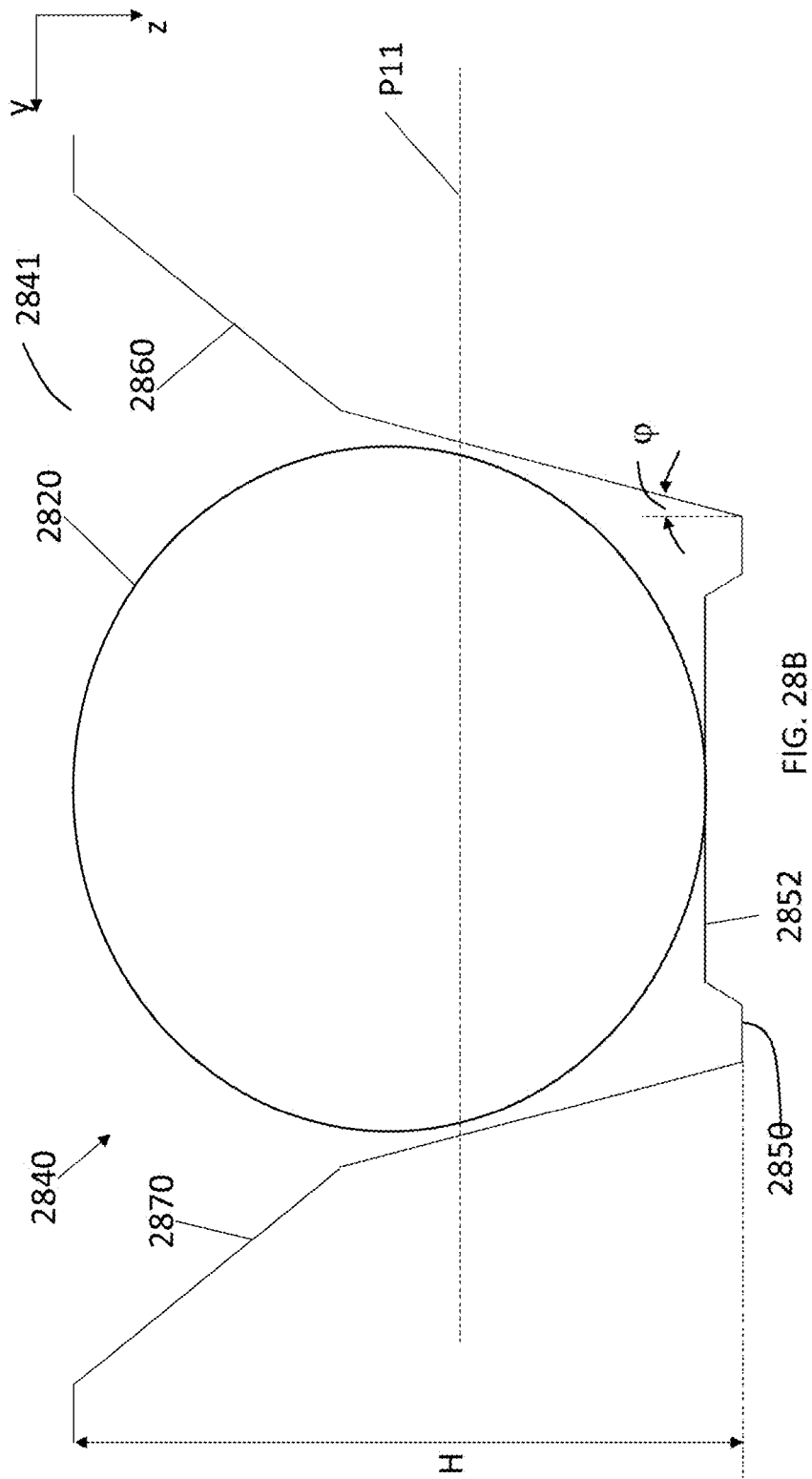

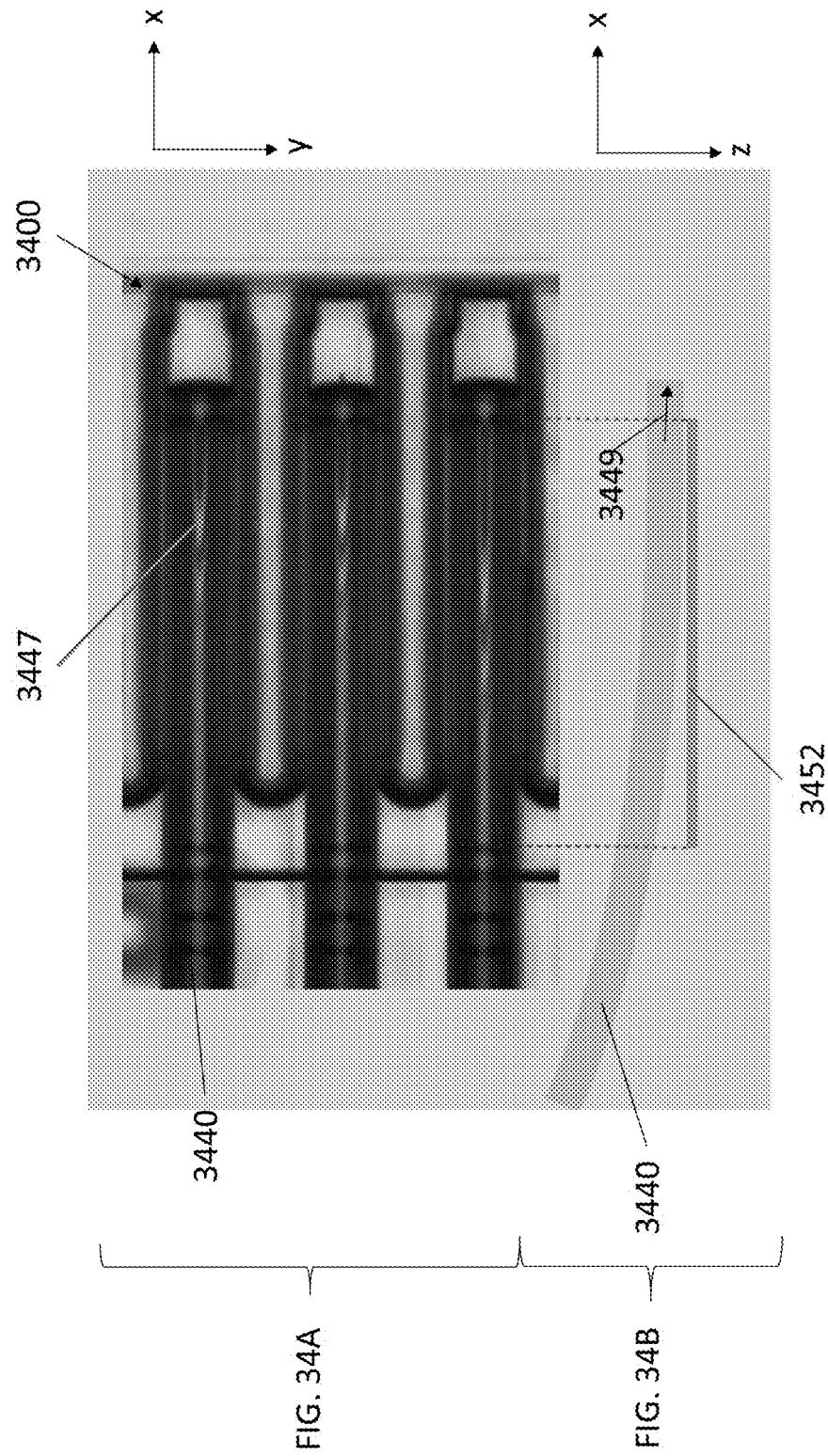

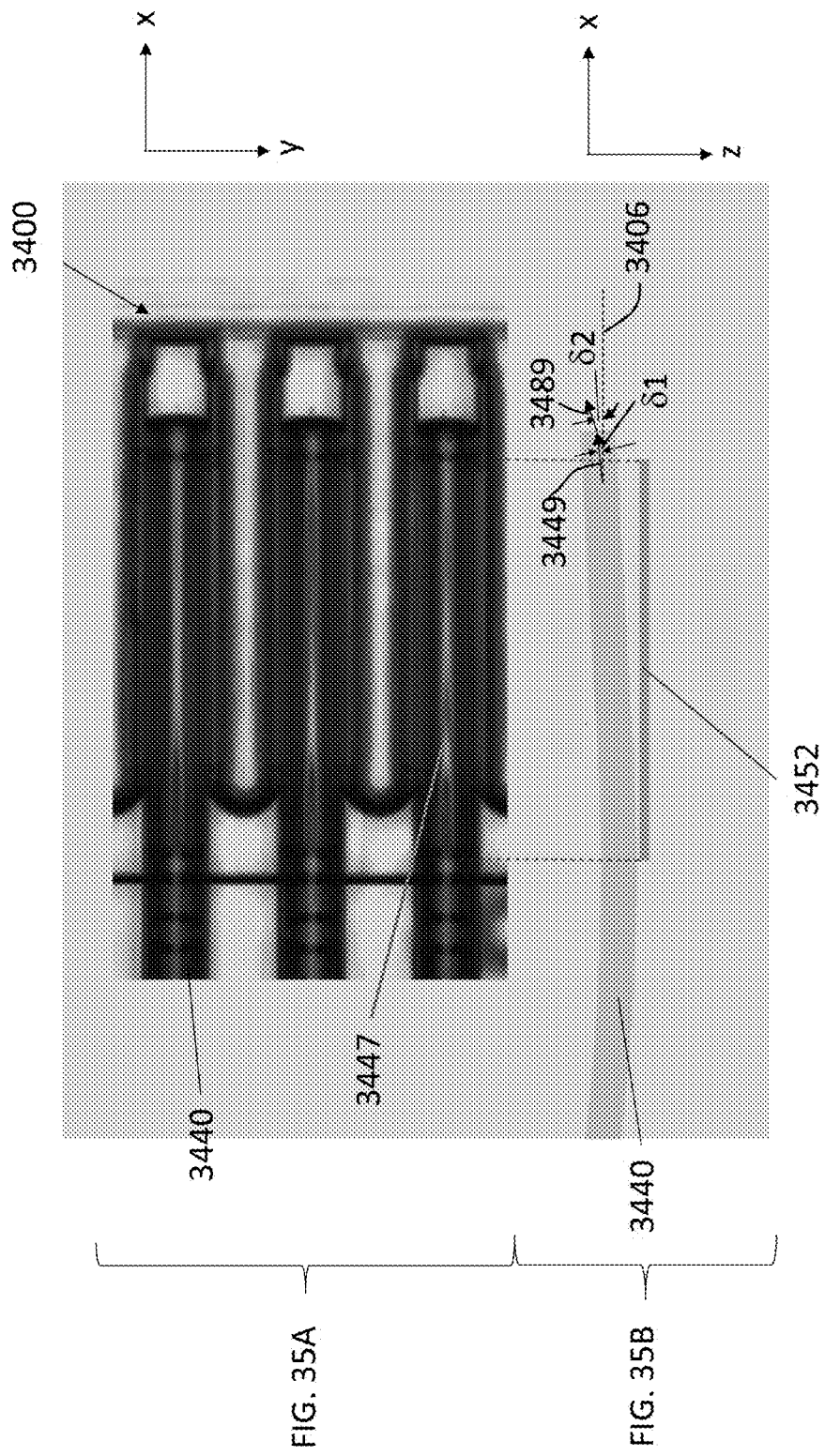

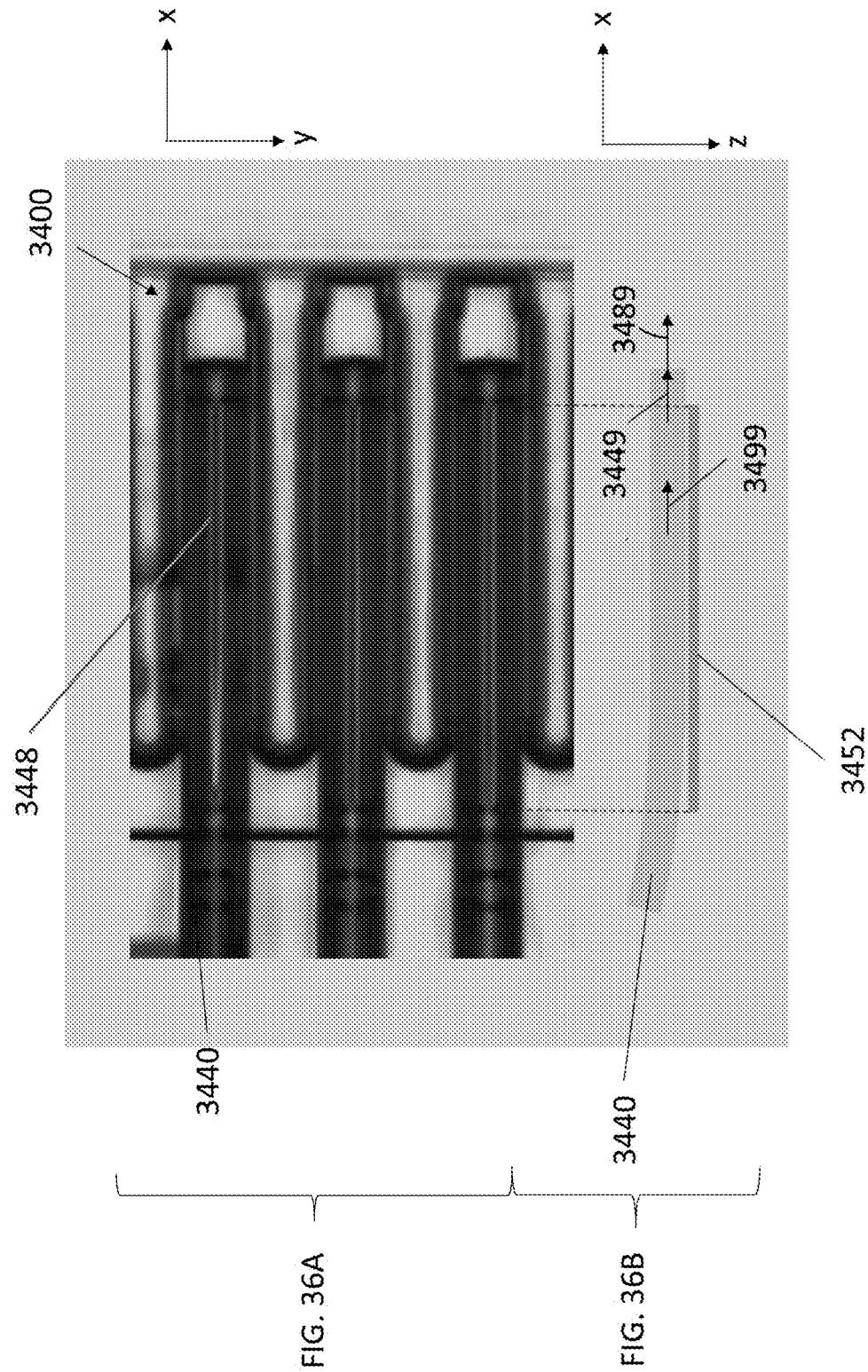

LIGHT COUPLING ELEMENT AND ASSEMBLY

CROSS REFERENCE TO RELATED APPLICATION

This application is a continuation filing of U.S. application Ser. No. 17/851,478, filed Jun. 28, 2022, now allowed, which is a continuation of U.S. application Ser. No. 17/250,101, filed Nov. 25, 2020, issued as U.S. Pat. No. 11,402,586, which is a national stage filing under 35 C.F.R. 371 of PCT/IB2019/055345, filed Jun. 25, 2019, which claims the benefit of U.S. Provisional Application No. 62/691,477, filed Jun. 28, 2018, the disclosures of which are incorporated by reference in their entireties herein.

BACKGROUND

Optical connectors can be used for optical communications in a variety of applications including telecommunications networks, local area networks, data center links, and internal links in computer devices.

SUMMARY

In some aspects of the present description, a light coupling element including one or more grooves for receiving one or more optical fibers is provided. At least one groove includes one of more features which facilitate the positioning of an optical fiber in the groove. In some aspects of the present description, an optical coupling assembly including the light coupling element and an optical waveguide received and supported in the groove is provided.

In some aspects of the present description, a light coupling element including a groove for receiving and aligning an optical waveguide and comprising an open front end and a back end, and a light redirecting member is provided. The light redirecting member includes an input side for receiving light from an optical waveguide received and supported in the groove; and a light redirecting side for changing a direction of light received from the input side. The groove includes a bottom surface extending between the front and back ends of the groove and comprising a raised bottom surface portion raised upwardly relative to an unraised bottom surface portion, where the unraised bottom surface portion of the bottom surface is disposed between the raised bottom surface portion of the bottom surface and the input side of the light redirecting member.

In some aspects of the present description, an optical coupling assembly including a light coupling element and an optical waveguide is provided. The light coupling element includes a groove for receiving and aligning an optical waveguide and including an open front end, a back end, and a bottom surface extending between the front and back ends of the groove; and a light redirecting member. The light redirecting member includes an input side for receiving light from an optical waveguide received and supported in the groove; and a light redirecting side for changing a direction of light received from the input side. The optical waveguide is received in and supported by the groove and has an end face at or near the input side of the light redirecting member. The optical waveguide includes adjacent first and second segments, where the second segment is disposed between the first segment and the input side of the light redirecting member and includes the end face of the optical waveguide, such that a bottom-most portion of the optical waveguide along the first segment of the optical waveguide rests on and makes physical contact with the bottom surface of the groove, and a bottom-most portion of the optical waveguide along the second segment of the optical waveguide is spaced part from the bottom surface defining a gap therebetween.

In some aspects of the present description, a light coupling element including an attachment area for receiving and permanently attaching to an optical fiber, and a light redirecting member extending from the attachment area is provided. The light redirecting member includes an input side for receiving light from an optical fiber disposed at the attachment area; a light redirecting side for receiving light from the input side and changing a direction of the light received from the input side; and a groove formed in the attachment area for receiving an optical fiber and extending in a first direction from an entrance end to an opposite terminal end proximate the input side of the light redirecting member. The groove includes a bottom surface and opposing sidewalls extending upwardly from opposite lateral sides of the bottom surface and defining a width of the groove and an open top; a stop region proximate the input side of the light redirecting member; a centering region adjacent the stop region opposite the input side of the light redirecting member; and a support region between the entrance end and the centering region. The width of the groove in at least a portion of the centering region and in at least a portion of the stop region are less than the width of the groove in at least a portion of the support region. The width of the groove in the centering region decreases in the first direction at a first rate and the width of the groove in at least a portion of the stop region decreases in the first direction at a second rate greater than the first rate.

In some aspects of the present description, a light coupling element including a plurality of substantially parallel grooves extending along a first direction and arranged along an orthogonal second direction for receiving and aligning a plurality of optical waveguides, and a light redirecting member is provided. The light redirecting member includes an input side for receiving light from an optical waveguide received and supported in a groove in the plurality of the grooves. and a light redirecting side for changing a direction of light received from the input side. For at least one groove in the plurality of the grooves, the groove includes a bottom surface and opposing sidewalls extending upwardly from opposite lateral sides of the bottom surface and defining a width of the groove and an open top and an entrance end opposite a terminal end proximate the input side of the light redirecting member; and first and second pinched regions spaced apart from each other along the first direction and defining a third region therebetween, such that a minimum width of the groove in each of the first and second pinched regions is less than a minimum width of the groove in the third region.

In some aspects of the present description, a light coupling element including a plurality of substantially parallel grooves extending along a first direction and arranged along an orthogonal second direction for receiving and aligning a plurality of optical waveguides, and a light redirecting member is provided. Each groove includes an open front end, a back end, a width along the second direction and a depth along a third direction orthogonal to the first and second directions. The light redirecting member includes an input side for receiving light from an optical waveguide received and supported in a groove in the plurality of the grooves, and a light redirecting side for changing a direction of light received from the input side. For at least one groove in the plurality of the grooves, the groove includes a first pinched region disposed between, and spaced apart from, the front and back ends of the groove; a stop region disposed between, and spaced apart from, the first pinched region and the back end of the groove; and a support region disposed between the front end and first pinched region of the groove. A rate of change of the width of the groove along the first direction is greater in the stop region than in the first pinched region, and a minimum width of the groove in the first pinched region is less than a minimum width of the groove in the support region.

In some aspects of the present description, a method of mounting an optical fiber to a light coupling element including a light redirecting member and a groove extending along a first direction from an entrance end of the groove to an opposite terminal end of the groove proximate an input side of the light redirecting member is provided. The groove has a width along a second direction orthogonal to the first direction and a depth along a third direction orthogonal to the first and second directions. The groove includes a bottom surface extending between the entrance and terminal ends of the groove and comprising a raised bottom surface portion raised upwardly relative to a landing portion, where the landing portion of the bottom surface is disposed between the raised bottom surface portion of the bottom surface and the input side of the light redirecting member. A landing region of the groove includes the landing portion of the bottom surface and is disposed between the raised bottom surface portion and the terminal end of the groove. The method includes inserting the optical fiber into the groove such that a portion of the landing region of the groove is skived.

BRIEF DESCRIPTION OF THE DRAWINGS

FIG. 28A is a schematic cross-sectional view of a groove;

FIG. 28B is a schematic cross-sectional view of a groove with a fiber seated in the groove;

FIG. 34A is a top view of an image of a plurality of optical fibers received in a plurality of grooves of a light coupling element where back portions of the optical fibers are separated from a raised bottom surface portion of the corresponding groove;

FIG. 34B is a schematic cross-sectional view illustrating the position of an optical fiber of FIG. 34A relative to the raised bottom surface portion;

FIG. 35A is a top view of an image of a plurality of optical fibers received in a plurality of grooves of a light coupling element where front portions of the optical fibers are separated from a raised bottom surface portion of the corresponding groove;

FIG. 35B is a schematic cross-sectional view illustrating the position of an optical fiber of FIG. 35A relative to the raised bottom surface portion;

FIG. 36A is a top view of an image of a plurality of optical fibers received in a plurality of grooves of a light coupling element where the optical fibers are aligned with a raised bottom surface portion of the corresponding groove; and FIG. 36B is a schematic cross-sectional view illustrating the position of an optical fiber of FIG. 36A relative to the raised bottom surface portion.

DETAILED DESCRIPTION

Figure 1:
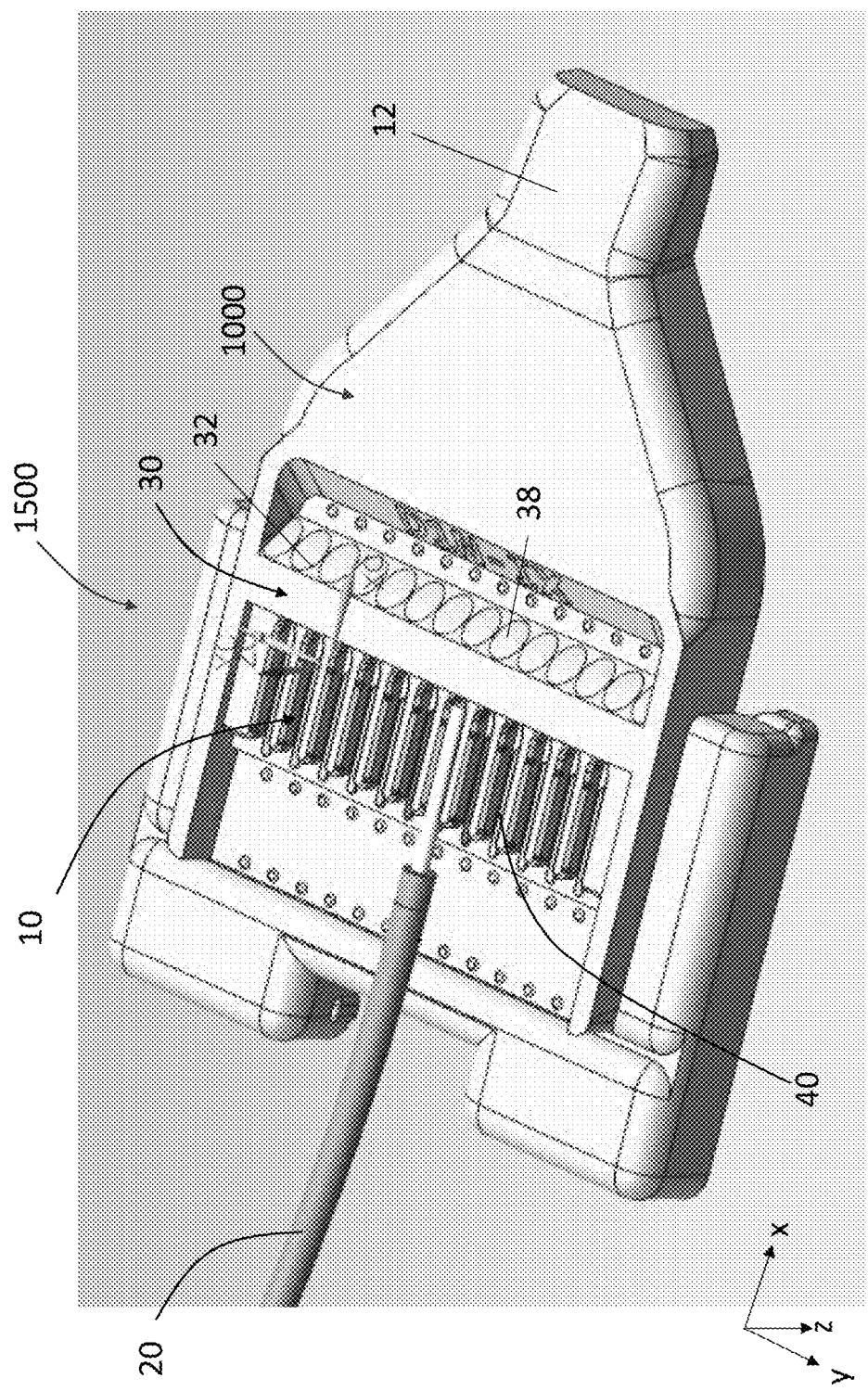
FIG. 1 is a top perspective view of an optical coupling assembly including a light coupling element and an optical waveguide.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments of light coupling elements described herein, one or more grooves for receiving one or more optical fibers (optical waveguides) is provided where at least one groove includes one of more features which facilitate the positioning of an optical fiber in the groove. For example, the groove may include adjacent centering and stop regions where the centering region includes centering chamfers which aid in positioning the optical fiber substantially along a center line of the groove and where the stop region has a relatively rapidly narrowing width which stops the optical fiber as it is pushed forward into the groove. As another example, the groove may include at least one pinched region. The pinched region may have less draft than a support region of the groove which may result in only a small clearance (e.g., no more than 1 micrometer or no more than 0.5 micrometer on each side of the optical fiber) in the pinched region. It has been found that using two pinched regions, one proximate each end of the groove, for example, allows an improved control over a lateral angle of the optical fiber relative to the desired direction of the optical fiber. As yet another example, the groove may include a bottom surface having a raised portion and an unraised portion. The raised portion may be raised by 1 to 20 micrometers, for example, relative to the unraised portion and may provide clearance for mushrooming of a laser cleaved fiber end face and/or for any skiving caused by inserting and lowering the optical fiber into the groove. The grooves described herein may include any combination of the centering region, the stop region, the pinched portion(s), and the raised and unraised bottom surface portions.

In some embodiments, the groove is formed wider at the top, providing a substantially Y-shaped cross-section (i.e., Y-groove) that facilitates capturing an optical waveguide into the groove. Light coupling units utilizing Y-grooves are described in PCT publication Nos. WO 2017/066022 (Haase et al.) and 2017/066018 (Haase et al.). In some embodiments, the groove has a substantially vertical (e.g., draft angle no more than 10 degrees, or no more than 8 degrees, or no more than 6 degrees) lower portion and an upper portion with a larger tilt. The sidewalls of the groove define a width of the groove as a lateral distance across the groove in the lower portion of the groove. The wider upper portion can facilitate capturing an optical fiber into the groove. The lower portion of the groove can be made slightly wider than the diameter of the optical fiber to provide clearance for initial capture of the optical fiber and to allow the optical fiber to slide axially into centering and/or stop regions of the groove. Alternatively, the lower portion of the groove can be made slightly narrower than the diameter of the optical fiber to provide an interference fit. In some embodiments, grooves other the Y-grooves (e.g., V-grooves or U-grooves) are used.

In some embodiments described herein, methods of mounting an optical fiber to a light coupling element are provided. In some embodiments, the method includes adjusting the position of the optical fibers to reduce or minimize interference fringes observed when the optical fiber is positioned in the groove Minimizing interference fringes has been found to provide improved alignment of the optical fiber with a bottom of the groove. In some embodiments, an optical coupling assembly is formed by mounting an optical fiber to a light coupling element. In some embodiments, the optical fiber is aligned with the groove such that a central ray propagating along the optical fiber makes an angle of less than 1 degree, or less than 0.5 degrees, or less than 0.2 degrees to a bottom of the groove in at least a portion of the optical waveguide proximate an end face of the optical waveguide.

FIGS. 1-18 provide various views of a light coupling element 1000 or portions of the light coupling element 1000. FIG. 1 is a top perspective view of a light coupling element 1000 including an attachment area 10 for receiving, and in some embodiments permanently attaching to, an optical waveguide 20 and a light redirecting member 30. The light redirecting member 30 extends from the attachment area 10 and includes an input side 31 (see, e.g., FIG. 4) for receiving light from an optical waveguide (optical fiber) 20 disposed at the attachment area 10, and a light redirecting side 32 for changing a direction of light received from the input side 31. In some embodiments, the light coupling element 1000 includes a plurality of substantially parallel grooves 40 extending along a first direction (x-direction) and arranged along an orthogonal second direction (y-direction) for receiving and aligning a plurality of optical waveguides 20.

Also illustrated in FIG. 1 is an optical coupling assembly 1500 including the light coupling element 1000 and an optical waveguide 20. In some embodiments the optical coupling assembly 1500 includes a plurality of optical waveguides where each optical waveguide in the plurality of optical waveguides is received in and supported by a corresponding groove in the plurality of grooves 40. Substantially parallel grooves may be parallel to within 5 degrees, for example.

In some embodiments, the light coupling element 1000 and the optical coupling assembly 1500 are adapted to mate with a corresponding light coupling element and optical coupling assembly. For example, the optical coupling assembly 1500 may be used to connect ribbon cables together. Related optical connectors are described in U.S. Pat. No. 9,482,827 (Haase et al.), for example. The light coupling element 1000 may include various features, such as mating tongue 12, to facilitate the mating of the light coupling element 1000 to another light coupling element 1000.

In some embodiments, the light coupling element 1000 is a unitary construction. A unitary construction is a single piece construction that can be made by molding (e.g., injection molding a thermoplastic) or machining, for example.

Figure 2:
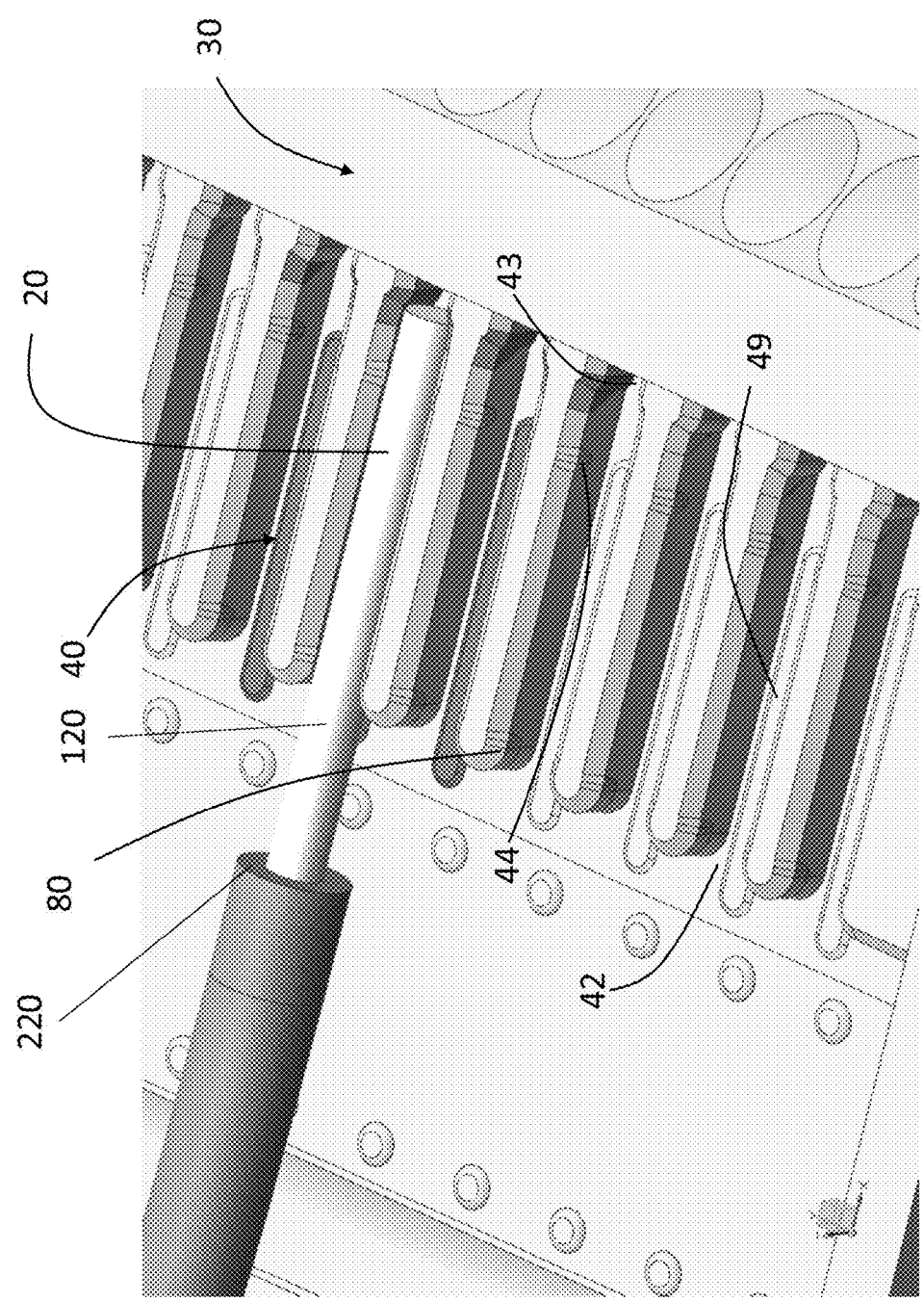
FIGS. 2-3 are top perspective views of portions of an optical coupling assembly.

FIG. 2 is a top perspective view of a portion of the light coupling element 1000 illustrating grooves 40 having a front end or entrance end 42 and an opposite back end or terminal end 43. The groove 40 includes a first pinched region 44 disposed between, and spaced apart from, the entrance end 42 and the terminal end 43 of groove 40, and a support region 49 disposed between the entrance end 42 and first pinched region 44 of the groove. The groove 40 also includes a second pinched region 80 at or near the front end 42 of the groove 40. In some embodiments, the optical waveguide 20 includes a polymer buffer 220 surrounding a glass fiber having a glass cladding 120 around a single-mode glass core (not shown). The buffer 220 is removed from the portion of the optical waveguide 20 disposed in the groove 40.

Figure 3:
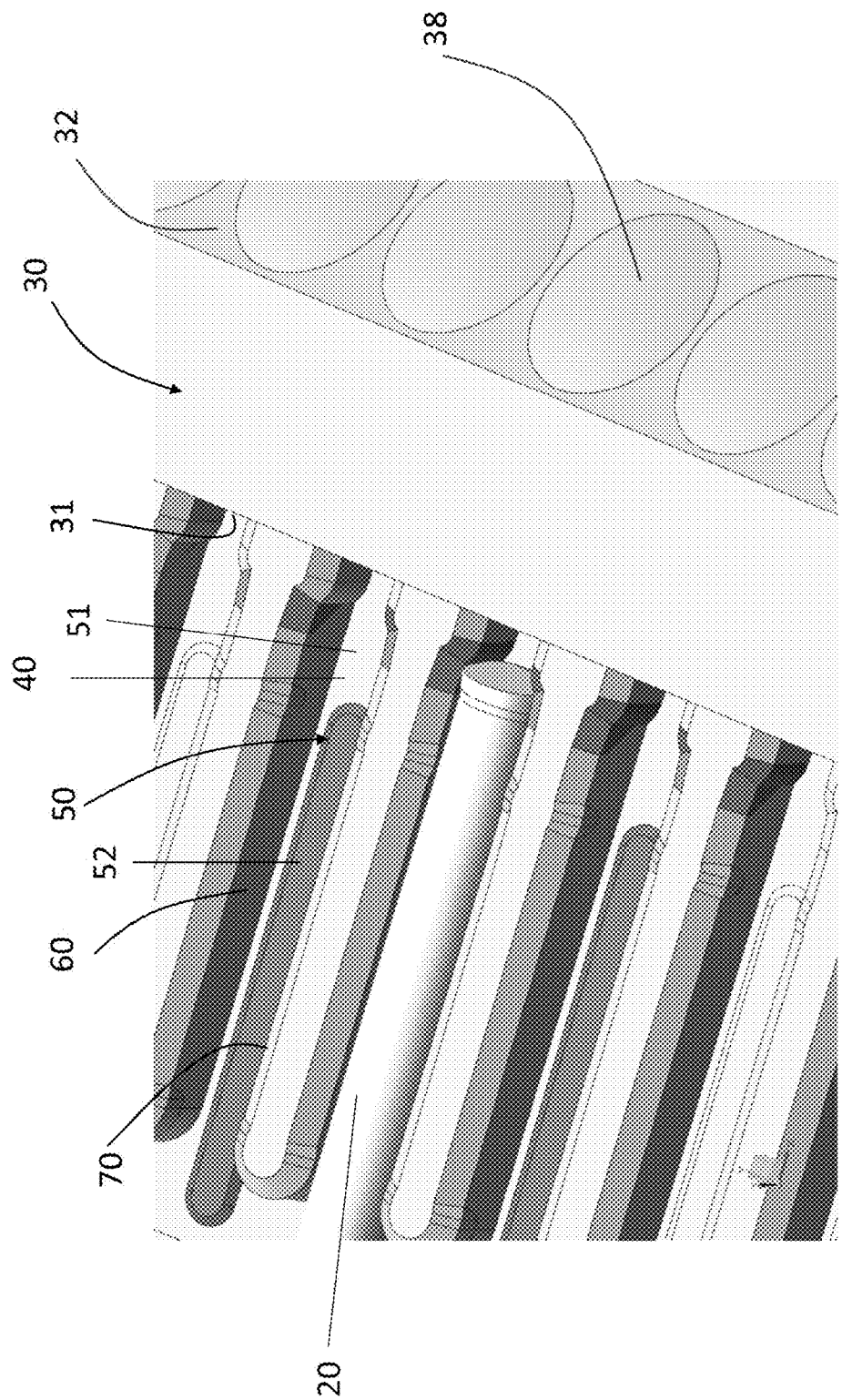

FIG. 3 is a top perspective view of a portion of the light coupling element 1000 illustrating a groove 40 for receiving and aligning an optical waveguide 20 and including an open front end 42 (see FIG. 2) and a back end 31. In some embodiments, the back end 31 of the groove 40 is an input side 31 of the light redirecting member 30 for receiving light from an optical waveguide 20 received and supported in the groove 40. The light redirecting member 30 also includes a light redirecting side 32 for changing a direction of light received from the input side 31. The groove 40 includes a bottom surface 50 extending between the front and back ends 42 and 31 of the groove 40 and includes a raised bottom surface portion 52 raised upwardly relative to an unraised bottom surface portion 51. The unraised bottom surface portion 51 of the bottom surface 50 is disposed between the raised bottom surface portion 52 of the bottom surface 50 and the input side 31 of the light redirecting member 30. The groove 40 also includes opposing first and second sidewalls 60 and 70 extending upwardly from opposite lateral sides of the bottom surface 50.

In some embodiments, the light redirecting member 30 includes one or more light redirecting elements 38. In some embodiments, the light redirecting side 32 of the light redirecting member 30 includes an array of light redirecting elements 38, one for each groove. The light redirecting elements 38 may be one or more of a prism, a lens, and a reflecting surface. For example, in some embodiments, the light redirecting member 30 includes one or more lenses 38.

Figure 4:
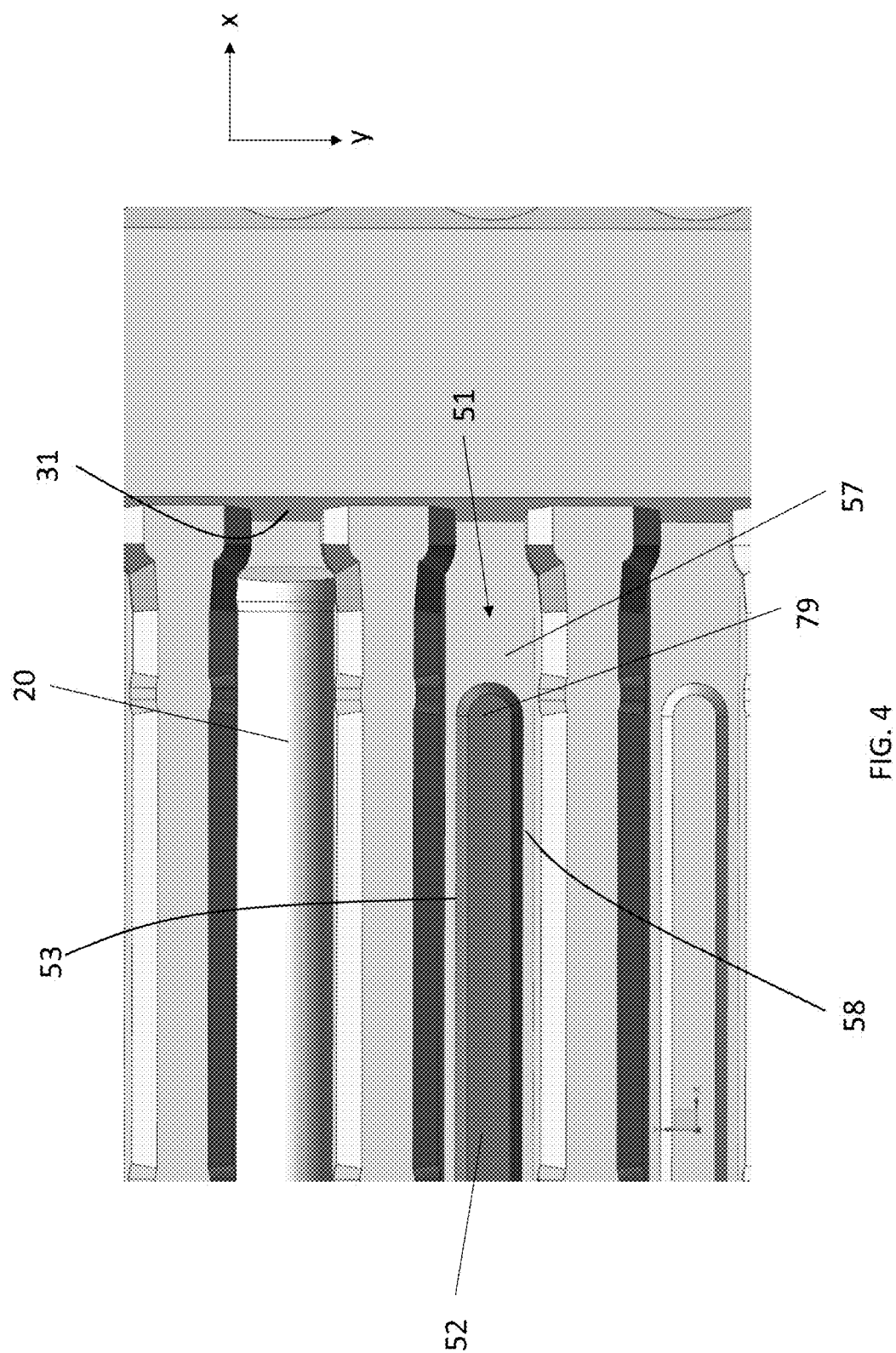
FIG. 4 is a top view of a portion of an optical coupling assembly.

FIG. 4 is a top view of a portion of the light coupling element 1000. In the illustrated embodiment, the raised portion 52 of the bottom surface 50 has a perimeter 53. In some embodiments, the unraised bottom surface portion 51 encompasses at least 70%, or at least 90%, or all or substantially all of the perimeter 53 of the raised bottom surface portion 52. In some embodiments, an upper surface of the raised bottom surface portion 52 is substantially planar. In some embodiments, the unraised bottom surface portion 51 is substantially planar and continuous and includes a first unraised portion 57 disposed between the raised bottom surface portion 52 and the back end 31 of the groove 40 and a second unraised portion 58 disposed on at least one lateral side of the raised bottom surface portion 52. The raised bottom surface portion 52 has an end 79 adjacent the first portion 57 of the unraised bottom surface portion 51 which is disposed between the raised bottom surface portion 52 of the bottom surface 50 and the input side 31 of the light redirecting member 30. In the illustrated embodiment, the second unraised portion 58 is disposed on each lateral side of the raised bottom surface portion 52. In other embodiments, the second unraised portion 58 is omitted. Embodiments having alternative bottom surface geometries are described further elsewhere herein.

Figure 5:
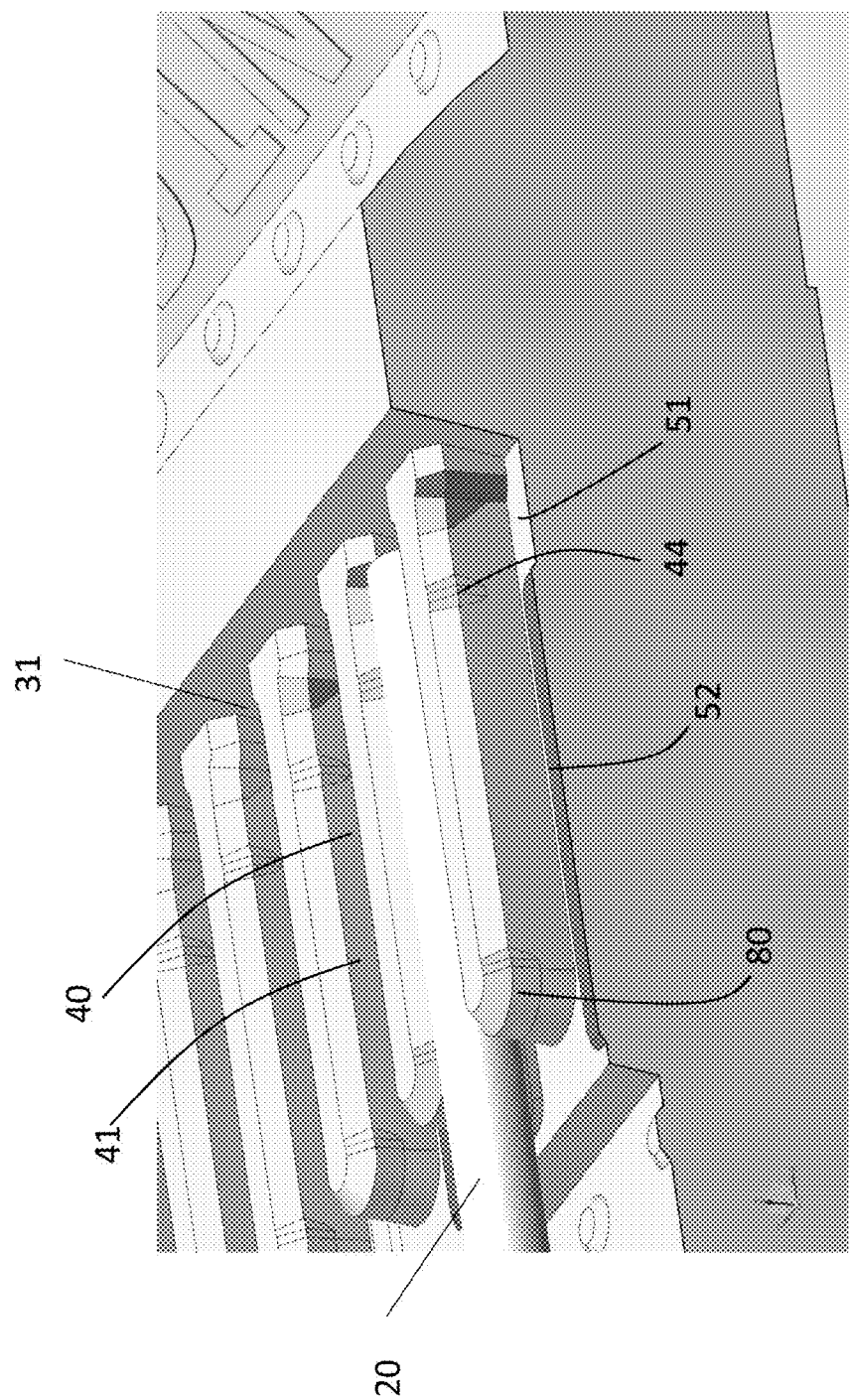
FIG. 5 is perspective cutaway view of a portion of an optical coupling assembly.
Figure 6:
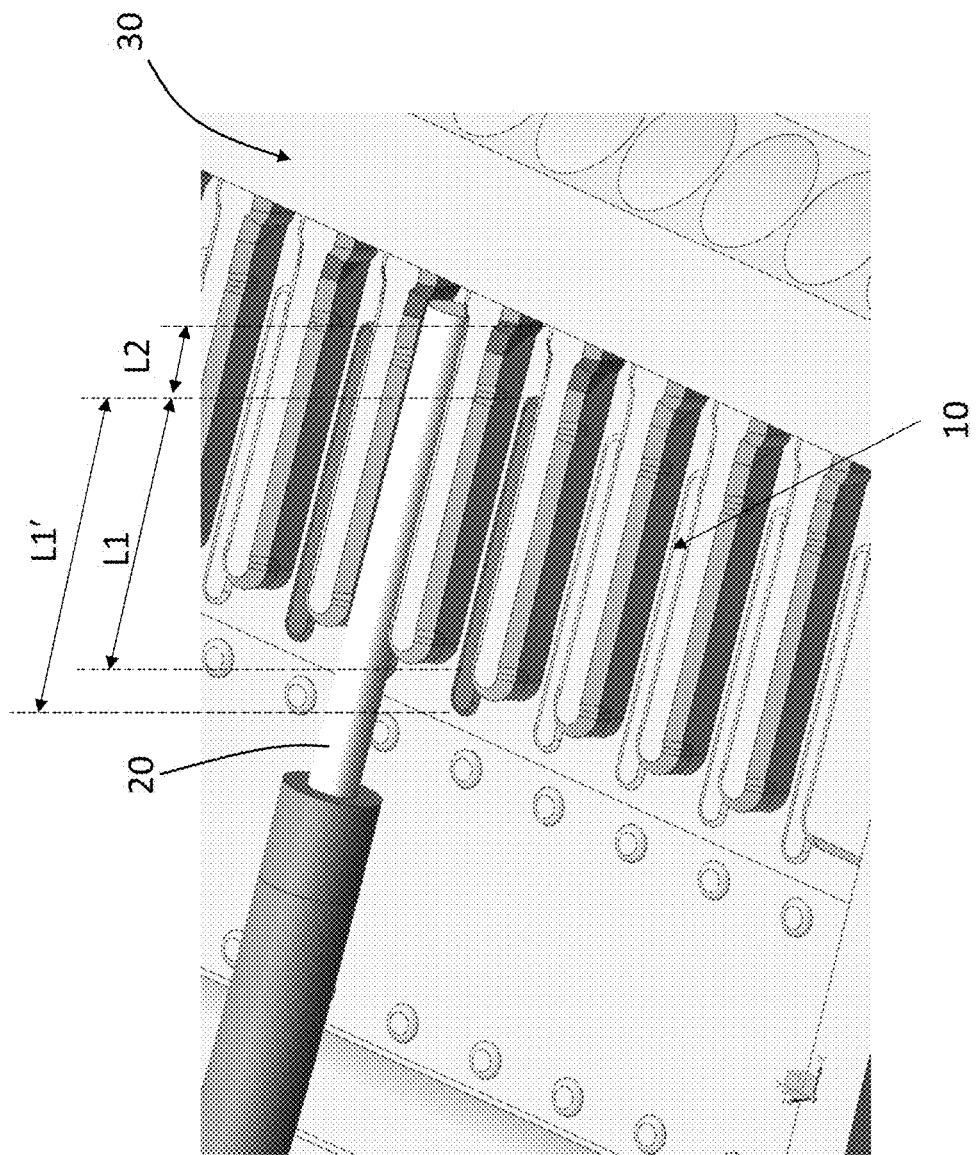
FIG. 6 is a top perspective view of a portion of an optical coupling assembly.

FIG. 5 is perspective cutaway view of a portion of light coupling element 1000. The groove 40 includes a bottom surface having raised 52 and unraised 51 bottom surface portions and the groove 40 has an open top 41. FIG. 6 is a top perspective view of a portion of light coupling element 1000. The raised portion 52 has a total length L1' and a length L1 within and along the groove 40 and the unraised portion 51 has a length L2 along the groove 40. In some embodiments, the first length L1 is greater than the second length L2. In some embodiments, the unraised portion 51 of the bottom surface 50 includes a skived portion (see, e.g., skived portion 256 depicted in FIG. 20) along at least a portion of the second length L2 of the unraised portion 51 on a surface thereof. For example, when an optical fiber 20 is inserted into groove 40, a portion of the unraised portion 51 of the bottom surface 50 may be skived. In addition to, or instead of, a portion of the bottom surface being skived, one or both sidewalls may include at least one skived portion (see, e.g., skived portion 183 depicted in FIG. 19). In some embodiments, the groove 40 includes at least one skived portion formed when the optical waveguide 20 skives at least one of the bottom surface or the first or the second sidewall while being received in and supported by the groove 40.

In some embodiments, the raised bottom surface portion 52 is spaced apart from the input side 31 by at least 40 micrometers, or at least 60 micrometers, or at least 80 micrometers. For example, in some embodiments, the unraised bottom surface portion 51 extends from the raised bottom surface portion 52 to the input side 31 of the light redirecting member 30 and the length L2 is at least 40 micrometers, or at least 60 micrometers, or at least 80 micrometers.

Figure 7:
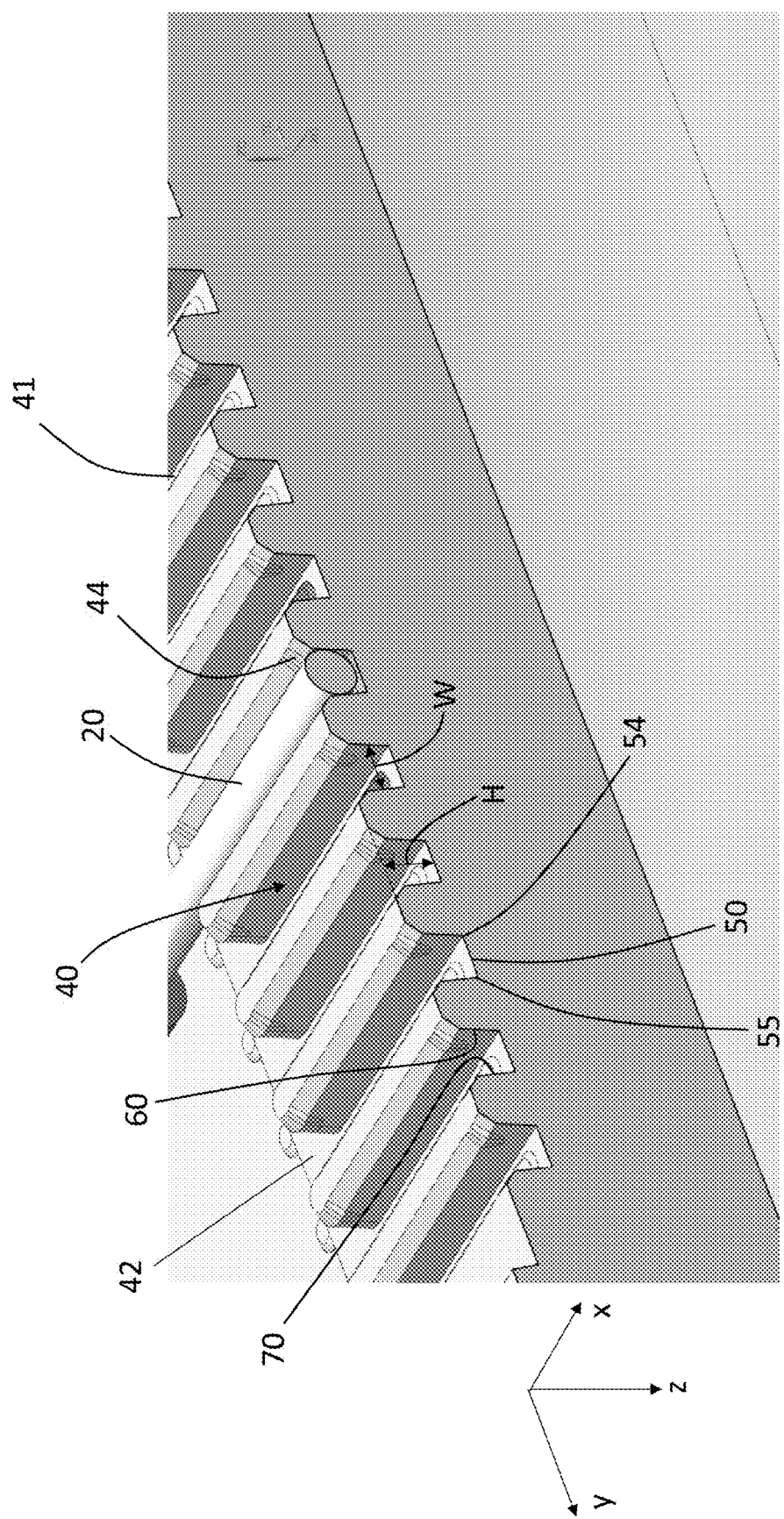
FIG. 7 is a perspective end cutaway view of a portion of an optical coupling assembly.

FIG. 7 is a perspective end cutaway view of a portion of light coupling element 1000. In some embodiments, each groove 40 extends along a first direction (x-direction) and has a width W along a second direction (y-direction) and a depth H along a third direction (z-direction) orthogonal to the first and second directions. In some embodiments, a groove 40 is formed in the attachment area 10 for receiving an optical waveguide 20 and includes a bottom surface 50 and opposing sidewalls 60, 70 extending upwardly from opposite lateral sides 54 and 55 of the bottom surface 50 and defining an open top 41 and an entrance end 42 opposite a terminal end 43 (see, e.g., FIG. 2) proximate the input side 31 (see, e.g., FIG. 3) of the light redirecting member 30.

Figure 8:
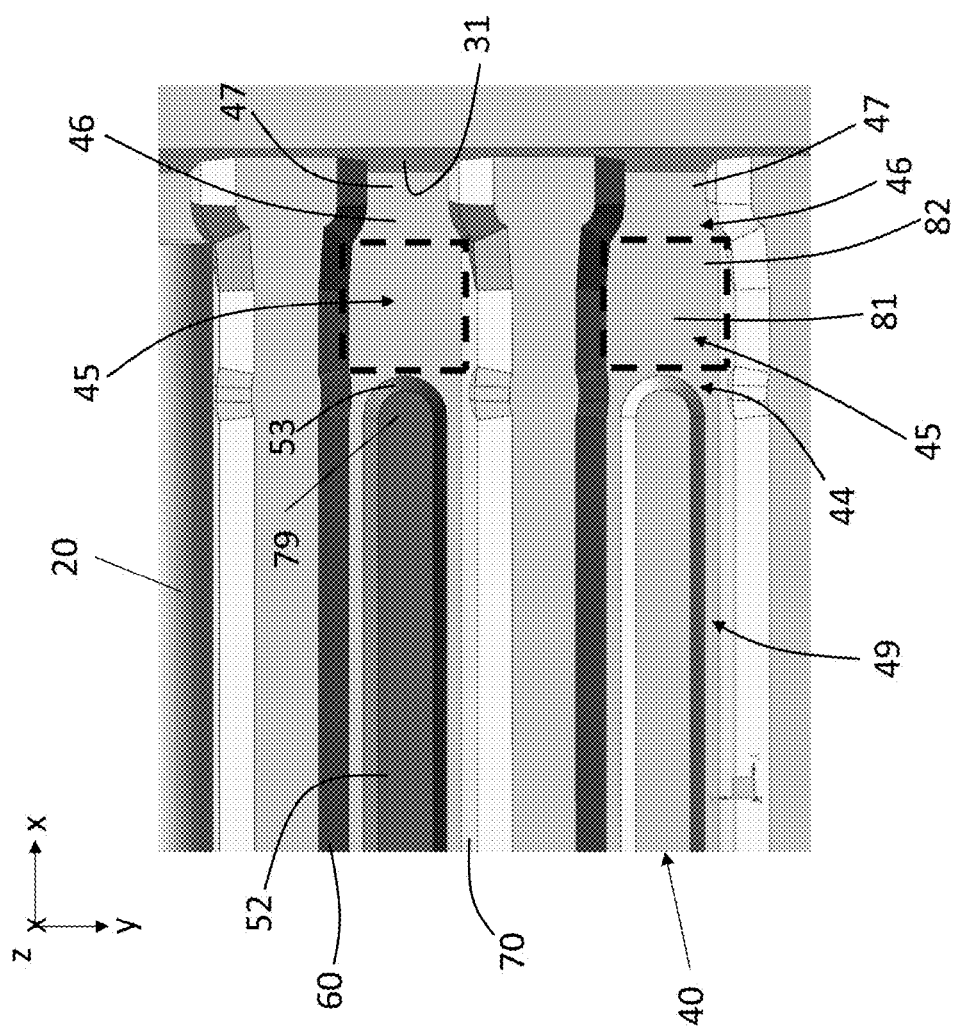
FIG. 8 is a top view of a portion of a light coupling element.
Figure 9:
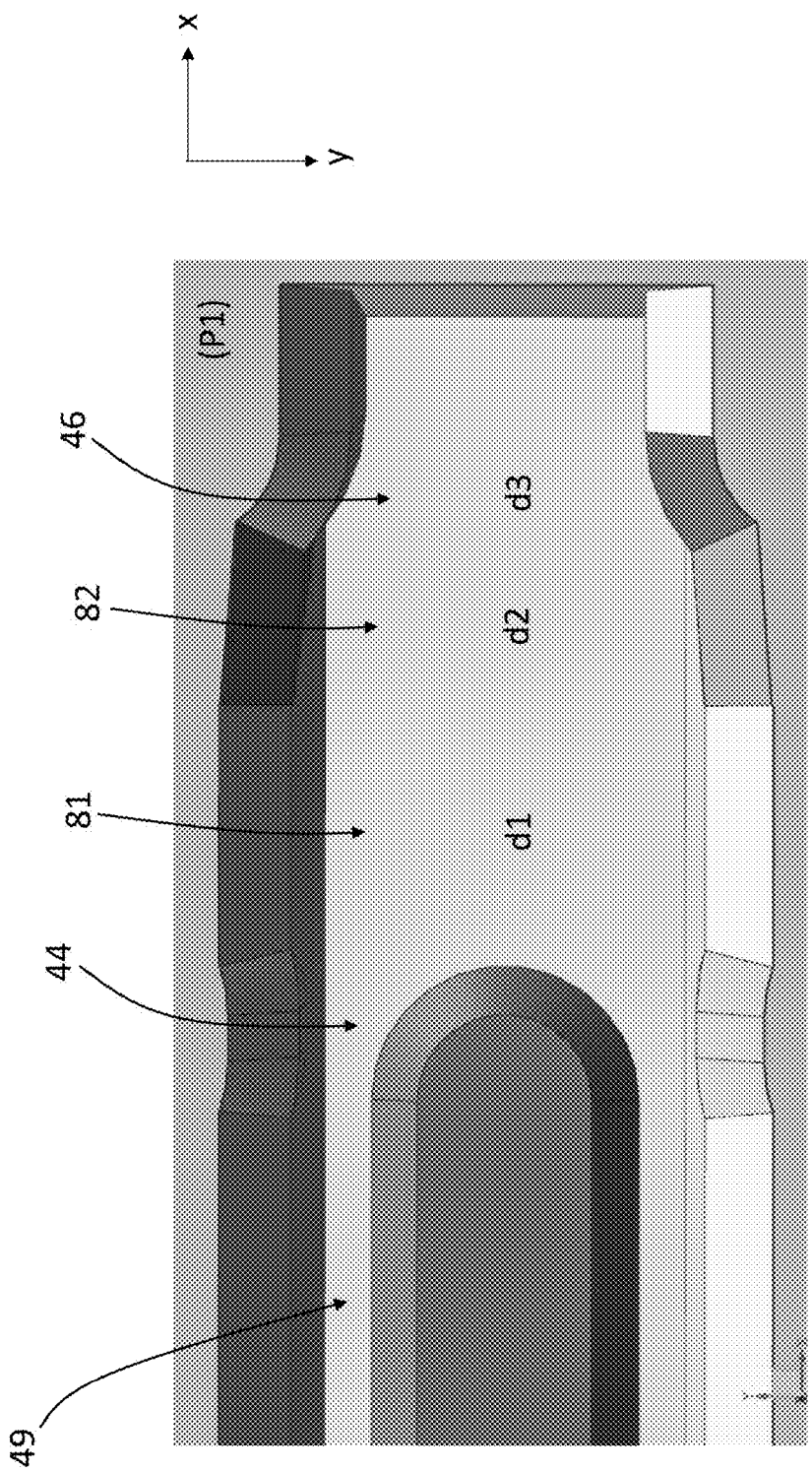
FIG. 9 is a top view of a portion of a groove.

FIG. 8 is a top view of a portion of the light coupling element 1000 and FIG. 9 is a top view of a portion of a groove 40. In some embodiments, the light coupling element 1000 includes a plurality of substantially parallel grooves, and for at least one groove (e.g., groove 40) in the plurality of the grooves, the groove 40 includes a first pinched region 44 disposed between, and spaced apart from, an open front end 42 (see, e.g., FIG. 2) and a back end 31 of the groove 40; a stop region 46 disposed between, and spaced apart from, the first pinched region 44 and the back end 31 of the groove 40; and a support region 49 disposed between the front end 42 and first pinched region 44 of the groove 40. In some embodiments, for the at least one groove 40, the groove 40 further includes a landing region 45 disposed between the first pinched 44 and stop regions 46 of the groove 40. In some embodiments, the landing region 45 includes adjacent first and second portions 81 and 82 disposed between the first pinched 44 and stop 46 regions where the first portion 81 extends from the first pinched region 44 to the second portion 82 and the second portion 82 extends from the first portion 81 to the stop region 46, such that the rate of change of the width of the groove 40 along the first direction is greater in the second portion 82 than in the first portion 81. The second portion 82 may be used as a centering region to center the optical fiber when it is positioned in the groove 40.

In some embodiments, the rates of change of the width of the groove 40 in the first portion 81, the second portion 82 and the stop region 46 are d1 through d3, respectively, and d1<d2<d3. In some embodiments, at least one of the first 81 or second 82 portions of the landing region 45 includes a skived portion (see, e.g., skived portion 256 depicted in FIG. 20) extending along the first direction.

The rate of change of the width of the groove along the first direction refers to a positive quantity. For example, if the width of the groove is described by a function of a coordinate x along the first direction, the rate of change of the width along the first direction can be expressed as the absolute value of the derivative of the width with respect to x. In some cases, it may be desired to specify whether the width of the groove increases or decreases in a specified direction. For example, a first direction may be specified such that the groove extends along the first direction from an entrance end 42 to an opposite terminal end 43 proximate the input side 31 of the light redirecting member 30. In this case, the first direction is the plus x-direction. In some embodiments, the width of the groove 40 in the centering region 82 decreases in the first direction at a first rate, and the width of the groove in at least of portion of the stop region 46 decreases the first direction at a second rate greater than the first rate. The first and second rates are positive quantities.

It may be useful to describe the geometry of the light coupling element with respect to various planes. For example, in some embodiments, in the first cross-section of the groove 40 in the first plane P1 (see, e.g., FIG. 9), a rate of change of the width of the groove along the first direction is greater in the stop region 46 than in the first pinch region 44. As described further elsewhere herein, other useful planes include second plane P2 which is substantially perpendicular to the first direction and along a cross-section in the support region 49 (e.g., the cross-section depicted in FIG. 13C is along second plane P2), third plane P3 which is substantially perpendicular to the first direction and along a cross-section in the first pinched region 44 (e.g., the cross-section depicted in FIG. 13B is along third plane P3), a plane P4 which is substantially parallel to the first and second directions (e.g., the cross-section depicted in FIG. 11 is along the plane P4), and a plane P5 which is substantially perpendicular (e.g., within 10 degrees) to a direction (e.g., z-direction) of light redirected by the light redirecting member (e.g., the cross-section depicted in FIG. 12 is along the plane P5).

The first plane P1, the plane P4, and the plane P5 may be substantially parallel with one another or may be coincident. The first plane P1, the plane P4 and the plane P5 can independently be taken to be at a level such that the plane bisects a portion of an optical fiber disposed on the raised bottom surface portion of the groove or bisects a circle tangent to the bottom surface and sidewalls of the groove, or the level of the plane can be taken to be H/2, or the plane can be taken to be level with an upper surface of the raised bottom surface portion of the bottom surface, for example. FIGS. 28A-28B are schematic cross-sectional views of a groove 2840 in a cross-section in the support region of the groove substantially perpendicular to the first direction illustrating various planes. The groove 2840 includes opposing sidewalls 2860 and 2870 and a bottom surface 2850 including a raised bottom surface portion 2852. The sidewalls 2860 and 280 have a draft angle φ at the bottom surface 2850. A circle 2880 tangent to the bottom surface 2852 and to each of the sidewalls 2860 and 2870 is shown in FIG. 28A. The circle 2880 may or may not correspond to an optical fiber disposed in the groove 2840. For example, an optical fiber disposed in the groove 2840 may have a smaller diameter than the circle 2880 so that the optical fiber contacts at most one of the sidewalls 2860 and 2870. FIG. 28B illustrated an optical fiber 2820 having a diameter smaller than the circle 2880. In other embodiments, an optical fiber may have a diameter greater than that of the circle 2880 so that the optical fiber deforms when received by the groove 2840. In other embodiments, an optical fiber may have a diameter substantially equal to that of the circle 2880. Planes P6-P10 are illustrated in FIG. 28A and plane P11 is illustrated in FIG. 28B. Each of planes P6-P11 are substantially parallel to a plane (x-y plane) defined by the first and second directions and/or are substantially perpendicular to the third direction (z-direction). The sidewalls 2860 and 2870 include steeper lower portions and shallower upper portions. The plane P6 passes through the region of the sidewalls between the upper and lower portions. The plane P7 bisects the circle 2880. The groove 2840 has a height H and the plane P8 is at a height H/2 from an unraised bottom surface portion of the bottom surface 2850. The plane P9 passes through points on the sidewalls tangent to the circle 2880. The plane P10 is level with the raised bottom surface portion 2852. The plane P11 passes through a region of closest approach of the sidewalls 2860 and 2870 to the optical fiber 2820. One or more of the illustrated planes may be coincident with another illustrated plane in some embodiments. For example, if the optical fiber 2820 has a diameter equal to the diameter of the circle 2880, then the planes P9 and P11 may be coincident. The first plane P1, the plane P4 and the plane P5 can independently be taken to be any one of planes P6 to P11, for example.

In some embodiments, the groove 2840 includes a bottom surface 2850 and opposing sidewalls 2860 and 2870 extending upwardly from opposite lateral sides of the bottom surface 2850 and defining a width of the groove and an open top 2841. The width of the groove 2840 can be taken to the lateral opening in the second direction (y-direction) in any one of the planes P6 to P11, for example. When comparisons are made between the width of the groove in different cross-sections perpendicular to the first direction, the width may be understood to refer to the width in a same plane. For example, if the lateral opening of the groove in any one of the planes P6 to P11, for example, in the centering region decreases in the first direction at a first rate and the lateral opening of the groove in the same one of the planes P6 to P11, for example, in at least a portion of the stop region decreases in the first direction at a second rate greater than the first rate, then the width of the groove in the centering region may be described as decreasing in the first direction at a first rate and the width of the groove in at least a portion of the stop region may be described as decreasing in the first direction at a second rate greater than the first rate.

Figure 10:
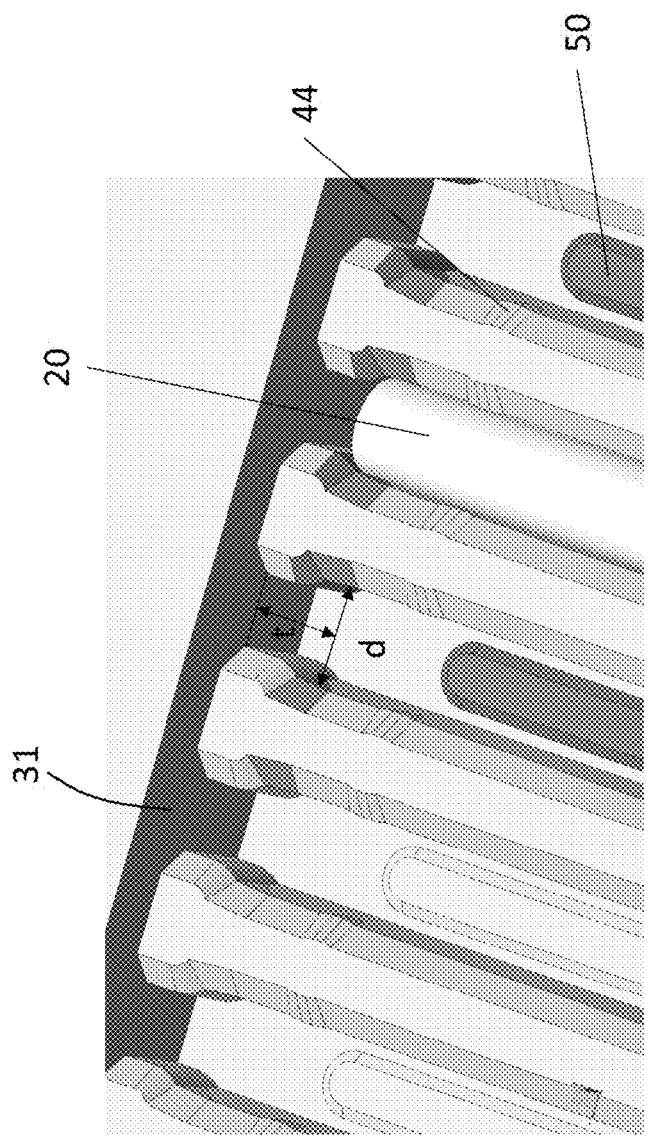
FIG. 10 is a top perspective view of a portion of an optical coupling assembly.
Figure 11:
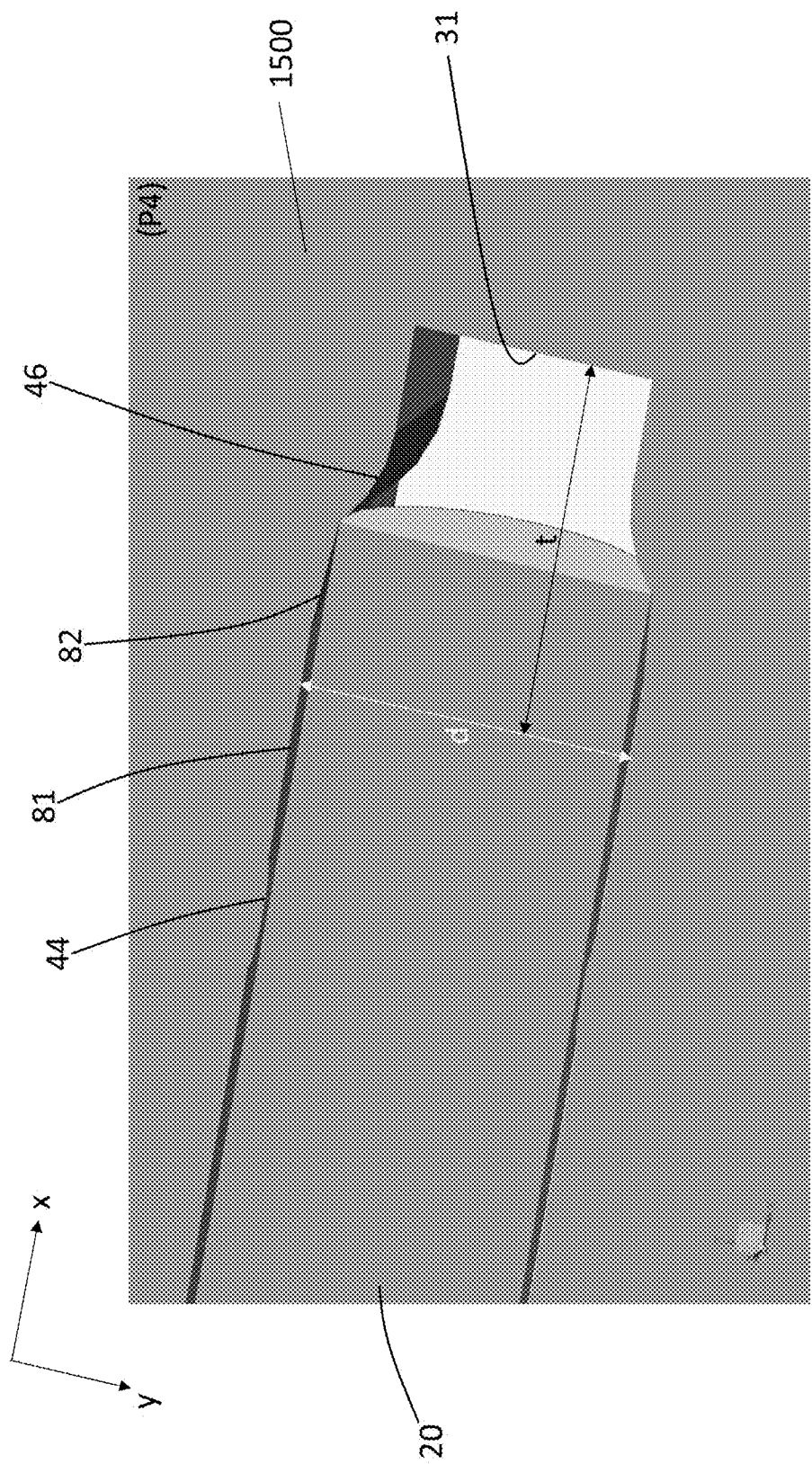
FIGS. 11-12 are cross-sectional views of portions of an optical coupling assembly.
Figure 12:
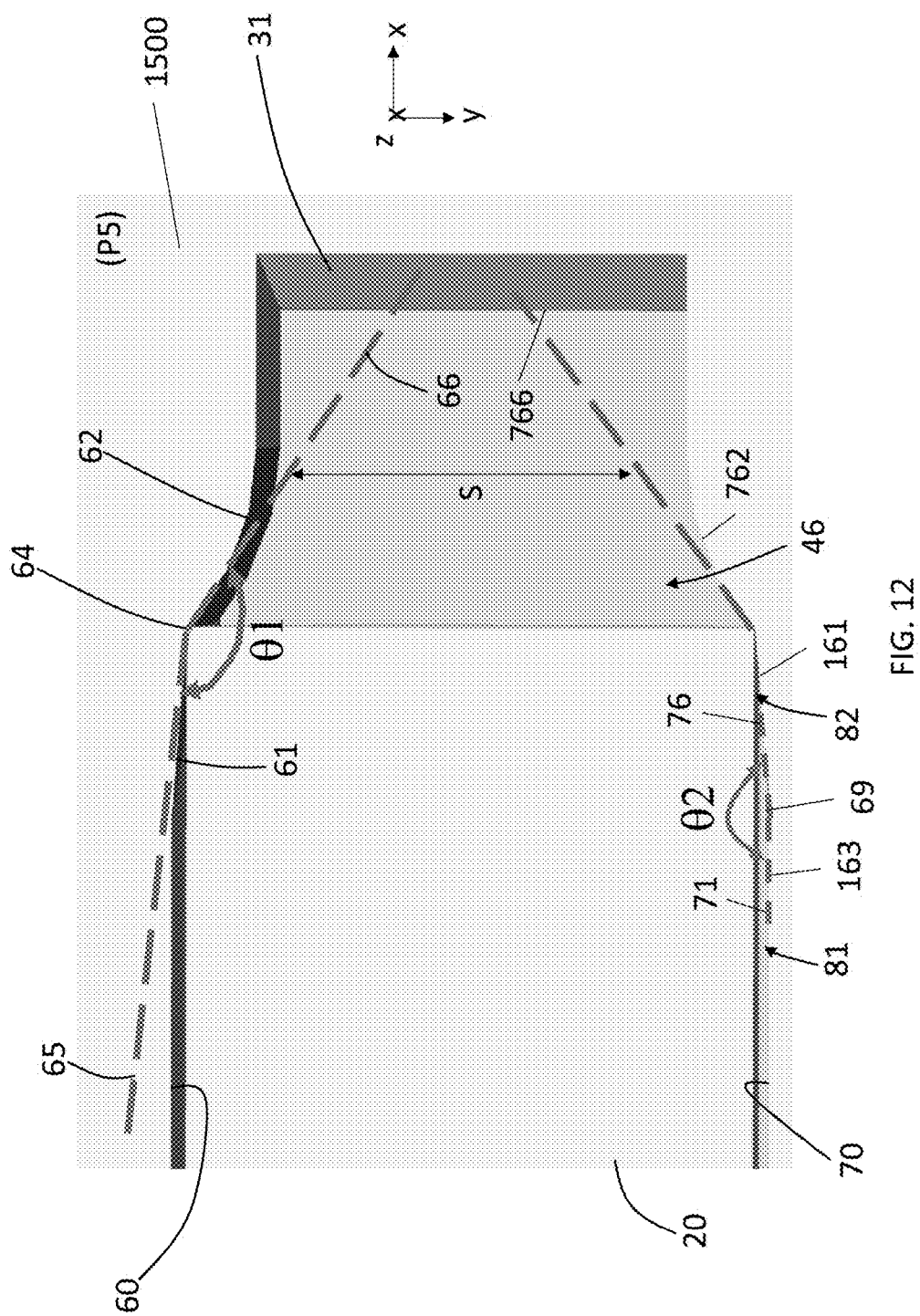

FIG. 10 is a top perspective view of a portion of light coupling element 1000 and FIG. 11 is a cross-sectional view of a portion of light coupling element 1000 in the plane P4 which, in the illustrated embodiment, bisects the portion of the optical fiber 20 disposed on the raised bottom surface portion of the groove 40. In some embodiments, the light coupling element 1000 includes a plurality of substantially parallel grooves 40 extending along the first direction (x-direction) and arranged along the orthogonal second direction (y-direction) for receiving and supporting a plurality of optical waveguides 20, where for at least one groove in the plurality of the grooves, the groove includes immediately adjacent sequentially arranged first 82 and second 46 regions disposed between and spaced apart from the front 42 and back 31 ends of the groove, the second region 46 disposed between the first region 82 and the back end 31 of the groove, such that in a cross-section of the groove in the plane P4, which is substantially parallel to the first and second directions, a rate of change in a lateral opening d (e.g., the width) of the groove in the second direction as a function of distance t from the back end of the groove is greater in the second region 46 than in the first region 82.

FIG. 12 is a cross-sectional view of a portion of light coupling element 1000 in the plane P5. In some embodiments, the light redirecting member redirects light received from the input side along a first direction to a different second direction (e.g., z-direction) and the plane P5 is substantially perpendicular to the second direction. In some embodiments, in a cross-section of the groove 40 in the plane P5, at least one of the opposing sidewalls includes first 61 and second 62 line segments intersecting one another at a common point 64, where first 65 and second 66 tangent lines, which are tangent to the respective first and second line segments 61 and 62 at the common point 64, make an angle θ1 therebetween. In some embodiments, the angle θ1 is in a range of 95 to 160 degrees. In some embodiments, in the cross-section of the groove 40 in the plane P5, at least one of the opposing sidewalls includes first 161 and second 163 line segments intersecting one another at a common point 69, where first 76 and second 71 tangent lines, which are tangent to the respective first and second line segments 161 and 163 at the common point 69, make an angle θ2 therebetween. In some embodiments, the angle θ2 is in a range of 120 to 175 degrees. In some embodiments, the angle θ2 is in a range of 95 degrees to θ2 minus 5 degrees. In some embodiments, θ2-θ1 is in a range of 5 degrees to 90 degrees, or in a range of 10 degrees to 80 degrees, for example.

In some embodiments, at least one of the first and second line segments 61 and 62 is curved. In some embodiments, the first line segment 61 is substantially straight and the second line segment 62 is curved.

In some embodiments, the width of the groove 40 in the stop region 46 decreases sublinearly along the first direction (x-direction). In this context, sublinearly can be understood to mean that the width of the groove 40 in the stop region 46 decreases more slowly along the first direction than a distance S between the tangent line 66 for the second line segment 62 of the sidewall 60 and a corresponding tangent line 766 tangent to a corresponding second line segment 762 of the sidewall 70.

Figure 13A:
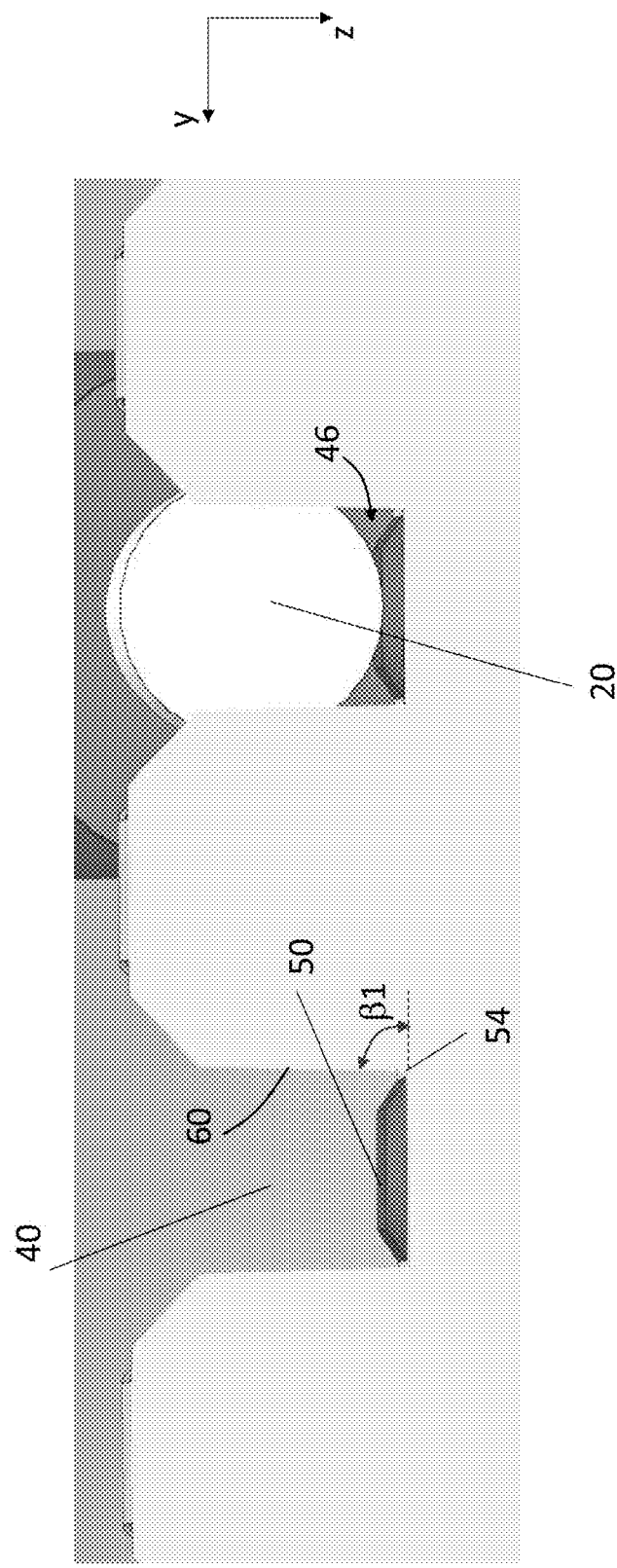
FIGS. 13A-13C are cross-sectional views of portions of an optical coupling assembly in substantially parallel planes.
Figure 13B:
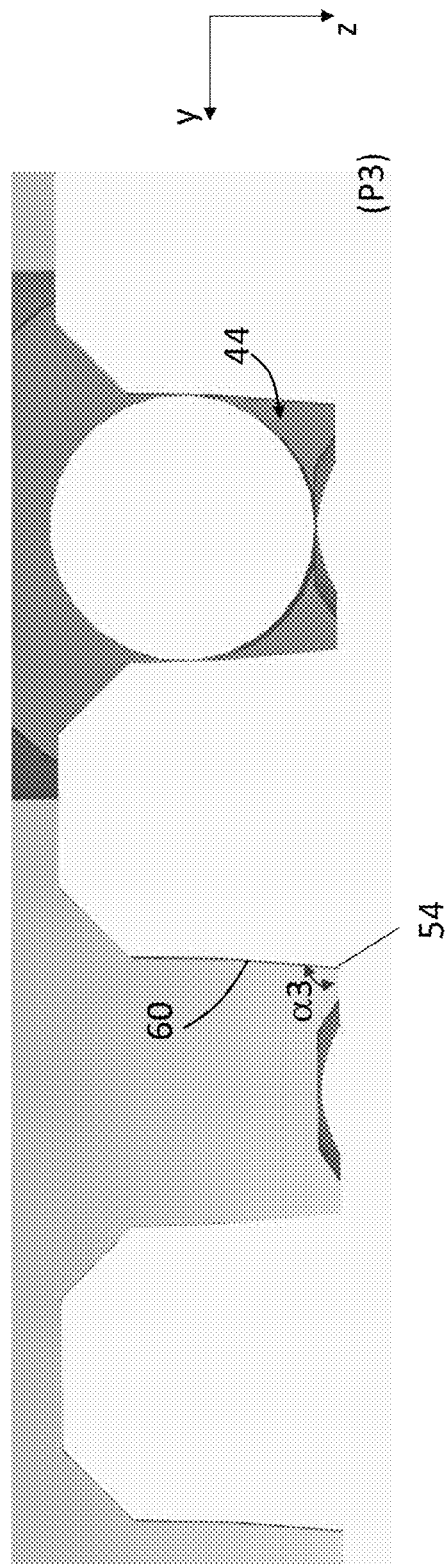
Figure 13C:
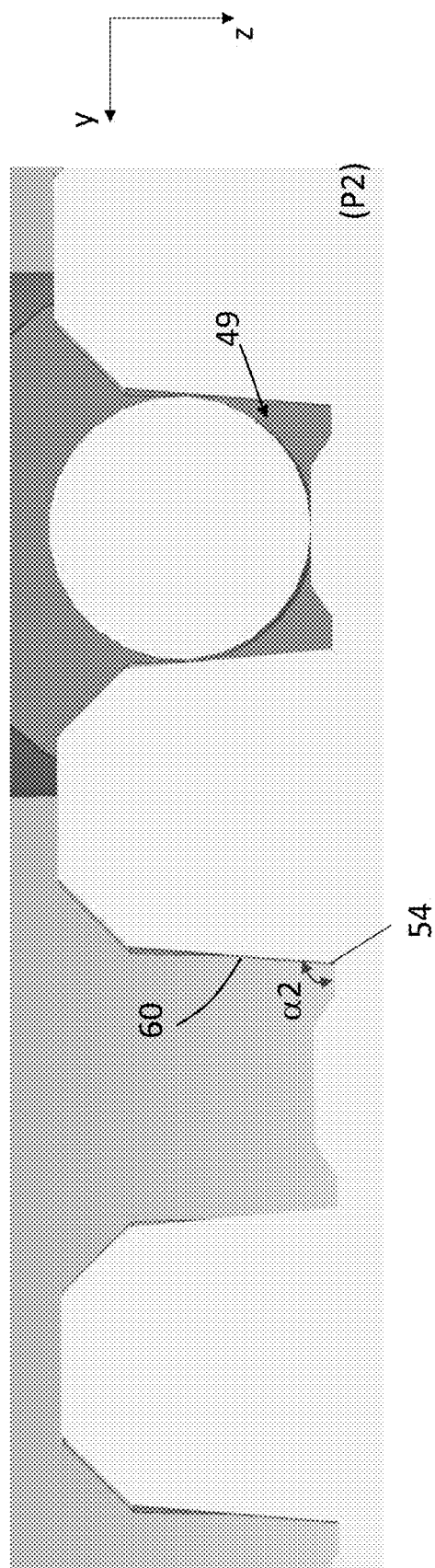

FIGS. 13A-13C illustrate cross-sections of a portion of light coupling element 1000 in planes substantially perpendicular to the first direction in cross-sections in the stop region 46, the first pinched region 44, and the support region 49, respectively. In some embodiments, in cross-sections of the first pinched 44 and support 49 regions in respective second P2 (FIG. 13C) and third planes P3 (FIG. 13B) substantially perpendicular to the first direction, a rate of change of the width of the groove along the third direction is greater in the support region 49 than in the first pinched region 44. The rate of change of the width of the groove along the third direction can alternatively, or in addition, be characterized in terms of draft angle. In some embodiments, each sidewall has a draft angle at the corresponding lateral side of the bottom surface that is greater in the support region 49 than in the first pinched region 44. For example, the angle α3 depicted in FIG. 13B minus 90 degrees is the draft angle of sidewall 60 at the lateral side 54 of the bottom surface in the third plane P3, and the angle α2 depicted in FIG. 13C minus 90 degrees is the draft angle of sidewall 60 at the lateral side 54 of the bottom surface in the second plane P2. The draft angle of sidewall 60 at the lateral side 54 of the bottom surface 50 in the cross-section of FIG. 13A, which is in stop region 46, is 90 degrees minus the illustrated angle β1.

In some embodiments, the groove includes first and second pinched regions 44 and 80 spaced apart from each other along the first direction and defining a third region 49 therebetween, which may be adapted to support an optical waveguide, such that each sidewall has a draft angle at the corresponding lateral side of the bottom surface that is greater in each of the first and second pinched regions 44 and 80 than in the third region 49.

Figure 14:
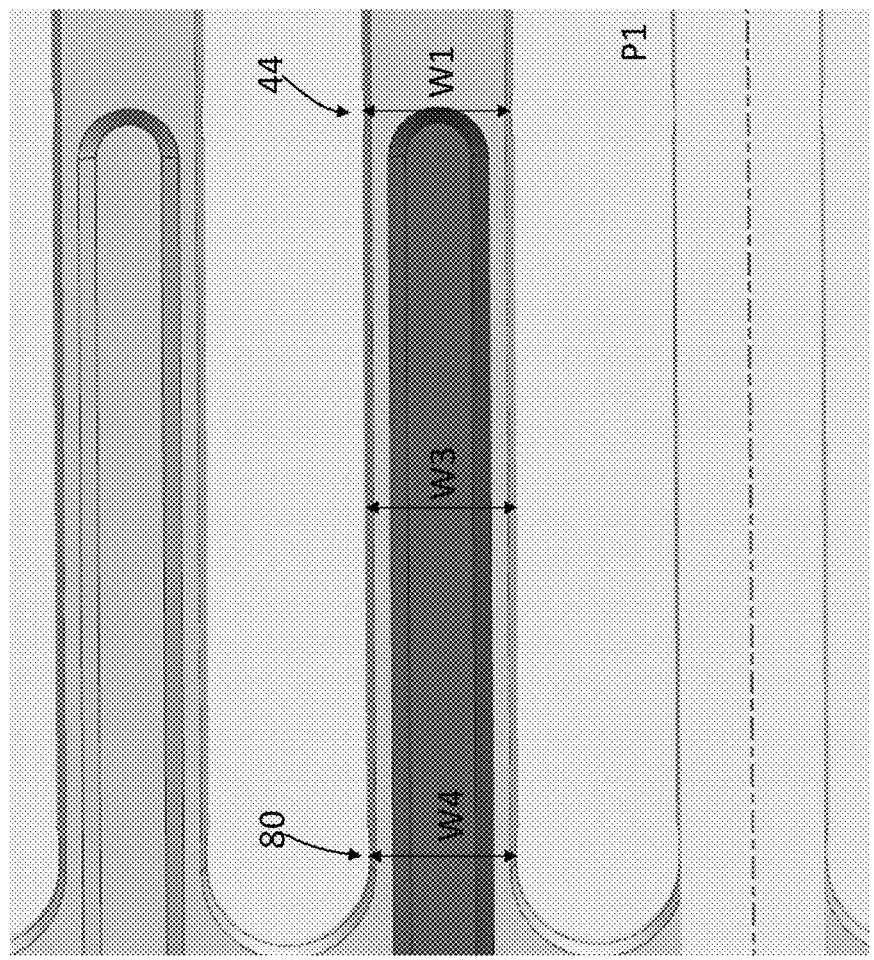
FIG. 14 is cross-sectional view of a portion of a light coupling element.
Figure 15:
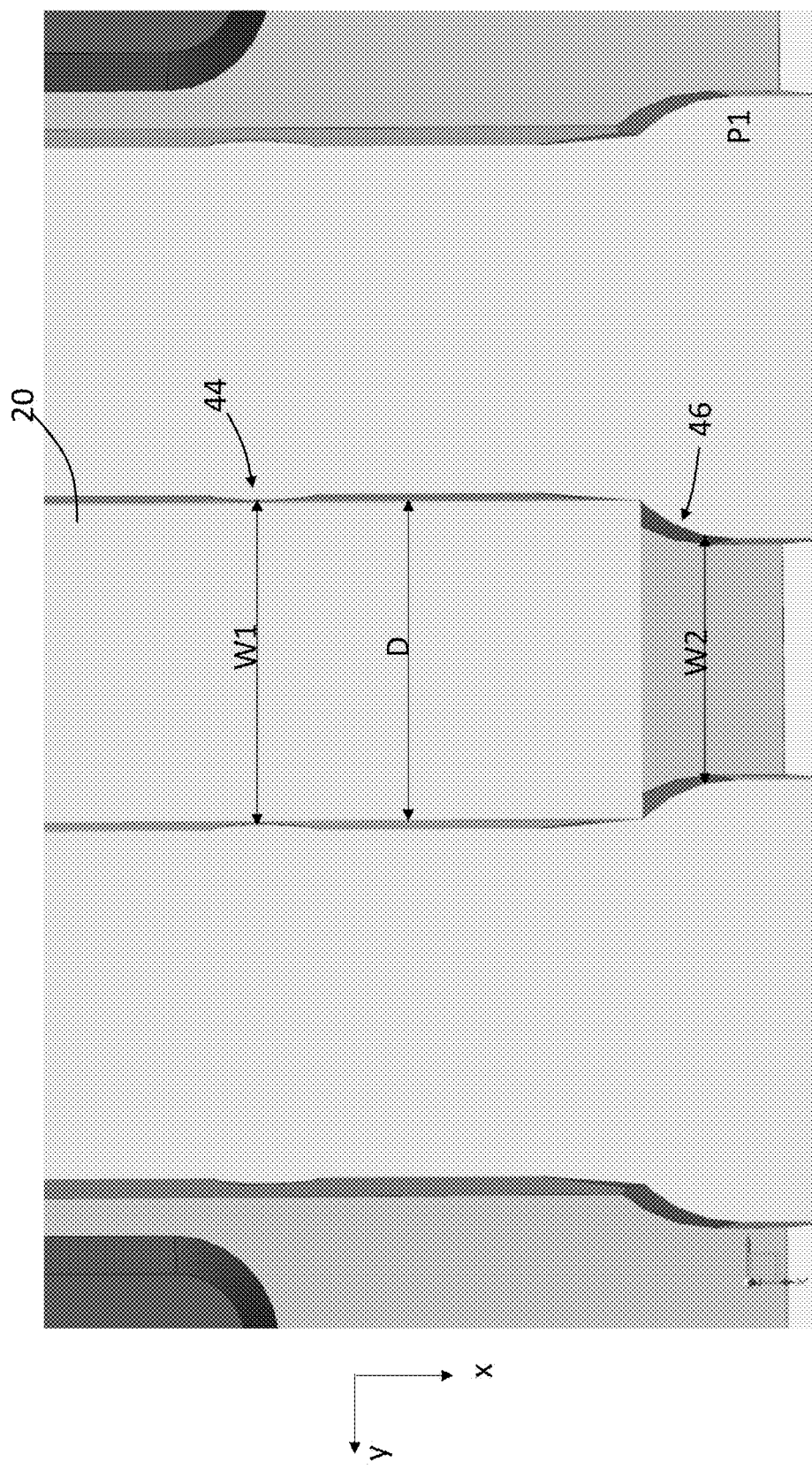
FIG. 15 is cross-sectional view of a portion of an optical coupling assembly.

FIGS. 14 and 15 are cross-sectional views of portions of the light coupling element 1000 in the first plane P1 showing a groove without and with an optical waveguide 20 disposed in the groove. In the illustrated embodiment, the first plane P1 bisects the optical waveguide 20 in at least a portion of the optical fiber disposed in the first pinched region 44. In some embodiments, the minimum width W1 of the groove 40 in the first pinched region 44 is less than the minimum width W3 of the groove in the support region 49. In some embodiments, the minimum width W4 of the groove 40 in the second pinched region 80 is less than the minimum width W3 of the groove in the support region 49. In some embodiments, when an optical waveguide or optical fiber 20 having an average diameter D is received and supported in the groove, the width of the groove in at least a portion of the stop region is less than D. In some embodiments, when an optical fiber or optical waveguide 20 having an average diameter D is received and supported in the groove 40, in the first cross-section P1 of the groove 40, the minimum width W1 of the groove in the first pinched region 44 is within about 10% of D (e.g., in a range of D to 1.1D), and a minimum width W2 of the groove in the stop region 46 is less than about 0.8D. In some embodiments, a rate of change of the width of the groove along the first direction is greater in the stop region 46 than in the first pinch region 44. In some embodiments, the minimum width W3 of the groove in the support region 49 is within about 10% of D (e.g., in a range of D to 1.1D).

The minimum width W1 of the groove in the first pinched region 44 may be greater than D (e.g., 1.01D to 1.1D) to allow some clearance between the optical fiber and the sidewalls. In some embodiments, an optical fiber received and supported in the groove 40 may have an average diameter that is less than a minimum width of the groove in the first pinched region 44, but not in at least a portion of the stop region 46. In other embodiments, an optical fiber received and supported in the groove 40 may have an average diameter approximately equal to a minimum width of the groove in the first pinched region 44. In some embodiments, when an optical fiber 20 is received and supported in the groove 40, the optical fiber 20 touches, at most, one of the sidewalls in the first pinched region 44. In some embodiments, when an optical fiber 20 is received and supported in the groove 40, the optical fiber 20 touches both of the sidewalls in the stop region 46.

Figure 16:
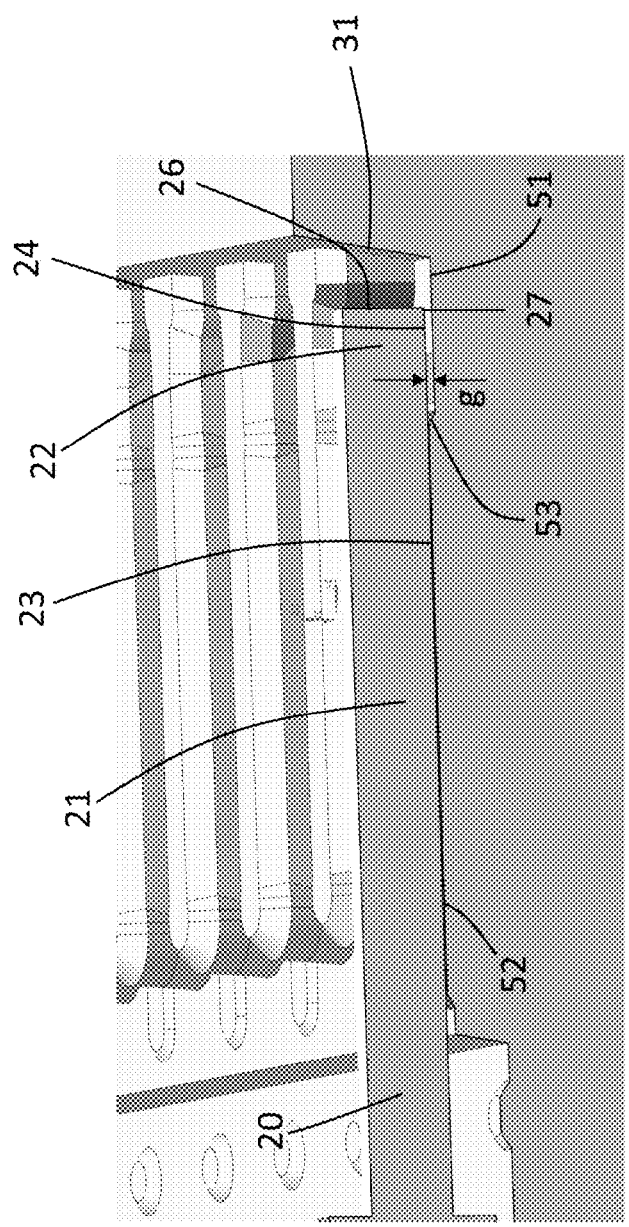
FIG. 16-18 are perspective cutaway views of portions of an optical coupling assembly.
Figure 17:
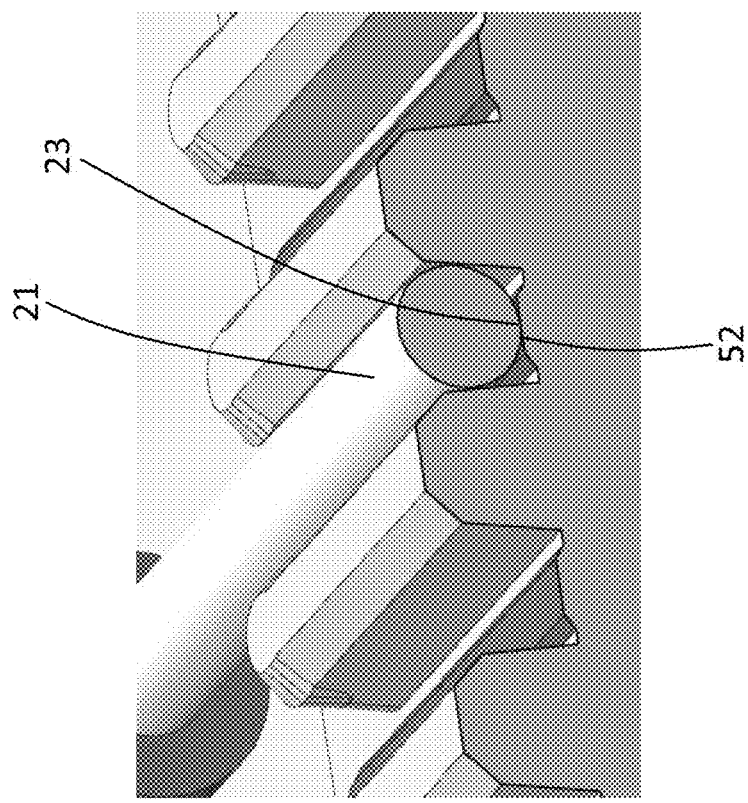
Figure 18:
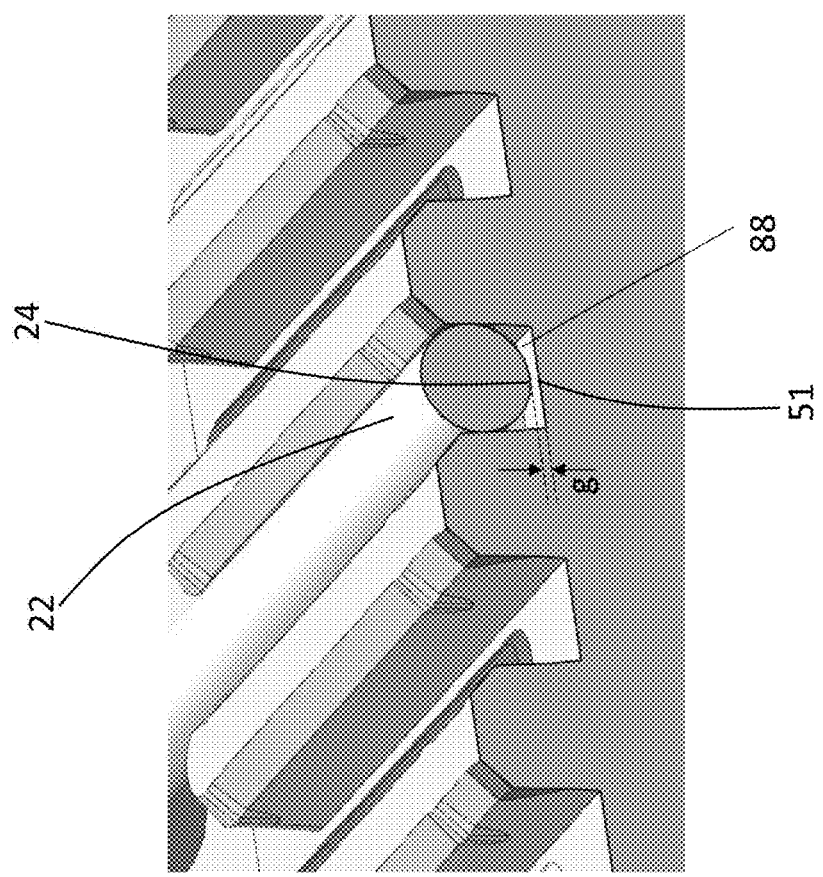

FIG. 16 is a perspective cutaway view of optical coupling assembly 1500 cutaway in a plane substantially perpendicular to the second direction and bisecting an optical waveguide 20. The optical waveguide 20 includes adjacent first 21 and second 22 segments, where the second segment 22 is disposed between the first segment 21 and the input side 31 of the light redirecting member 30 and includes an end face 26 of the optical waveguide 20. The end 27 of the optical waveguide 20 includes the end face 26. FIGS. 17 and 18 are perspective cutaway views cutaway in planes substantially perpendicular to the first direction in the first 21 and second 22 segments, respectively. The bottom surface 50 of the groove 40 includes a raised bottom surface portion 52 raised upwardly relative to an unraised bottom surface portion 51 disposed between a perimeter 53 of the raised bottom surface portion 52 and the input side 31 of the light redirecting member. In some embodiments, a bottom-most portion 23 of the optical waveguide 20 along the first segment 21 of the optical waveguide 20 rests on and makes physical contact with the bottom surface 50 of the groove 40, and a bottom-most portion 24 of the optical waveguide 20 along the second segment 22 of the optical waveguide is spaced part from the bottom surface defining a gap g therebetween. For example, the bottom-most portion 23 along the first segment 21 may rest on and make physical contact with the raised bottom surface portion 52, and the bottom-most portion 24 along the second segment 22 may be spaced part from the unraised bottom surface portion 51 by the gap g. The gap g may be substantially uniform (e.g., height of gap varying by less than 10%), or the first segment 21 of the optical waveguide may have a first diameter, and the end face may have a second diameter greater than the first diameter as described further elsewhere herein, so that the gap g is smaller near the end face 26 than near the perimeter 53.

In some embodiments, an adhesive is used to permanently attach an optical fiber 20 to the attachment area 10. The adhesive may be an index matching optical adhesive, for example. In some embodiments, the gap g is at least partially filled with an adhesive 88.

Figure 19:
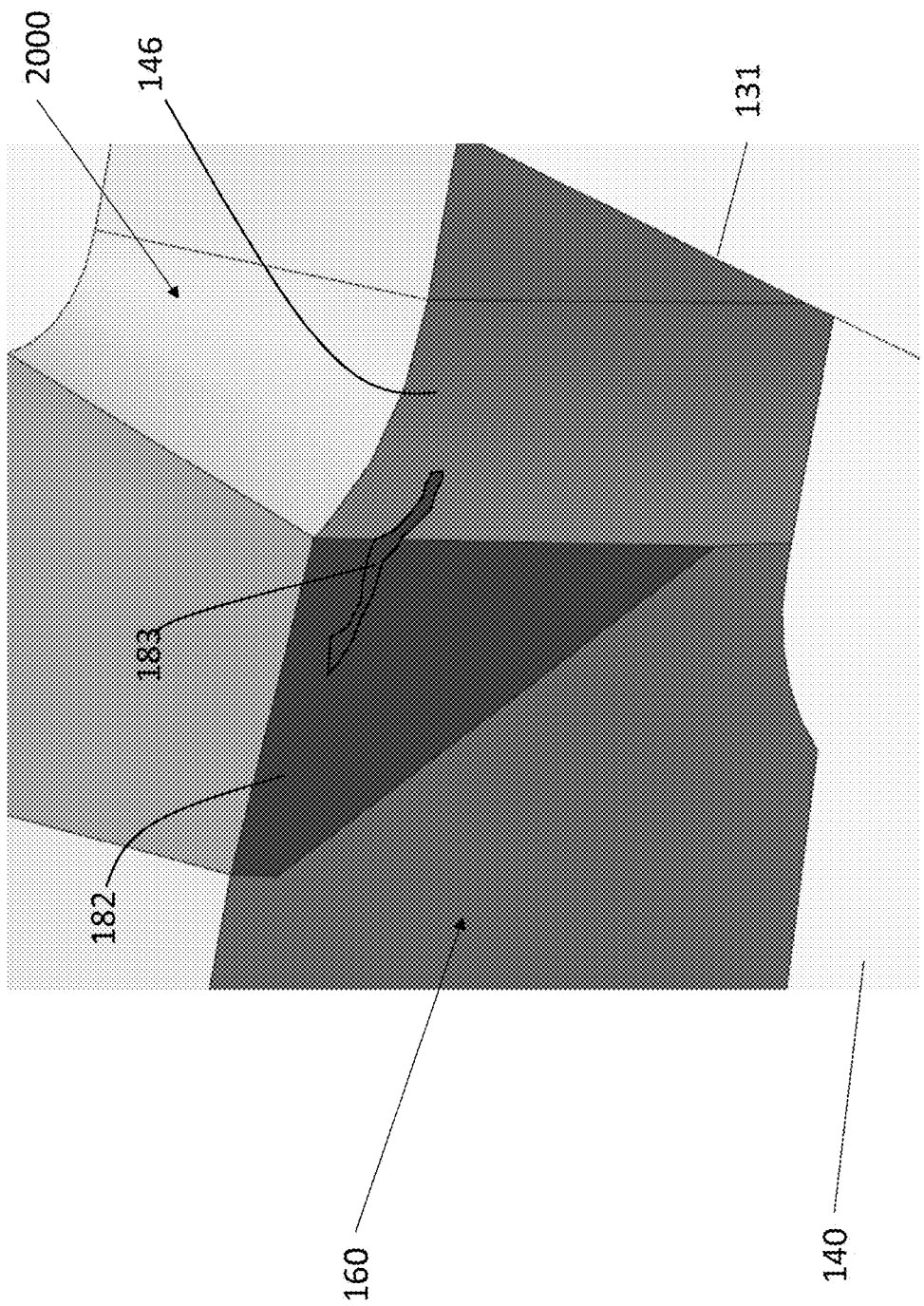
FIG. 19 is a schematic perspective view of a portion of a light coupling element having a skived portion.

FIG. 19 is a schematic perspective view of a portion of a light coupling element 2000 illustrating a sidewall 160 of a groove 140 having a terminal end 131, a centering region 182 and a stop region 146. A skived portion 183 is schematically illustrated. Light coupling element 2000 may correspond to light coupling element 1000 where inserting an optical fiber (not shown in FIG. 19) has resulted in skiving in the centering 182 and stop 146 regions, which may correspond to centering 82 and stop 46 regions, respectively. In other embodiments, only a portion of at least one of the sidewalls in one of the centering 182 or stop 146 regions is skived. In some embodiments, at least one of the sidewalls in the centering region 182 includes a skived portion. In some embodiments, each of the sidewalls in the centering region 182 includes a skived portion.

Figure 20:
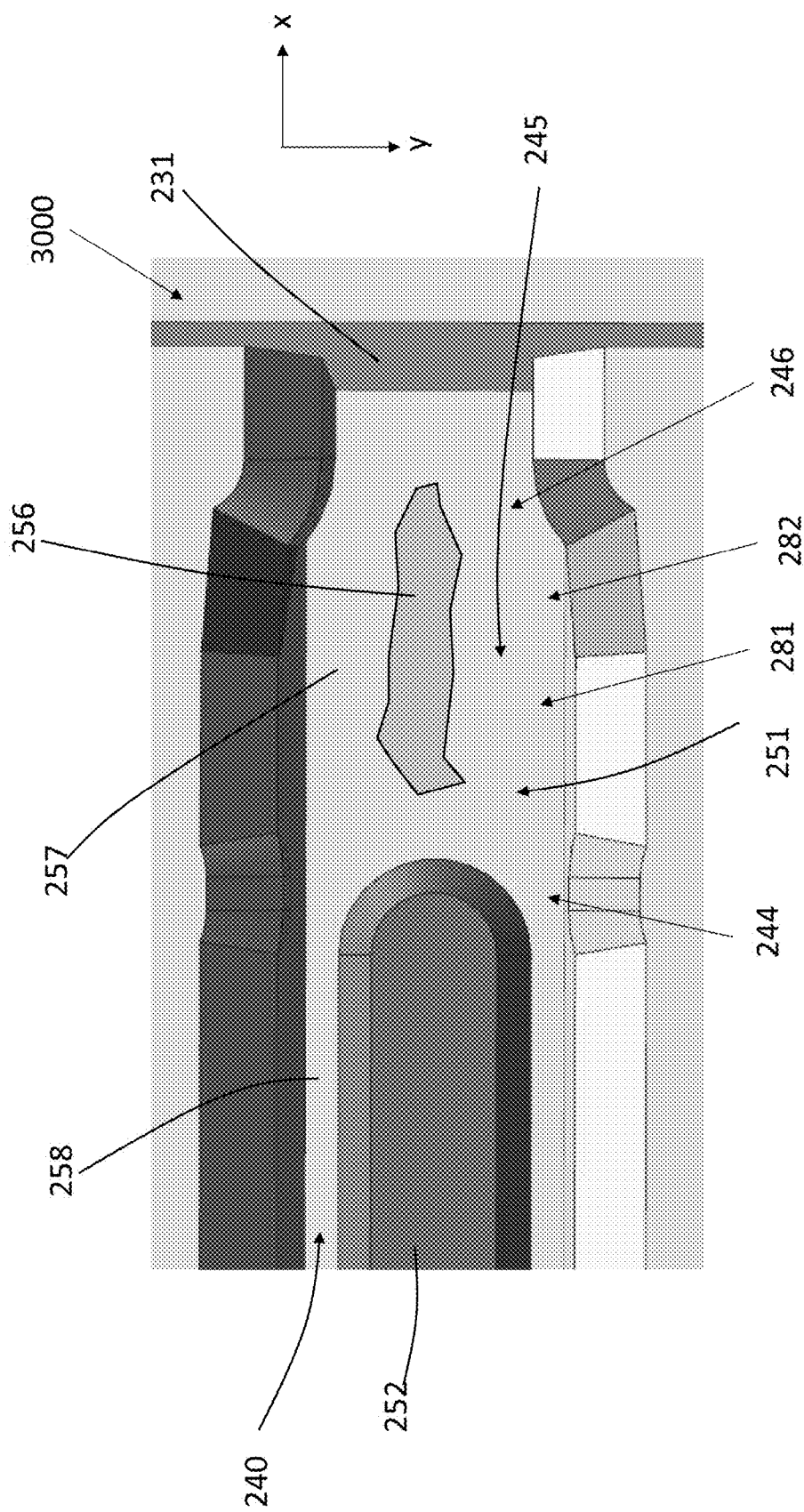
FIG. 20 is a schematic top view of a portion of a light coupling element having a skived portion.

FIG. 20 is a schematic top view of a portion of a light coupling element 3000 illustrating a groove 240 having a bottom surface including a raised bottom surface portion 252 and an unraised bottom surface portion 251. In the illustrated embodiment, the unraised bottom surface portion 251 includes a first unraised portion 257 disposed between the raised bottom surface portion 252 and the back end 231 of the groove 240 and a second unraised portion 258 disposed on each lateral side of the raised bottom surface portion 252. A skived portion 256 extending along the first direction (x-direction) is illustrated. Light coupling element 3000 may correspond to light coupling element 1000 where inserting an optical fiber (not shown in FIG. 20) has resulted in skived portion 256. The groove 240 includes a first pinched region 244 disposed between, and spaced apart from, the front and back 231 ends of the groove 249, and a stop region 246 disposed between, and spaced apart from, the first pinched region 244 and the back end of the groove 231. In some embodiments, the groove 240 further includes a landing region 245 disposed between the first pinched 244 and stop 246 regions of the groove 240 where the landing region 245 includes adjacent first 281 and second 282 portions disposed between the first pinched 244 and stop regions 246. The first portion 281 extends from the first pinched region 244 to the second portion 282 and the second portion 282 extends from the first portion 281 to the stop region 246. In some embodiments (e.g., when an optical waveguide is received in and supported by the groove 240), at least one of the first 281 or second 282 portions of the landing region 245 includes a skived portion 256 extending along the first direction.

FIGS. 21-26 are schematic top views of portions of light coupling elements 4000-9000, respectively, each of which may correspond to light coupling element 1000, or other light coupling elements described herein, except that the geometry of the respective bottom surfaces may differ.

Figure 21:
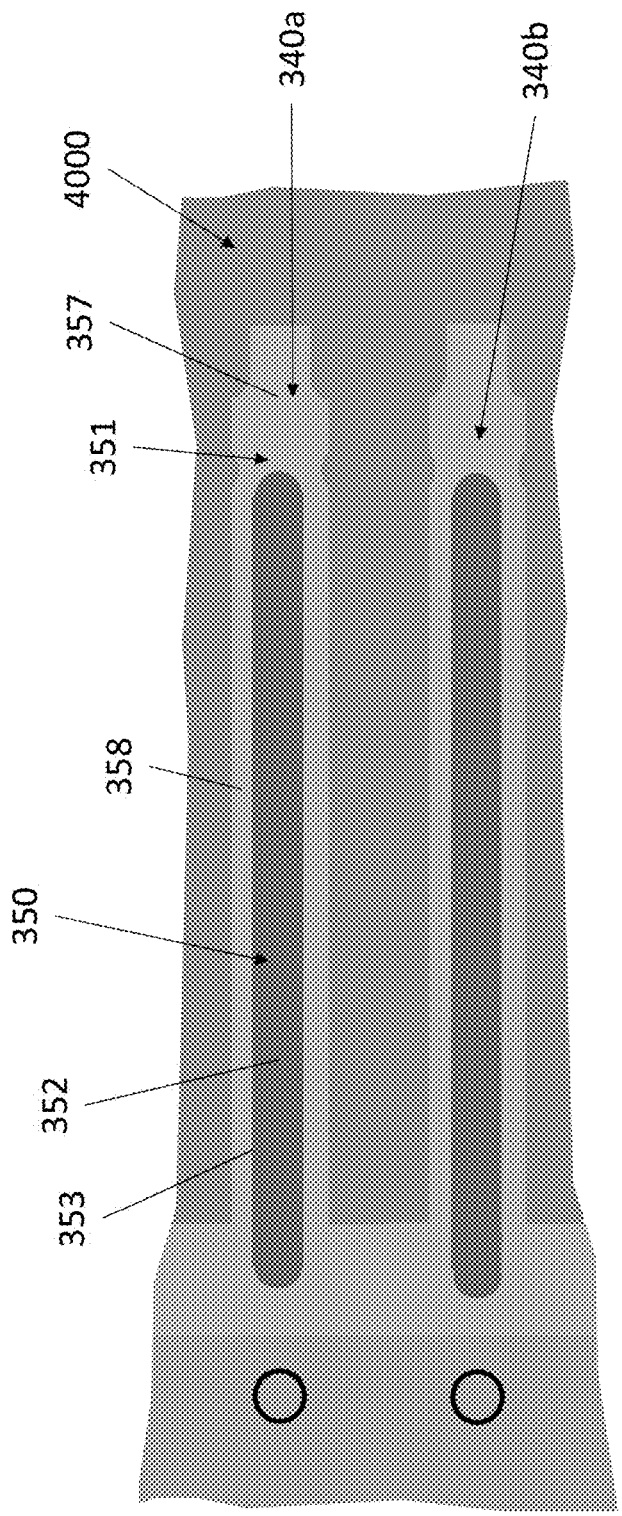
FIGS. 21-26 are schematic top views of portions of light coupling elements.

FIG. 21 schematically illustrates first and second grooves 340a and 340b of light coupling element 4000, each of which has a bottom surface 350 including raised 352 and unraised 351 portions. The unraised portion 351 includes a first unraised portion 357 disposed between the raised bottom surface portion 352 and the back end of the groove and a second unraised portion 358 disposed on each lateral side of the raised bottom portion 352. The unraised bottom surface portion 351 encompasses the entire perimeter 353 of the raised bottom surface portion. The second unraised portion 358 may be included to provide more space for adhesive, for example.

Figure 22:
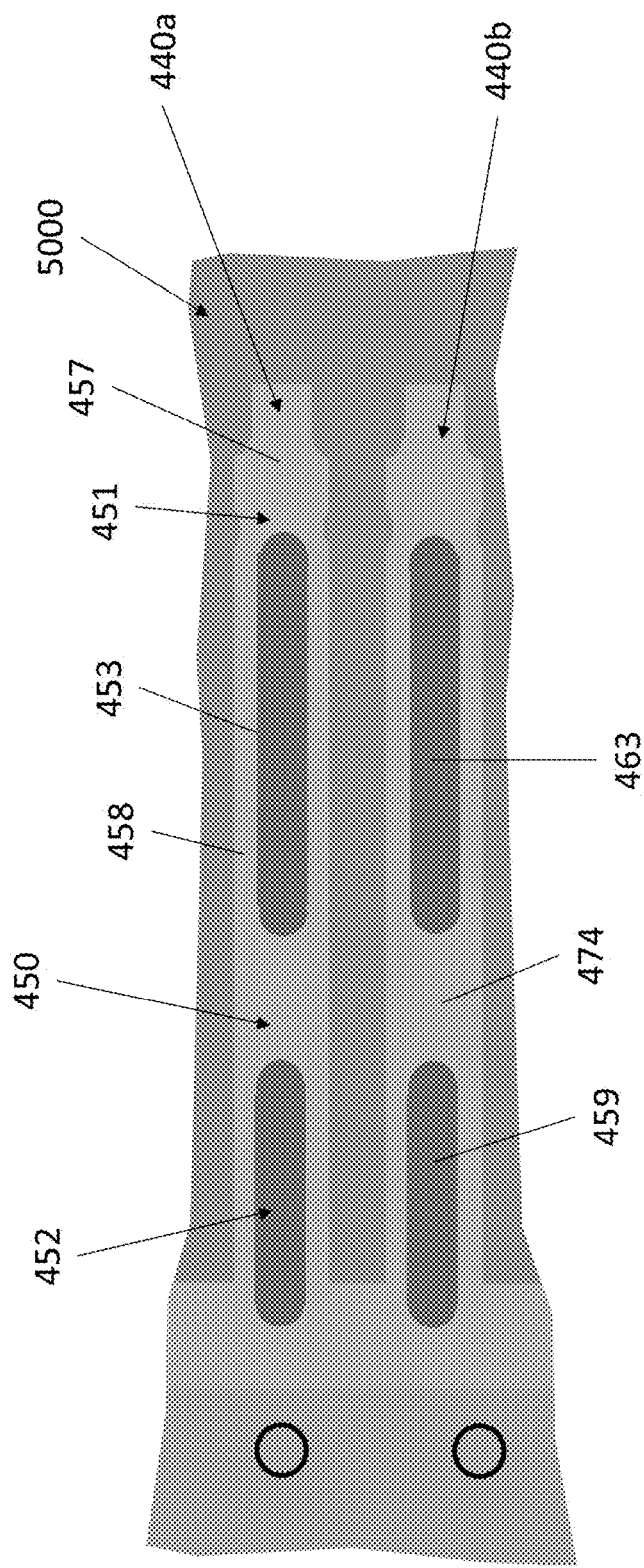

FIG. 22 schematically illustrates first and second grooves 440a and 440b of light coupling element 5000, each of which has a bottom surface 450 including raised 452 and unraised 451 portions. The unraised portion 451 includes a first unraised portion 457 disposed between the raised bottom surface portion 452 and the back end of the groove and a second unraised portion 458 disposed on each lateral side of the raised bottom portion 452. The unraised bottom surface portion 451 encompasses the entire perimeter 453 of the raised bottom surface portion 452. The raised bottom surface portion 452 includes first 459 and second 463 spaced apart raised portions raised upwardly relative to a portion 474 of the bottom surface 450 disposed between the first and second spaced apart portions 459 and 463. The second unraised portion 458 and the unraised portion 474 may be included to provide more space for adhesive, for example.

Figure 23:
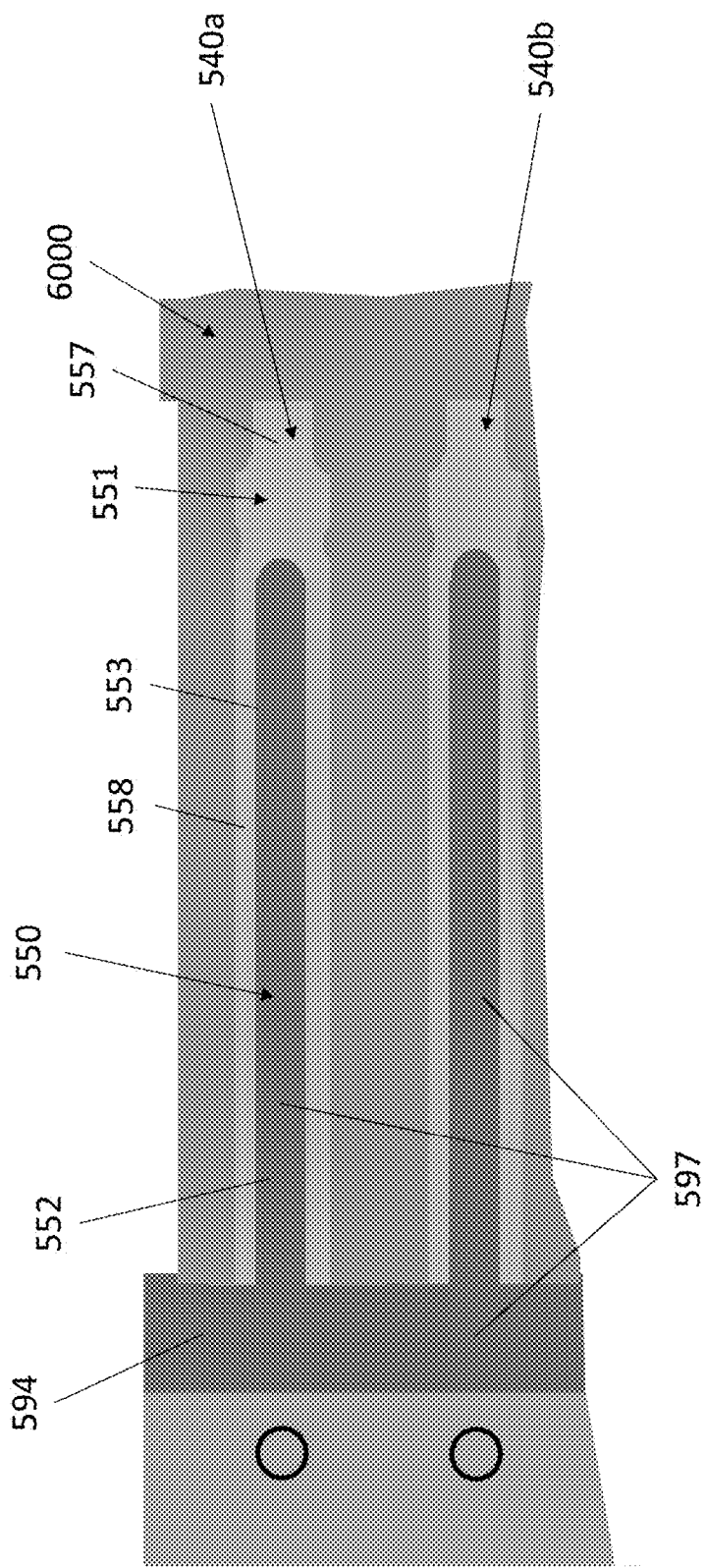

FIG. 23 schematically illustrates first and second grooves 540a and 540b of light coupling element 6000, each of which has a bottom surface 550 including raised 552 and unraised 551 portions. The unraised portion 551 includes a first unraised portion 557 disposed between the raised bottom surface portion 552 and the back end of the groove and a second unraised portion 558 disposed on each lateral side of the raised bottom portion 552. The unraised bottom surface portion 551 encompasses most (e.g., at least 70%), but not all, of the perimeter 553 of the raised bottom surface portion 552.

Figure 24:
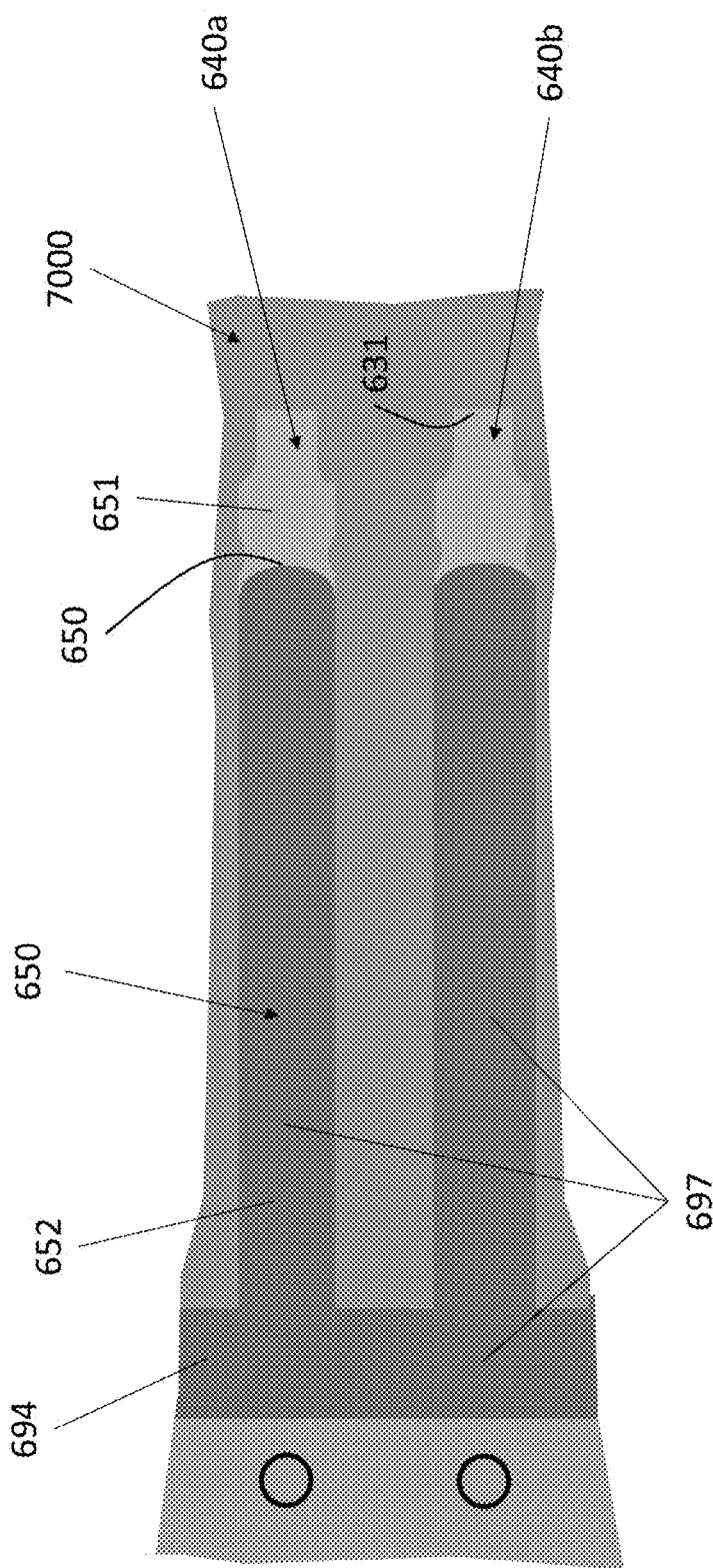

FIG. 24 schematically illustrates first and second grooves 640a and 640b of light coupling element 7000, each of which has a bottom surface 650 including raised 652 and unraised 651 portions. The unraised portion 651 is disposed between the raised bottom surface portion 652 and the back end 631 of the groove. In the illustrated embodiment, no portion of the unraised portion 651 is disposed on any lateral side of the raised bottom portion 652.

In some embodiments, the at least one groove comprises adjacent first and second grooves (e.g., grooves 540a and 540b, or grooves 640a and 640b), the light coupling element further includes a first raised portion (e.g., first raised portion 594 or first raised portion 694) extending between entrance ends of each of the first and second grooves such that a continuous substantially planar top surface (top surface 597 or top surface 697) comprises top surface portions of the first raised portion and of each of the raised bottom surface portions of the first and second grooves.

Figure 25:
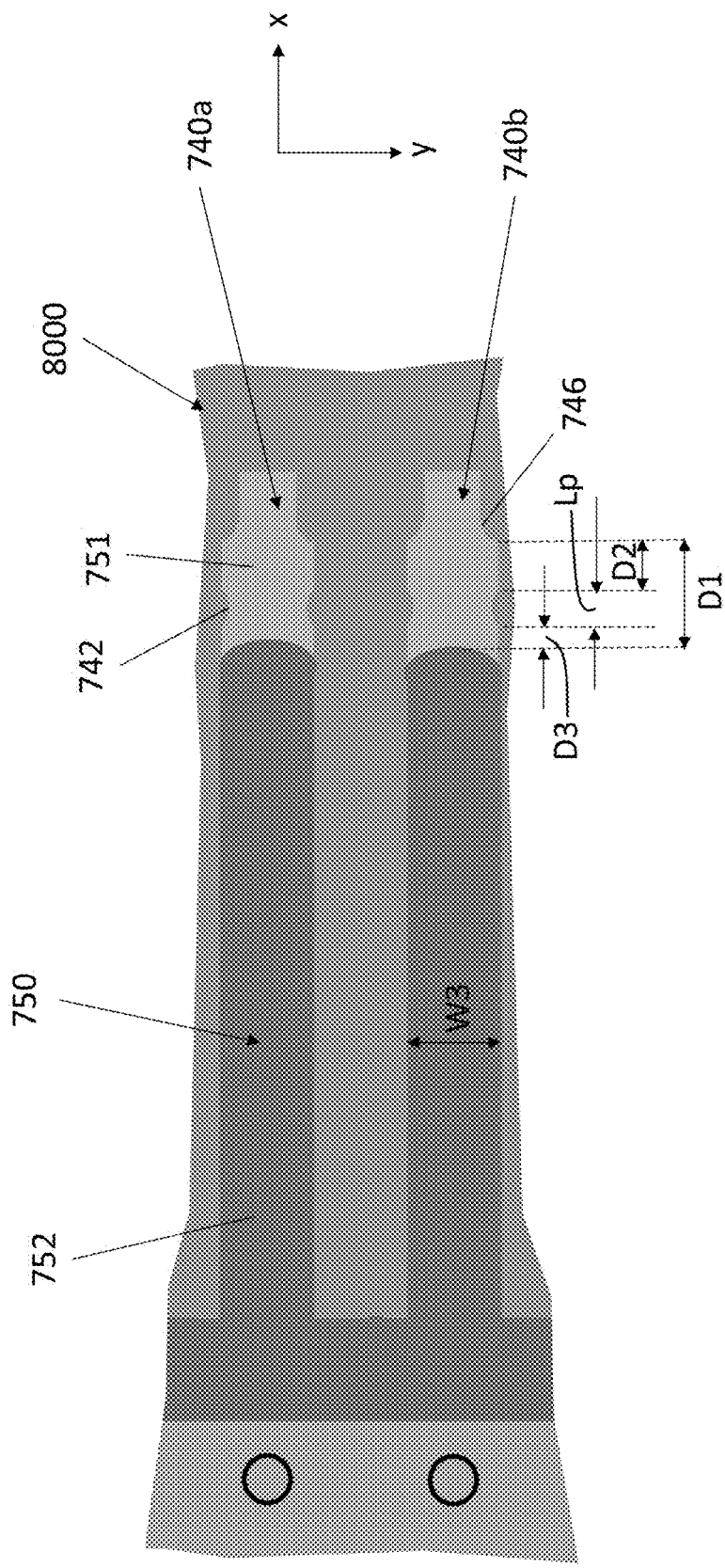

FIG. 25 schematically illustrates first and second grooves 740a and 740b of light coupling element 8000, each of which has a bottom surface 750 including raised 752 and unraised 751 portions, and each of which includes a first pinching region 742 and a stop region 746. A shortest distance along the first direction (x-direction) between the raised bottom surface portion 752 and the stop region 746 is D1, a shortest distance along the first direction between the first pinched region 742 and the stop region is D2, a shortest distance along the first direction between the raised bottom surface portion 752 and the first pinched region 742 is D3, and a length of the first pinched region 742 along the first direction is Lp. It has been found that if D3 is too large, the gap between the portion of the optical fiber over the unraised surface portion 751 can be too imprecisely controlled for some applications. Accordingly, in some embodiments, D3 is no more than 2 times a minimum width W3 of the groove in a support region, or no more than W3, or no more than 0.5W3.

Figure 26:
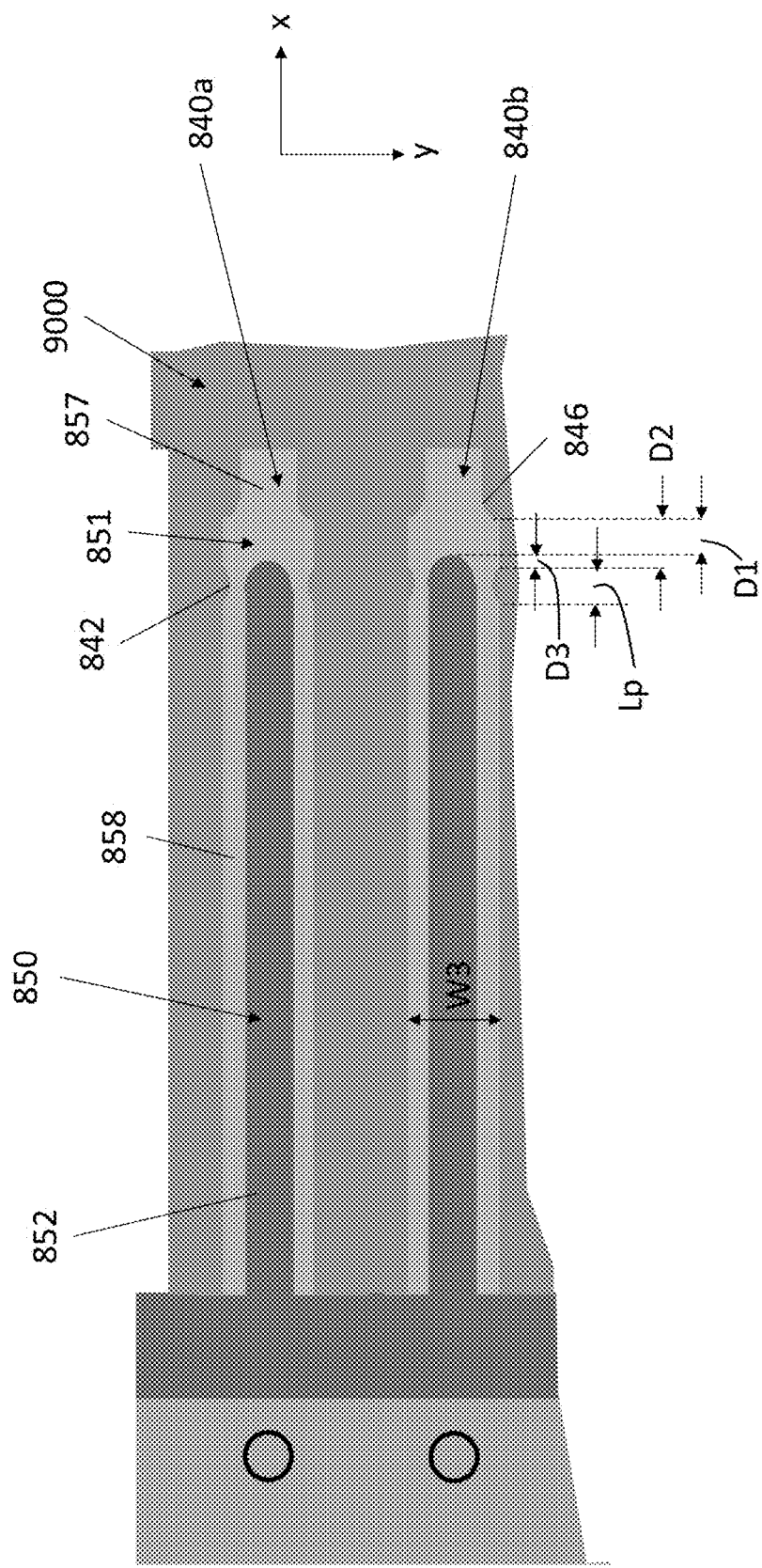

FIG. 26 illustrates first and second grooves 840a and 840b of light coupling element 9000, each of which has a bottom surface 850 including raised 852 and unraised 851 portions, and each of which includes a first pinching region 842 and a stop region 846. A shortest distance along the first direction (x-direction) between the raised bottom surface portion 852 and the stop region 846 is D1, a shortest distance along the first direction between the first pinched region 842 and the stop region is D2, a shortest distance along the first direction between the raised bottom surface portion 852 and the first pinched region 842 is D3, and a length of the first pinched region 842 along the first direction is Lp. It has been found that if D3 is too large, the first pinched portion can be less effective than often desired in centering the optical fiber. Accordingly, in some embodiments, D3 is no more than a minimum width W3 of the groove in a support region, or no more than 0.5W3, or no more than 0.2W3, or no more than 0.4D2, or no more than 0.2D2, or no more than 0.1D2.

In the embodiment illustrated in FIG. 25, D1>D2 and in the embodiment illustrated in FIG. 26, D1<D2. In some embodiments, |D2-D1| is less than 2 times a minimum width W3 of the groove in a support region. In some embodiments, 2W3>D1-D2>-0.5W3, or W3>D1-D2>-0.2W3. In some embodiments, 2W3>D1-D2>-0.2D2, or W3>D1-D2>-0.1D2. In some embodiments, the shortest distance D3 along the first direction between the raised bottom surface portion (e.g., 752 or 852) and the first pinched region (e.g., 742 or 842) is less than the length Lp of the first pinched region (e.g., 742 or 842) along the first direction. For example, D3 depicted in either of FIGS. 25-26 may be less than Lp. In some embodiments, an end of the raised bottom surface portion overlaps the length of the first pinched portion along the first direction and so the shortest distance D3 along the first direction between the raised bottom surface portion and the first pinched region is zero.

Figure 27:
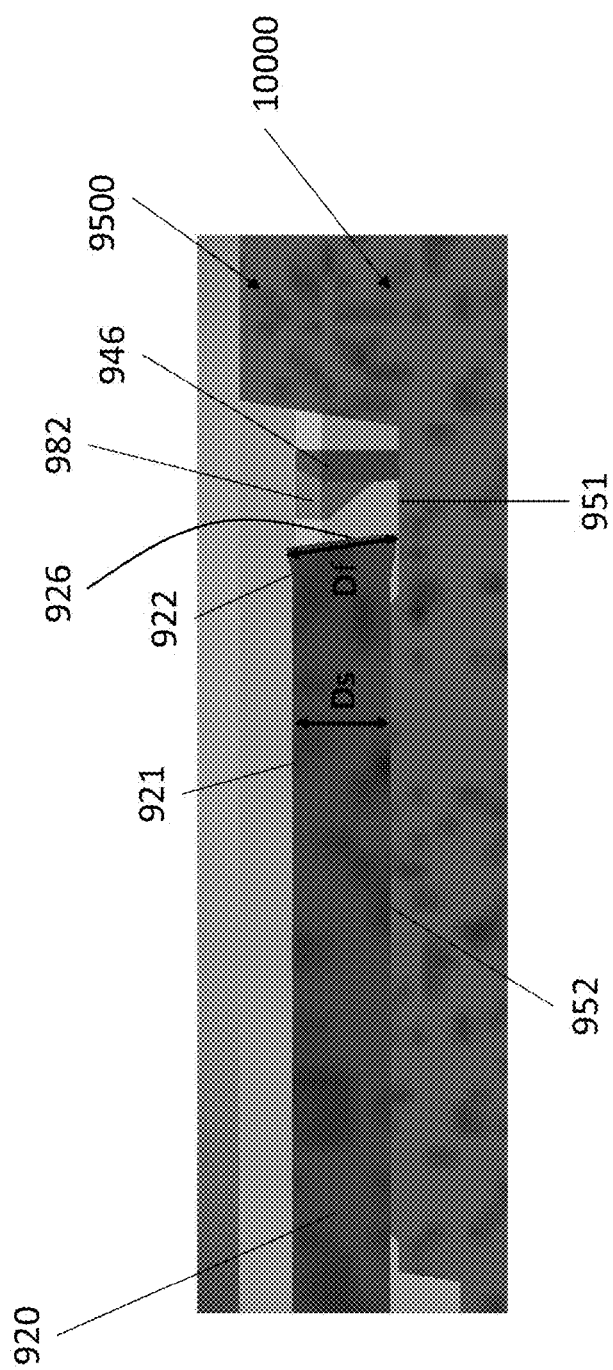
FIG. 27 is a schematic cross-sectional view of a portion of an optical coupling assembly.

In some embodiments, the optical waveguide(s) received and supported by the groove(s) of a light coupling element have been cleaved via a laser. This can give a mushrooming effect resulting in an end face with a larger diameter than an average diameter of the optical waveguide, for example. FIG. 27 is a schematic cross-sectional view of a portion of an optical coupling assembly 9500 including an optical waveguide 920 received in and supported by a groove in a light coupling element 10000 which may correspond to any of the light coupling elements described elsewhere herein. The groove includes a bottom surface having a raised portion 952 and an unraised portion 951, and includes a centering region 982 and a stop region 946. The optical waveguide 920 includes adjacent first and second segments 921 and 922 where a bottom-most portion of the optical waveguide 920 along the first segment 921 rests on and makes physical contact with the bottom surface, and a bottom-most portion of the optical waveguide 920 along the second segment 922 is spaced part from the bottom surface. In some embodiments, the first segment 921 of the optical waveguide 920 has a first diameter Ds, and the end face 926 has a second diameter Df greater than the first diameter Ds. In the illustrated embodiment, the larger diameter Df of the end face 926 does not result in the end face 926 contacting the unraised portion 951.

FIGS. 29-32 illustrate a method of mounting the optical fiber 20 to the light coupling element 1000. The groove includes a bottom surface 50 extending between the entrance and terminal ends of the groove and including a raised bottom surface portion 52 raised upwardly relative to a landing portion. The landing region 45 of the groove includes the landing portion of the bottom surface 50 and is disposed between the raised bottom surface portion 52 and the terminal end 43 of the groove 40. The landing portion of the bottom surface 50 is disposed between the raised bottom surface portion 52 of the bottom surface 50 and the input side 31 of the light redirecting member 30 and is or includes the portion of the unraised bottom surface portion 51 in the landing region 45. In some embodiments, the groove 40 has a first pinched region 44 and the landing region 45 is disposed between the first pinched region 44 and the terminal end 43 of the groove 40, where the minimum width of the groove in the first pinched region 44 is less than a width of the groove in an adjacent portion of the landing region 45.

Figure 29:
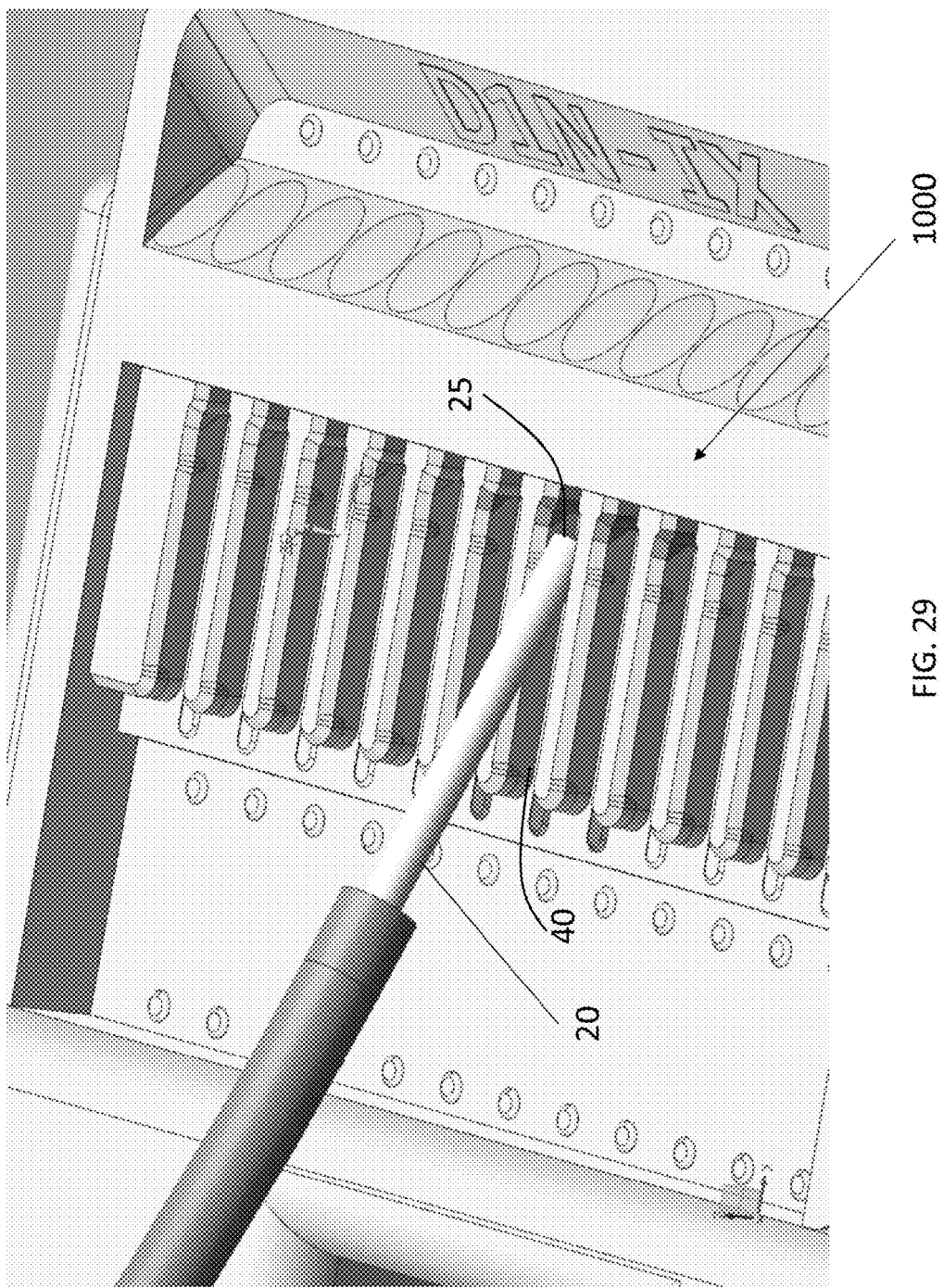
FIG. 29 is a perspective view of an end of an optical fiber inserted into a groove of a light coupling element.
Figure 30:
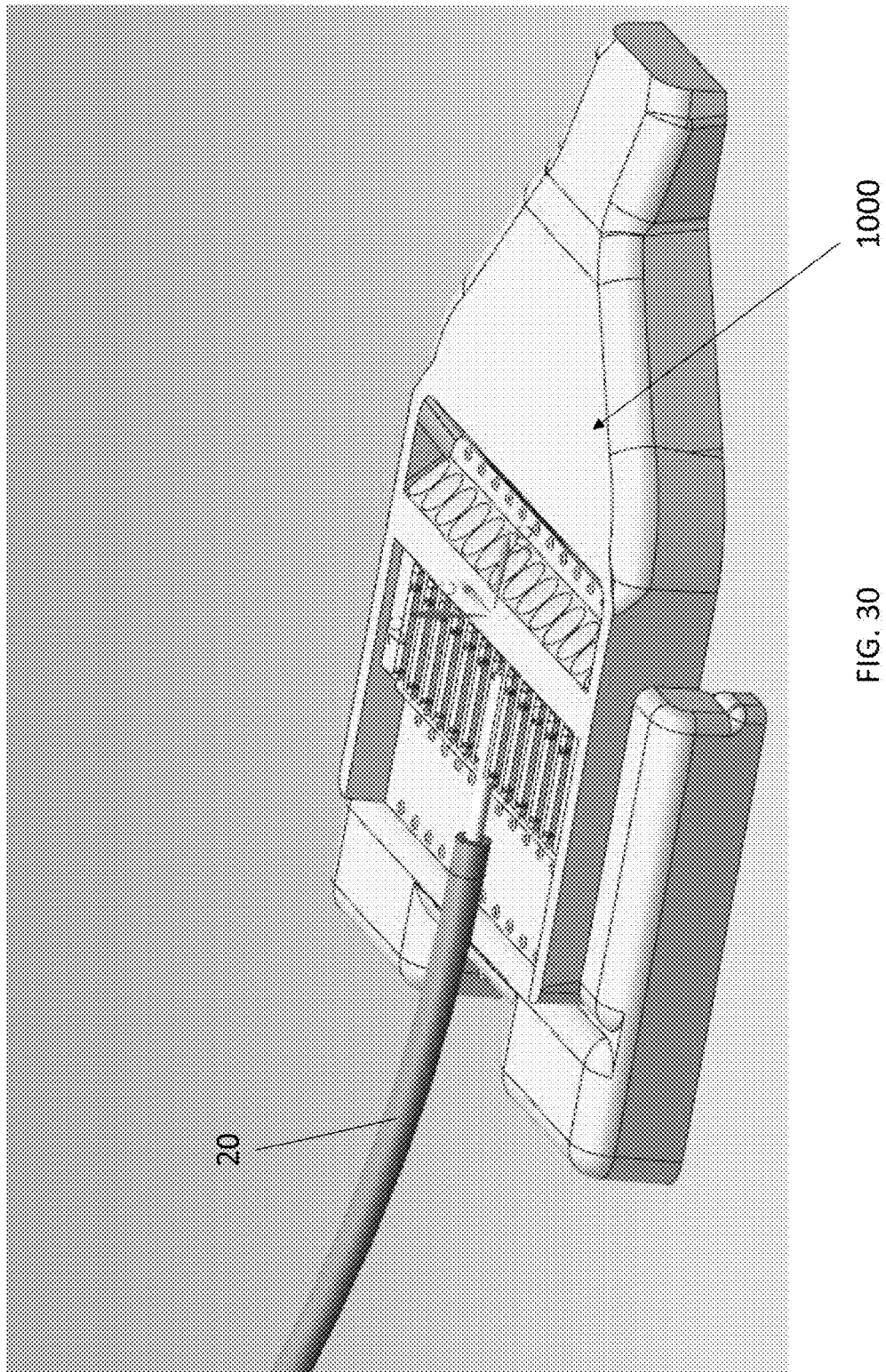
FIG. 30 is a perspective view of a light coupling element with an optical fiber lowered into a groove of the light coupling element.
Figure 31:
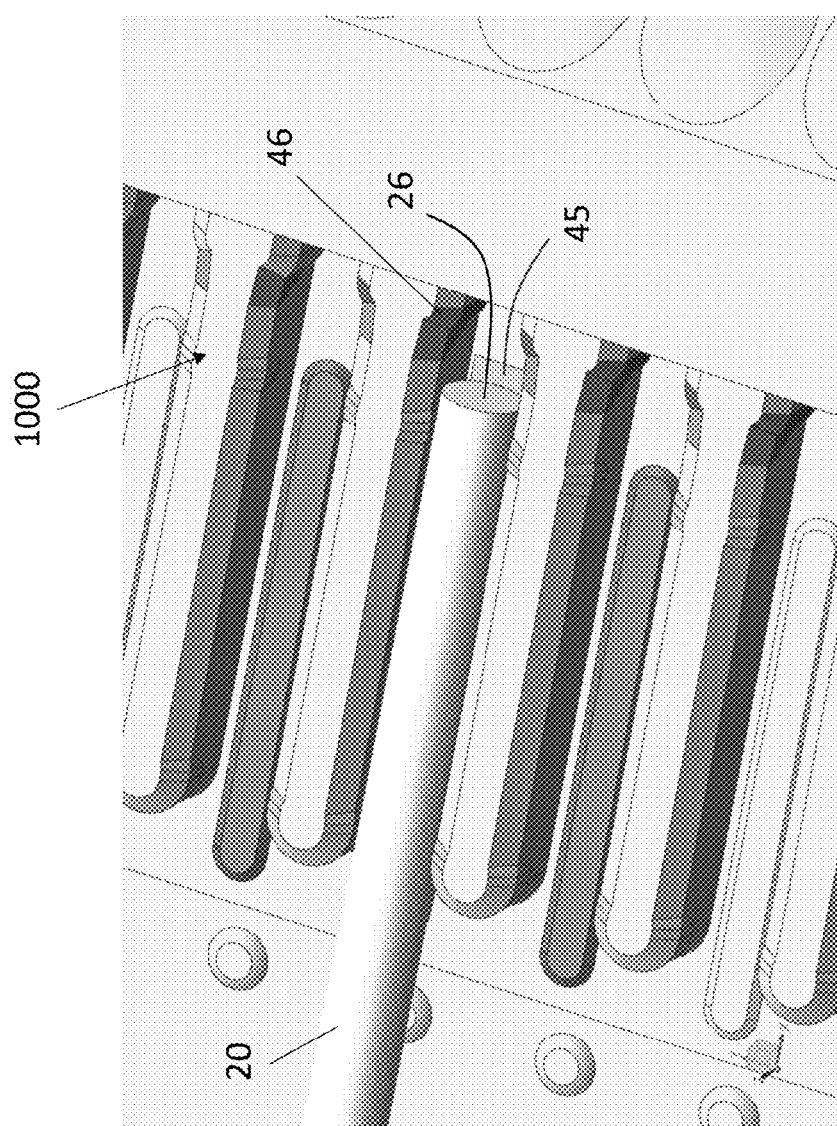
FIG. 31 is a perspective view of a portion of the light coupling element of FIG. 30.
Figure 32:
FIG. 32 is a perspective view of a portion of the light coupling element of FIG. 30 after the optical fiber has been moved into position.

In FIG. 29, an end of the optical fiber is inserted into a groove such that the end makes contact with the landing portion of the bottom surface of the groove. The optical fiber 20 is then lowered into the groove until the optical fiber rests on the raised portion of the bottom surface as illustrated in FIG. 30, which is a perspective view of the light coupling element 1000 and the optical fiber 20, and as illustrated in FIG. 31, which is a perspective view of a portion of the light coupling element 1000 and the optical fiber 20. The optical fiber is then moved along the first direction until the end of the optical fiber contacts the stop region 46 as illustrated in FIG. 32.

In some embodiments, the method includes inserting the optical fiber into the groove such that a portion of the landing region of the groove is skived. In some embodiments, at least one of the inserting an end of the optical fiber step or lowering the optical fiber step includes skiving a portion of the landing portion of the bottom surface. For example, a portion of the landing portion of the bottom surface of the groove in the landing region may be skived by the end of the optical fiber when the end of the optical fiber is inserted into the groove and/or when the optical fiber is lowered into the groove. In some embodiments, the moving the optical fiber step includes skiving a portion of at least one of opposing first and second sidewalls of the groove in the landing region. For example, a portion of at least one of the opposing first and second sidewalls 60 and 70 of the groove in the landing region 45 may be skived by the end of the optical fiber when then optical fiber is moved along the first direction. In some embodiments, a portion of the landing portion of the bottom surface is skived and a portion of the one or both sidewalls is skived.

In some embodiments, inserting the end of the optical fiber into the groove includes disposing the optical fiber such that an axis of the optical fiber proximate the end of the optical fiber makes an oblique angle with the first direction as illustrated in FIG. 29.

In some embodiments, lowering the optical fiber into the groove creates a gap (see, e.g., FIG. 18) between the end of the optical fiber and the landing portion.

Figure 33:
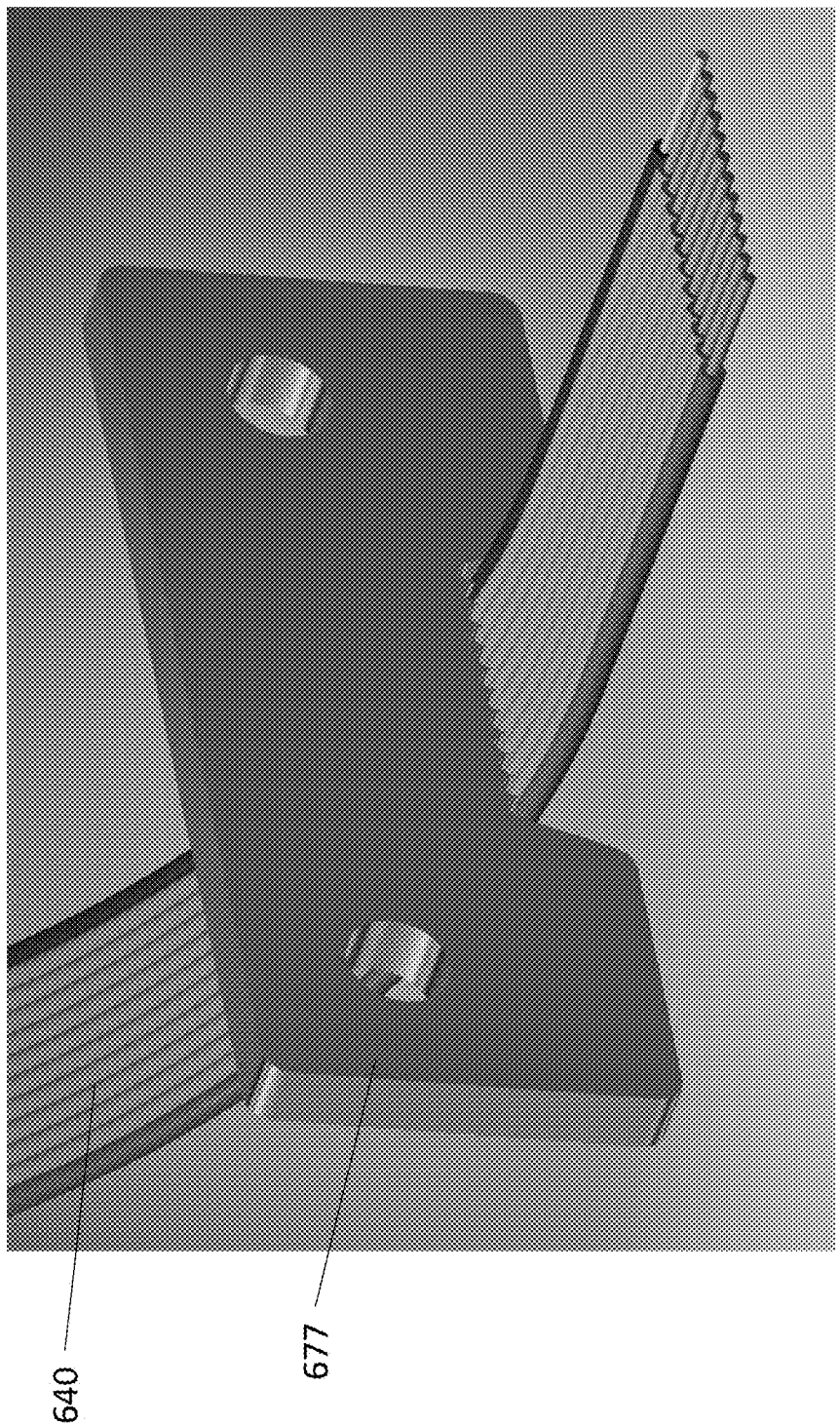
FIG. 33 is a perspective view of a plurality of optical fibers positioned in an alignment comb.

In some embodiments, the groove is a first groove in a plurality of substantially parallel grooves extending along the first direction and arranged along the second direction where the light coupling element 1000 includes the plurality of substantially parallel grooves. In some embodiments, the optical fiber is a first optical fiber in a plurality of optical fibers and the method includes mounting the plurality of optical fibers to the light coupling element 1000. In some embodiments, the method includes positioning the plurality of optical fibers in an alignment comb. This is schematically illustrated in FIG. 33 which is a perspective view of a plurality of optical fibers 640 positioned in alignment comb 677.

In some embodiments, the method includes inserting an end of each optical fiber in the plurality of optical fibers into a corresponding groove in the plurality of grooves such that each end makes contact with a landing portion of the corresponding groove; lowering each optical fiber into the corresponding groove until the optical fiber rests on a raised portion of a bottom surface of the corresponding groove by lowering the alignment comb; and moving each optical fiber along the first direction until the end of the optical fiber contacts a stop region of the corresponding groove. In some embodiments, the method includes inspecting the plurality of optical fibers positioned in the plurality of grooves for interference fringes during at least one of the lowering and moving steps. In some such embodiments, the method further includes adjusting a position of the alignment comb to reduce any observed interference fringes.

FIGS. 34A, 35A, and 36A are a top view of images of a plurality of optical fibers 3440 received in a plurality of grooves of light coupling element 3400 where the images were taken using a microscope with a coaxial white light source viewed in the z-direction. Interference fringes 3447 are visible in FIG. 34A and FIG. 35A. FIGS. 34B, 35B, and 36B are schematic cross-sectional views illustrating the respective positions of an optical fiber 3440 relative to the raised bottom surface portion 3452. In FIGS. 34A and 34B, the back portion of the optical fiber 3440 is separated from the raised bottom surface portion 3452 resulting in the interference fringes 3447 shown in FIG. 34A. In FIGS. 35A and 35B, the front portion of the optical fiber 3440 is separated from the raised bottom surface portion 3452 resulting in the interference fringes 3447 shown in FIG. 35A. In FIGS. 36A and 36B, the optical fiber 3440 is supported by the raised bottom surface portion 3452 over most of the length of the raised bottom surface portion 3452 resulting in a long gray region 3448 with little or substantially no colored interference fringes observed.

By suitable positioning of the optical fibers 3440 (e.g., by adjusting the position of the alignment comb), the interference fringes can be reduced or substantially eliminated indicating that the optical fibers are aligned with the raised bottom surface 3452. It has been found that adjusting the position of the optical fibers to reduce any observed interference fringes allows the optical fibers to be aligned such that a central ray propagating along the optical fiber makes an angle of less than 1 degrees, or less than 0.5 degrees, or less than 0.2 degrees, to a bottom of the groove in at least a portion of the optical fiber disposed in the landing region of the groove. FIG. 35B illustrates a central ray 3449 propagating along the optical fiber 3440 proximate the end face of the optical fiber. The central ray 3449 makes an angle $\delta 1$ to at least one of a bottom of the groove or the first direction (x-direction). In embodiments where the groove has a flat bottom surface portion (e.g., a raised portion or an unraised portion), the angle $\delta 1$ to the bottom of the groove is an angle relative to the flat bottom surface portion. In embodiments where the groove is a V-groove, the angle $\delta 1$ to the bottom of the groove is an angle relative to the bottom of the V-groove. In FIG. 35B, the angle $\delta 1$ may be greater than 2 degrees for example. The corresponding central ray 3449 of FIG. 34A may be directed downward with an angle $\delta 1$ to the bottom of the groove greater than 2 degrees, for example ($\delta 1$ can be understood to be positive for central rays with either an upward or downward component). The corresponding central ray 3449 of FIG. 36B may have an angle $\delta 1$ to the bottom of the groove or to the first direction of less than 1 degrees, or less than 0.5 degrees, or less than 0.2 degrees. A central ray 3499 in a portion of the optical fiber 3440 is illustrated in FIG. 36B. Central ray 3499 may also make an angle of less than 1 degrees, or less than 0.5 degrees, or less than 0.2 degrees to the bottom of the groove or to the first direction.

A central ray 3489 exiting an end face of the optical waveguide 3440 making an angle $\delta 2$ to the bottom of the groove or to the first direction is schematically illustrated in FIG. 35B. $\delta 2$ can be understood to be positive for exiting central rays with either an upward or downward component. The exiting central light ray may make a different angle to the first direction than the central light ray propagating in the optical fiber due to refraction at a cleaved end face, for example. In some embodiments, this difference is minimized by using an index matching adhesive between the end face and the inputs side of the light redirecting element. In some embodiments, a central ray exiting the end face of the optical waveguide makes an angle of less than 1 degree, or less than 0.5 degrees, to the first direction.

In some embodiments, the optical waveguide 3440 has first and second segments (see, e.g., first and second segments 21 and 22) as described further elsewhere herein. In some embodiments, a central ray (e.g., central light ray 3499 of FIG. 36B) propagating along the optical waveguide makes an angle of less than 1 degree, or less than 0.5 degrees or less than 0.2 degrees to a bottom of the groove in at least a portion of the first segment. In some embodiments, a central ray (e.g., central light ray 3449 of FIG. 36B) propagating along the optical waveguide makes an angle of less than 1 degree, or less than 0.5 degrees, or less than 0.2 degrees to the first direction in at least a portion of the second segment. In some embodiments, a central ray (e.g., exiting central ray 3489 of FIG. 36B) exiting the end face of the optical waveguide makes an angle of less than 1 degree, or less than 0.5 degrees to the first direction.

In some embodiments, an optical coupling assembly includes a light coupling element including a plurality of grooves and a plurality of optical waveguides, where each optical waveguide in the plurality of optical waveguides received in and supported by a corresponding groove in the plurality of grooves. In some embodiments, each groove includes first and second pinched regions spaced apart from each other along the first direction and defining a third region therebetween (e.g., first and second pinched regions 44 and 80 and third region 49), as described further elsewhere herein. In some embodiments, for each optical waveguide in the plurality of optical waveguides, a central ray (e.g., central light ray 3499 of FIG. 36B) propagating along the optical waveguide makes an angle of less than 1 degree, or less than 0.5 degrees, or less than 0.2 degrees to a bottom of the groove in at least a portion of the optical waveguide contacting the bottom surface of the grove in at least a portion of the third region adjacent the first pinched region. In some embodiments, for each optical waveguide and corresponding groove, the bottom surface of the groove includes a raised bottom surface portion raised upwardly relative to an unraised bottom surface portion, where the unraised bottom surface portion of the bottom surface disposed between the raised bottom surface portion of the bottom surface and the input side of the light redirecting member and the optical waveguide contacts the raised bottom surface portion over at least a continuous portion of the raised bottom surface including an end of the raised bottom surface portion adjacent the unraised bottom surface portion. In some embodiments, a central ray (e.g., central light ray 3499 of FIG. 36B) propagating along the optical waveguide in the continuous portion makes an angle of less than 1 degree, or less than 0.5 degrees, or less than 0.2 degrees to a bottom of the groove. In some embodiments, for each optical waveguide in the plurality of optical waveguides, a central ray (e.g., central light ray 3499 of FIG. 36B) propagating along the optical waveguide makes an angle of less than 1 degree, or less than 0.5 degrees, or less than 0.2 degrees to the first direction in at least a portion of the optical waveguide disposed between the first pinched region and an end face of the optical waveguide. In some embodiments, for each optical waveguide in the plurality of optical waveguides, a central ray (e.g., exiting central ray 3489 of FIG. 36B) exiting an end face of the optical waveguide makes an angle of less than 1 degree, or less than 0.5 degrees to the first direction.

In some embodiments, light coupling element includes at least one groove including a first pinched region disposed between, and spaced apart from, the front and back ends of the groove; a stop region disposed between, and spaced apart from, the first pinched region and the back end of the groove; and a support region disposed between the front end and first pinched region of the groove as described further elsewhere herein. In some embodiments, an optical waveguide is received in and supported by the at least one groove. In some embodiments, a central ray (e.g., central light ray 3499 of FIG. 36B) propagating along the optical waveguide makes an angle of less than 1 degree, or less than 0.5 degrees, or less than 0.2 degrees to a bottom of the groove in at least a portion of the optical waveguide contacting a bottom surface of the groove in at least a portion of the support region adjacent the first pinched region. In some embodiments, a central ray (e.g., central light ray 3499 of FIG. 36B) propagating along the optical waveguide makes an angle of less than 1 degree, or less than 0.5 degrees, or less than 0.2 degrees to the first direction in at least a portion of the optical waveguide disposed between the first pinched region and an end face of the optical waveguide. In some embodiments, the groove includes a bottom surface extending between the front and back ends of the groove and including a raised bottom surface portion raised upwardly relative to an unraised bottom surface portion, where the unraised bottom surface portion of the bottom surface is disposed between the raised bottom surface portion of the bottom surface and the input side of the light redirecting member, and the optical waveguide contacts the raised bottom surface portion over at least a continuous portion of the raised bottom surface where the continuous portion includes an end of the raised bottom surface portion adjacent the unraised bottom surface portion. In some embodiments, a central ray (e.g., central light ray 3499 of FIG. 36B) propagating along the optical waveguide in the continuous portion makes an angle of less than 1 degree, or less than 0.5 degrees, or less than 0.2 degrees to a bottom of the groove. In some embodiments, a central ray (e.g., exiting central ray 3489 of FIG. 36B) exiting an end face of the optical waveguide makes an angle of less than 1 degree, or less than 0.5 degrees to the first direction.

The following is a list of illustrative embodiments of the present description.

Embodiment A is a light coupling element comprising:
a groove for receiving and supporting an optical waveguide and comprising an open front end and
a back end; and
a light redirecting member comprising:
an input side for receiving light from an optical waveguide received and supported in the groove; and
a light redirecting side for changing a direction of light received from the input side, wherein the groove comprises a bottom surface extending between the front and back ends of the groove and disposed between opposing sidewalls, such that when an optical waveguide is received in and supported by the groove, a bottom-most portion of the optical waveguide along a first segment of the optical waveguide rests on and makes physical contact with the bottom surface, and a bottom-most portion of the optical waveguide along a different second segment of the optical waveguide is disposed above the bottom surface defining a gap therebetween.

Embodiment B is a light coupling element comprising:
a groove for receiving and supporting an optical waveguide and comprising an open front end and
a back end; and
a light redirecting member comprising: an input side for receiving light from an optical waveguide received and supported in the groove; and
a light redirecting side for changing a direction of light received from the input side, wherein the groove comprises a bottom surface extending between the front and back ends of the groove and comprising a raised bottom surface portion raised upwardly relative to an unraised bottom surface portion, the unraised bottom surface portion of the bottom surface disposed between the raised bottom surface portion of the bottom surface and the input side of the light redirecting member.

Embodiment C is the light coupling element of Embodiment B, wherein when an optical waveguide is received in and supported by the groove, a bottom-most portion of the optical waveguide along a first segment of the optical waveguide rests on and makes physical contact with the bottom surface, and a bottom-most portion of the optical waveguide along a different second segment of the optical waveguide is disposed above the bottom surface defining a gap therebetween.

Embodiment D is the light coupling element of Embodiment B or C, wherein the unraised portion of the bottom surface extends from the raised portion of the bottom surface to the input side of the light redirecting member.

Embodiment E is an optical coupling assembly comprising:
a light coupling element comprising:
a groove for receiving and supporting an optical waveguide and comprising an open front end, a back end, and a bottom surface extending between the front and back ends of the groove;
a light redirecting member comprising:
an input side for receiving light from an optical waveguide received and supported in the groove; and
a light redirecting side for changing a direction of light received from the input side; and
an optical waveguide received in and supported by the groove, the optical waveguide having an end face at or near the input side of the light redirecting member, the optical waveguide comprising adjacent first and second segments, the second segment disposed between the first segment and the input side of the light redirecting member and comprising the end face of the optical waveguide, such that a bottom-most portion of the optical waveguide along the first segment of the optical waveguide rests on and makes physical contact with the bottom surface of the groove, and a bottom-most portion of the optical waveguide along the second segment of the optical waveguide is spaced part from the bottom surface defining a gap therebetween.

Embodiment F is a light coupling element comprising:
a groove for receiving and supporting an optical waveguide and comprising an open front end and a back end; and
a light redirecting member comprising:
an input side for receiving light from an optical waveguide received and supported in the groove; and
a light redirecting side for changing a direction of light received from the input side, wherein the groove comprises a bottom surface extending between the front and back ends of the groove and comprising a raised bottom surface portion raised upwardly relative to an unraised bottom surface portion, the unraised bottom surface portion encompassing at least 70% of a perimeter of the raised bottom surface portion.

Embodiment G is a light coupling element comprising:
an attachment area for receiving and permanently attaching to an optical fiber;
a light redirecting member extending from the attachment area and comprising:
an input side for receiving light from an optical waveguide disposed at the attachment area; and
a light redirecting side or changing a direction of light received from the input side; and
a groove formed in the attachment area for receiving an optical waveguide and comprising:
a bottom surface and substantially parallel opposing sidewalls extending upwardly from opposite lateral sides of the bottom surface and defining an open top and an entrance end opposite a terminal end proximate the input side of the light redirecting member, such that in a cross-section of the groove in a plane substantially parallel to the first and second directions, at least one of the opposing sidewalls comprises first and second line segments intersecting one another at a common point, first and second tangent lines tangent to the respective first and second line segments at the common point making an angle therebetween in a range from 95 degrees to 160 degrees.

Embodiment H is the light coupling element of Embodiment G, wherein at least one of the first and second line segments and is curved.

Embodiment I is the light coupling element of Embodiment G or H, wherein the first line segment is substantially straight and the second line segment 62 is curved.

Embodiment J is a light coupling element comprising:
an attachment area for receiving and permanently attaching to an optical waveguide;
a light redirecting member extending from the attachment area and comprising:
an input side for receiving light from an optical waveguide disposed at the attachment area; and
a light redirecting side for changing a direction of light received from the input side; and
a groove formed in the attachment area for receiving an optical waveguide and comprising a bottom surface (50) extending between an entrance end of the groove and an opposite terminal end of the groove proximate the input side of the light redirecting member, the bottom surface comprising a raised portion leaving an unraised portion between the raised portion and the input side, the raised and unraised portions having respective first and second lengths along the groove, the first length greater than the second length, the unraised portion of the bottom surface comprising a skived portion along at least a portion of the second length of the unraised portion on a surface thereof.

Embodiment K is a light coupling element comprising:
a plurality of substantially parallel grooves extending along a first direction and arranged along an orthogonal second direction for receiving and supporting a plurality of optical waveguides; and
a light redirecting member comprising:
an input side for receiving light from an optical waveguide received and supported in a groove in the plurality of the grooves; and
a light redirecting side for changing a direction of light received from the input side, wherein for at least one groove in the plurality of the grooves, the groove comprises:
a bottom surface and opposing sidewalls extending upwardly from opposite lateral sides of the bottom surface and defining an open top and an entrance end opposite a terminal end proximate the input side of the light redirecting member;
first and second pinched regions spaced apart from each other along the first direction and defining a third region therebetween, such that in cross-sections of the first and second pinched regions and the third region in respective first, second and third planes substantially perpendicular to the first direction, each sidewall of the groove comprises first, second and third average draft angles in the respective first, second and third planes, the third average draft angle larger than each of the first and second average draft angles.

Embodiment L is a light coupling element comprising:
a plurality of substantially parallel grooves extending along a first direction and arranged along an orthogonal second direction for receiving and supporting a plurality of optical waveguides, each groove comprising an open front end, and a back end; and
a light redirecting member comprising:
an input side for receiving light from an optical waveguide received and supported in a groove in the plurality of the grooves; and
a light redirecting side for changing a direction of light received from the input side, wherein for at least one groove in the plurality of the grooves, the groove comprises a raised bottom surface portion raised upwardly relative to a substantially planar continuous unraised bottom surface portion substantially parallel to the first and second directions, the substantially planar continuous unraised bottom surface portion comprising a first unraised portion disposed between the raised bottom surface portion and the back end of the groove and a second unraised portion disposed on at least one lateral side of the raised bottom surface portion.

Embodiment M is light coupling element comprising:
a plurality of substantially parallel grooves extending along a first direction and arranged along an orthogonal second direction for receiving and supporting a plurality of optical waveguides, each groove disposed between opposing sidewalls and comprising an open front end and a back end; and
a light redirecting member comprising:
an input side for receiving light from an optical waveguide disposed in a groove in the plurality of the grooves; and
a light redirecting side for changing a direction of light received from the input side, wherein for at least one groove in the plurality of the grooves, the groove comprises immediately adjacent sequentially arranged first and second regions disposed between and spaced apart from the front and back ends of the groove, the second region disposed between the first region and the back end of the groove, such that in a cross-section of the groove in a plane substantially parallel to the first and second directions, a rate of change in a lateral opening of the groove in the second direction as a function of distance from the back end of the groove is greater in the second region than in the first region, wherein at least one of the opposing sidewalls of the groove comprises a skived portion along at least a portion of the sidewall in the first region along the first direction.

Embodiment N is the light coupling element of Embodiment M, wherein the skived portion extends into the second region.

Embodiment O is a light coupling element comprising:
a plurality of substantially parallel grooves extending along a first direction and arranged along an orthogonal second direction for receiving and supporting a plurality of optical waveguides, each groove comprising an open front end, a back end, a width along the second direction and a depth along a third direction orthogonal to the first and second directions; and
a light redirecting member comprising:
an input side for receiving light from an optical waveguide received and supported in a groove in the plurality of the grooves; and
a light redirecting side for changing a direction of light received from the input side, wherein for at least one groove in the plurality of the grooves, the groove comprises:
a first pinched region disposed between, and spaced apart from, the front and back ends of the groove;
a stop region disposed between, and spaced apart from, the first pinched region and the back end of the groove; and
a support region disposed between the front end and first pinched regions of the groove, such that:
in a first cross-section of the groove in a first plane substantially perpendicular to the third direction, a rate of change of the width of the groove along the first direction is greater in the stop region than in the first pinch region; and
in cross-sections of the first pinched and support regions in respective second and third planes substantially perpendicular to the first direction, a rate of change of the width of the groove along the third direction is greater in the support region than in the first pinched region.

Embodiment P is the light coupling element of Embodiment O, such that when an optical waveguide having an average diameter D is received and supported in the groove, in the first cross-section of the groove, a minimum width of the groove in the first pinched region is within about 10% of D, and a minimum width of the groove in the stop region is less than about 0.8D.

Embodiment Q is the light coupling element of Embodiment O or P, wherein for the at least one groove, the groove further comprises a second pinched region at or near the front end of the groove such that the support region of the groove is disposed between the first and second pinched regions of the groove, and in the first cross-section of the groove, a minimum width of the groove in the support region is greater than minimum width of the groove in each of the first and second pinched regions.

Embodiment R is the light coupling element of Embodiment O, P, or Q, wherein for the at least one groove, the groove further comprises a landing region disposed between the first pinched and stop regions of the groove.

Embodiment S is the light coupling element of Embodiment R, wherein the landing region comprises adjacent first and second portions disposed between the first pinched and stop regions, the first portion extending from the first pinched region to the second portion and the second portion extending from the first portion to the stop region, such that in the first cross-section of the groove in the first plane, the rate of change of the width of the groove along the first direction is greater in the second portion than in the first portion.

Embodiment T is the light coupling element of Embodiment S, such that in the first cross-section of the groove in the first plane, the rates of change of the width of the groove in the first portion, the second portion and the stop region are d1 through d3, respectively, d1<d2<d3.

Embodiment U is the light coupling element of Embodiment S or T, wherein at least one of the first or second portions of the landing region comprises a skived portion extending along the first direction.

Embodiment 1 is a light coupling element comprising:
a groove for receiving and aligning an optical waveguide and comprising an open front end and a back end; and
a light redirecting member comprising:
an input side for receiving light from an optical waveguide received and supported in the groove; and a light redirecting side for changing a direction of light received from the input side, wherein the groove comprises a bottom surface extending between the front and back ends of the groove and comprising a raised bottom surface portion raised upwardly relative to an unraised bottom surface portion, the unraised bottom surface portion of the bottom surface disposed between the raised bottom surface portion of the bottom surface and the input side of the light redirecting member.

Embodiment 2 is the light coupling element of Embodiment 1, wherein when an optical waveguide is received in and supported by the groove, a bottom-most portion of the optical waveguide along a first segment of the optical waveguide rests on and makes physical contact with the bottom surface, and a bottom-most portion of the optical waveguide along a different second segment of the optical waveguide is disposed above the bottom surface defining a gap therebetween. Embodiment 3 is the light coupling element of Embodiment 1 or 2, wherein the unraised portion of the bottom surface extends from the raised portion of the bottom surface to the input side of the light redirecting member.

Embodiment 4 is the light coupling element of any one of Embodiments 1 to 3, wherein the raised bottom surface portion is spaced apart from the input side by at least 40 micrometers.

Embodiment 5 is the light coupling element of any one of Embodiments 1 to 4, wherein the unraised bottom surface portion comprises a skived portion.

Embodiment 6 is the light coupling element of any one of Embodiments 1 to 5, wherein the raised bottom surface portion comprises first and second spaced apart raised portions raised upwardly relative to a portion of the bottom surface disposed between the first and second spaced apart raised portions.

Embodiment 7 is the light coupling element of any one of Embodiments 1 to 6, wherein an upper surface of the raised bottom surface portion is substantially planar.

Embodiment 8 is the light coupling element of any one of Embodiments 1 to 7, wherein the light redirecting member comprises one or more lenses.

Embodiment 9 is the light coupling element of any one of Embodiments 1 to 8 being a unitary construction.

Embodiment 10 is the light coupling element of any one of Embodiments 1 to 9, wherein the groove is a first groove in a plurality of substantially parallel grooves extending along a first direction and arranged along an orthogonal second direction for receiving and aligning a plurality of optical waveguides.

Embodiment 11 is the light coupling element of any one of Embodiments 1 to 10, wherein the groove extends along a first direction and comprises:

a first pinched region disposed between, and spaced apart from, the front and back ends of the groove; and
a support region disposed between the front end of the groove and the first pinched region, a minimum width of the groove in the first pinched region being less than a minimum width of the groove in the support region.

Embodiment 12 is the light coupling element of Embodiment 11, wherein a shortest distance along the first direction between the raised bottom surface portion and the first pinched region is less than a length of the first pinched region along the first direction.

Embodiment 13 is the light coupling element of Embodiment 11 or 12, wherein the groove further comprises a stop region disposed between, and spaced apart from, the first pinched region and the back end of the groove, a minimum width of the groove in the stop region less than a minimum width of the groove in the first pinched region.

Embodiment 14 is the light coupling element of Embodiment 13, wherein a shortest distance along the first direction between the raised bottom surface portion and the stop region is D1, a shortest distance along the first direction between the first pinched region and the stop region is D2, and |D2−D1| is less than 2 times a minimum width W3 of the groove in the support region.

Embodiment 15 is the light coupling element of Embodiment 14, wherein 2W3>D1−D2>−0.5W3.

Embodiment 16 is the light coupling element of Embodiment 14, wherein W3>D1−D2>−0.2W3.

Embodiment 17 is the light coupling element of Embodiment 14, wherein 2W3>D1−D2>−0.2D2.

Embodiment 18 is the light coupling element of Embodiment 14, wherein W3>D1−D2>−0.1D2.

Embodiment 19 is an optical coupling assembly comprising:
a light coupling element comprising:
   a groove for receiving and aligning an optical waveguide and comprising an open front end, a back end, and a bottom surface extending between the front and back ends of the groove;
a light redirecting member comprising:
   an input side for receiving light from an optical waveguide received and supported in the groove; and
   a light redirecting side for changing a direction of light received from the input side; and an optical waveguide received in and supported by the groove, the optical waveguide having an end face at or near the input side of the light redirecting member, the optical waveguide comprising adjacent first and second segments, the second segment disposed between the first segment and the input side of the light redirecting member and comprising the end face of the optical waveguide, such that a bottom-most portion of the optical waveguide along the first segment of the optical waveguide rests on and makes physical contact with the bottom surface of the groove, and a bottom-most portion of the optical waveguide along the second segment of the optical waveguide is spaced part from the bottom surface defining a gap therebetween.

Embodiment 20 is the optical coupling assembly of Embodiment 19, wherein the first segment of the optical waveguide has a first diameter, and the end face has a second diameter greater than the first diameter.

Embodiment 21 is the optical coupling assembly of Embodiment 19 or 20, wherein the gap is at least partially filled with an adhesive.

Embodiment 22 is the optical coupling assembly of any one of Embodiments 19 to 21, wherein the bottom surface comprises a raised bottom surface portion raised upwardly relative to an unraised bottom surface portion, the unraised bottom surface portion of the bottom surface disposed between the raised bottom surface portion of the bottom surface and the input side of the light redirecting member.

Embodiment 23 is the optical coupling assembly of any one of Embodiments 19 to 22, wherein the groove further comprises opposing first and second sidewalls extending upwardly from opposite lateral sides of the bottom surface.

Embodiment 24 is the optical coupling assembly of Embodiment 23, wherein the groove comprises at least one skived portion formed when the optical waveguide skives at least one of the bottom surface or the first or the second sidewall while being received in and supported by the groove.

Embodiment 25 is the optical coupling assembly of any one of Embodiments 19 to 24 such that a central ray propagating along the optical waveguide makes an angle of less than 1 degree, or less than 0.5 degrees, or less than 0.2 degrees to a bottom of the groove in at least a portion of the first segment.

Embodiment 26 is the optical coupling assembly of any one of Embodiments 19 to 25 such that a central ray propagating along the optical waveguide makes an angle of less than 1 degree, or less than 0.5 degrees, or less than 0.2 degrees to the first direction in at least a portion of the second segment.

Embodiment 27 is the optical coupling assembly of any one of Embodiments 19 to 26, wherein a central ray exiting the end face of the optical waveguide makes an angle of less than 1 degree, or less than 0.5 degrees to the first direction.

Embodiment 28 is the optical coupling assembly of any one of Embodiments 19 to 27, wherein the groove is a first groove in a plurality of substantially parallel grooves extending in a first direction and arranged in an orthogonal second direction, and the optical waveguide is a first optical waveguide in a plurality of optical waveguides, each optical waveguide in the plurality of optical waveguides received in and supported by a corresponding groove in the plurality of grooves.

Embodiment 29 is the light coupling element of any one of Embodiments 1 to 18 or the optical coupling assembly of any one of Embodiments 19 to 28, wherein the groove further comprises:
   a stop region proximate the input side of the light redirecting member;
   a centering region adjacent the stop region opposite the input side of the light redirecting member; and
   a support region between the front end and the centering region, the width of the groove in at least a portion of the centering region and in at least a portion of the stop region being less than the width of the groove in at least a portion of the support region, wherein the width of the groove in the centering region decreases in a first direction from the front end to the back end at a first rate and the width of the groove in at least a portion of the stop region decreases in the first direction at a second rate greater than the first rate.

Embodiment 30 is the light coupling element of any one of Embodiments 1 to 18 or the optical coupling assembly of any one of Embodiments 19 to 28, wherein the groove comprises first and second pinched regions spaced apart from each other along a first direction from the front end to the back end and defining a third region therebetween, such that a minimum width of the groove in each of the first and second pinched regions is less than a minimum width of the groove in the third region.

Embodiment 31 is a light coupling element comprising:
an attachment area for receiving and permanently attaching to an optical fiber;
a light redirecting member extending from the attachment area and comprising:
an input side for receiving light from an optical fiber disposed at the attachment area;
a light redirecting side for receiving light from the input side and changing a direction of the light received from the input side; and
a groove formed in the attachment area for receiving an optical fiber and extending in a first direction from an entrance end to an opposite terminal end proximate the input side of the light redirecting member, the groove comprising:
a bottom surface and opposing sidewalls extending upwardly from opposite lateral sides of the bottom surface and defining a width of the groove and an open top;
a stop region proximate the input side of the light redirecting member;
a centering region adjacent the stop region opposite the input side of the light redirecting member; and
a support region between the entrance end and the centering region, the width of the groove in at least a portion of the centering region and in at least a portion of the stop region being less than the width of the groove in at least a portion of the support region, wherein the width of the groove in the centering region decreases in the first direction at a first rate and the width of the groove in at least a portion of the stop region decreases in the first direction at a second rate greater than the first rate.

Embodiment 32 is the light coupling element of Embodiment 31, such that when an optical fiber having an average diameter D is received and supported in the groove, the width of the groove in at least a portion of the stop region is less than D.

Embodiment 33 is the light coupling element of Embodiment 31, such that when an optical fiber having an average diameter D is received and supported in the groove, the width of the groove in at least a portion of the centering region and in at least a portion of the stop region is less than D.

Embodiment 34 is the light coupling element of any one of Embodiments 31 to 33, such that when an optical fiber having an average diameter D is received and supported in the groove, a minimum width of the groove in the support region is in a range of D to 1.1D, and a minimum width of the groove in the stop region is less than about 0.8D.

Embodiment 35 is the light coupling element of any one of Embodiments 31 to 34, wherein a minimum width of the groove in the stop region is less than a minimum width of the groove in the centering region, and the minimum width of the groove in the centering region is less than a minimum width of the groove in the support region.

Embodiment 36 is the light coupling element of any one of Embodiments 31 to 35, wherein the width of the groove in the stop region decreases sublinearly along the first direction.

Embodiment 37 is the light coupling element of any one of Embodiments 31 to 36, wherein at least one of the sidewalls in the centering region comprises a skived portion.

Embodiment 38 is the light coupling element of any one of Embodiments 31 to 37, wherein each of the sidewalls in the centering region comprises a skived portion.

Embodiment 39 is the light coupling element of any one of Embodiments 31 to 38, wherein the groove further comprises a first pinched region disposed between the support region and the centering region, a minimum width of the groove in the first pinched region being less than a minimum width of the groove in the support region.

Embodiment 40 is the light coupling element of Embodiment 39, wherein when an optical fiber is received and supported in the groove, the optical fiber touches, at most, one of the sidewalls in the first pinched region.

Embodiment 41 is the light coupling element of any one of Embodiments 31 to 40, wherein when an optical fiber is received and supported in the groove, the optical fiber touches both of the sidewalls in the stop region.

Embodiment 42 is a light coupling element comprising:
a plurality of substantially parallel grooves extending along a first direction and arranged along an orthogonal second direction for receiving and aligning a plurality of optical waveguides; and
a light redirecting member comprising:
an input side for receiving light from an optical waveguide received and supported in a groove in the plurality of the grooves; and
a light redirecting side for changing a direction of light received from the input side, wherein for at least one groove in the plurality of the grooves, the groove comprises:
a bottom surface and opposing sidewalls extending upwardly from opposite lateral sides of the bottom surface and defining a width of the groove and an open top and an entrance end opposite a terminal end proximate the input side of the light redirecting member;
first and second pinched regions spaced apart from each other along the first direction and defining a third region therebetween, such that a minimum width of the groove in each of the first and second pinched regions is less than a minimum width of the groove in the third region.

Embodiment 43 is the light coupling element of Embodiment 42, wherein each sidewall has a draft angle at the corresponding lateral side of the bottom surface that is greater in each of the first and second pinched regions than in the third region.

Embodiment 44 is the light coupling element of Embodiment 42 or 43, wherein for the at least one groove in the plurality of the grooves, the bottom surface comprises a raised bottom surface portion raised upwardly relative to an unraised bottom surface portion.

Embodiment 45 is the light coupling element of Embodiment 44, wherein the unraised bottom surface portion of the bottom surface is disposed between the raised bottom surface portion of the bottom surface and the input side of the light redirecting member.

Embodiment 46 is the light coupling element of Embodiment 44, wherein the unraised bottom surface portion comprising a first unraised portion disposed between the raised bottom surface portion and the input side of the light redirecting member and a second unraised portion disposed on at least one lateral side of the raised bottom surface portion.

Embodiment 47 is the light coupling element of Embodiment 46, wherein the unraised bottom surface portion encompasses at least 70% of a perimeter of the raised bottom surface portion.

Embodiment 48 is the light coupling element of any one of Embodiments 44 to 47, wherein the at least one groove comprises adjacent first and second grooves, the light coupling element further comprising a first raised portion extending between entrance ends of each of the first and second grooves such that a continuous substantially planar top surface comprises top surface portions of the first raised portion and of each of the raised bottom surface portions of the first and second grooves.

Embodiment 49 is an optical coupling assembly comprising the light coupling element of any one of Embodiments 42 to 48 and a plurality of optical waveguides, each optical waveguide in the plurality of optical waveguides received in and supported by a corresponding groove in the plurality of grooves.

Embodiment 50 is the optical coupling assembly of Embodiment 49, wherein for each optical waveguide in the plurality of optical waveguides, a central ray propagating along the optical waveguide makes an angle of less than 1 degree, or less than 0.5 degrees, or less than 0.2 degrees to a bottom of the groove in at least a portion of the optical waveguide contacting the bottom surface of the grove in at least a portion of the third region adjacent the first pinched region.

Embodiment 51 is the optical coupling assembly of Embodiment 49 or 50, wherein for each optical waveguide and corresponding groove, the bottom surface of the groove comprises a raised bottom surface portion raised upwardly relative to an unraised bottom surface portion, the unraised bottom surface portion of the bottom surface disposed between the raised bottom surface portion of the bottom surface and the input side of the light redirecting member, the optical waveguide contacting the raised bottom surface portion over at least a continuous portion of the raised bottom surface comprising an end of the raised bottom surface portion adjacent the unraised bottom surface portion, wherein a central ray propagating along the optical waveguide in the continuous portion makes an angle of less than 1 degree, or less than 0.5 degrees, or less than 0.2 degrees to a bottom of the groove.

Embodiment 52 is the optical coupling assembly of any one of Embodiments 49 to 51, wherein for each optical waveguide in the plurality of optical waveguides, a central ray propagating along the optical waveguide makes an angle of less than 1 degree, or less than 0.5 degrees, or less than 0.2 degrees to the first direction in at least a portion of the optical waveguide disposed between the first pinched region and an end face of the optical waveguide.

Embodiment 53 is the optical coupling assembly of any one of Embodiments 49 to 52, wherein for each optical waveguide in the plurality of optical waveguides, a central ray exiting an end face of the optical waveguide makes an angle of less than 1 degree, or less than 0.5 degrees to the first direction.

Embodiment 54 is the optical coupling assembly of any one of Embodiments 49 to 53, wherein at least one skived portion is formed in at least one groove in the plurality of grooves when a corresponding optical waveguide skives at least one of the first or second portions of the landing region while being received in and supported by the at least one groove.

Embodiment 55 is a light coupling element comprising: a plurality of substantially parallel grooves extending along a first direction and arranged along an orthogonal second direction for receiving and aligning a plurality of optical waveguides, each groove comprising an open front end, a back end, a width along the second direction and a depth along a third direction orthogonal to the first and second directions; and a light redirecting member comprising:
an input side for receiving light from an optical waveguide received and supported in a groove in the plurality of the grooves; and
a light redirecting side for changing a direction of light received from the input side, wherein for at least one groove in the plurality of the grooves, the groove comprises:
a first pinched region disposed between, and spaced apart from, the front and back ends of the groove;
a stop region disposed between, and spaced apart from, the first pinched region and the back end of the groove; and
a support region disposed between the front end and first pinched region of the groove, such that: a rate of change of the width of the groove along the first direction is greater in the stop region than in the first pinched region, and a minimum width of the groove in the first pinched region is less than a minimum width of the groove in the support region.

Embodiment 56 is the light coupling element of Embodiment 55, wherein for the at least one groove, the groove further comprises a bottom surface and opposing sidewalls extending upwardly from opposite lateral sides of the bottom surface, each sidewall having a draft angle at the corresponding lateral side of the bottom surface that is greater in the support region than in the first pinched region.

Embodiment 57 is the light coupling element of Embodiment 55 or 56, such that when an optical waveguide having an average diameter D is received and supported in the groove, the minimum width of the groove in the first pinched region is in a range of D to 1.1D, and a minimum width of the groove in the stop region is less than about 0.8D.

Embodiment 58 is the light coupling element of Embodiment 57, wherein the minimum width of the groove in the first pinched region is greater than D.

Embodiment 59 is the light coupling element of any one of Embodiments 55 to 58, wherein for the at least one groove, the groove further comprises a second pinched region having a minimum width and disposed at or near the front end of the groove such that the support region of the groove is disposed between the first and second pinched regions of the groove, and the minimum width of the groove in the support region is greater than the minimum width of the groove in each of the first and second pinched regions.

Embodiment 60 is the light coupling element of any one of Embodiments 55 to 60, wherein for the at least one groove, the groove further comprises a landing region disposed between the first pinched and stop regions of the groove.

Embodiment 61 is the light coupling element of Embodiment 60, wherein the landing region comprises adjacent first and second portions disposed between the first pinched and stop regions, the first portion extending from the first pinched region to the second portion and the second portion extending from the first portion to the stop region, such that the rate of change of the width of the groove along the first direction is greater in the second portion than in the first portion.

Embodiment 62 is the light coupling element of Embodiment 61, such that the rates of change of the width of the groove in the first portion, the second portion and the stop region are d1 through d3, respectively, d1<d2<d3.

Embodiment 63 is the light coupling element of Embodiment 61 or 62, wherein at least one of the first or second portions of the landing region comprises at least one skived portion extending along the first direction.

Embodiment 64 is an optical coupling assembly comprising the light coupling element of Embodiment 63 and an optical waveguide received in and supported by the at least one groove, wherein the at least one skived portion is formed when the optical waveguide skives at least one of the first or second portions of the landing region while being received in and supported by the at least one groove.

Embodiment 65 is the optical coupling assembly of Embodiment 64, wherein for the at least one groove, the groove further comprises a bottom surface and opposing sidewalls extending upwardly from opposite lateral sides of the bottom surface, the at least one skived portion comprising a skived portion of at least one sidewall.

Embodiment 66 is the optical coupling assembly of Embodiment 64 or 65, wherein for the at least one groove, the groove further comprises a bottom surface, the at least one skived portion comprising a skived portion of the bottom surface.

Embodiment 67 is an optical coupling assembly comprising the light coupling element of any one of Embodiments 55 to 63 and an optical waveguide received in and supported by the at least one groove, wherein a central ray propagating along the optical waveguide makes an angle of less than 1 degree, or less than 0.5 degrees, or less than 0.2 degrees to a bottom of the groove in at least a portion of the optical waveguide contacting a bottom surface of the groove in at least a portion of the support region adjacent the first pinched region.

Embodiment 68 is an optical coupling assembly comprising the light coupling element of any one of Embodiments 55 to 63 and an optical waveguide received in and supported by the at least one groove, wherein a central ray propagating along the optical waveguide makes an angle of less than 1 degree, or less than 0.5 degrees, or less than 0.2 degrees to the first direction in at least a portion of the optical waveguide disposed between the first pinched region and an end face of the optical waveguide.

Embodiment 69 is an optical coupling assembly comprising the light coupling element of any one of Embodiments 55 to 63 and an optical waveguide received in and supported by a groove in the at least one groove, the groove comprising a bottom surface extending between the front and back ends of the groove and comprising a raised bottom surface portion raised upwardly relative to an unraised bottom surface portion, the unraised bottom surface portion of the bottom surface disposed between the raised bottom surface portion of the bottom surface and the input side of the light redirecting member, the optical waveguide contacting the raised bottom surface portion over at least a continuous portion of the raised bottom surface comprising an end of the raised bottom surface portion adjacent the unraised bottom surface portion, wherein a central ray propagating along the optical waveguide in the continuous portion makes an angle of less than 1 degree, or less than 0.5 degrees, or less than 0.2 degrees to a bottom of the groove.

Embodiment 70 is an optical coupling assembly comprising the light coupling element of any one of Embodiments 55 to 63 and an optical waveguide received in and supported by the at least one groove, wherein a central ray exiting an end face of the optical waveguide makes an angle of less than 1 degree, or less than 0.5 degrees to the first direction.

Embodiment 71 is the light coupling element of any one of Embodiments 55 to 63, wherein for the at least one groove, the groove comprises a bottom surface extending between the front and back ends of the groove and comprising a raised bottom surface portion raised upwardly relative to an unraised bottom surface portion, the unraised bottom surface portion of the bottom surface disposed between the raised bottom surface portion of the bottom surface and the input side of the light redirecting member.

Embodiment 72 is a method of mounting an optical fiber to a light coupling element comprising a light redirecting member and a groove extending along a first direction from an entrance end of the groove to an opposite terminal end of the groove proximate an input side of the light redirecting member, the groove having a width along a second direction orthogonal to the first direction and a depth along a third direction orthogonal to the first and second directions, the groove comprising a bottom surface extending between the entrance and terminal ends of the groove and comprising a raised bottom surface portion raised upwardly relative to a landing portion, the landing portion of the bottom surface disposed between the raised bottom surface portion of the bottom surface and the input side of the light redirecting member, a landing region of the groove comprising the landing portion of the bottom surface and disposed between the raised bottom surface portion and the terminal end of the groove, the method comprising inserting the optical fiber into the groove such that a portion of the landing region of the groove is skived.

Embodiment 73 is the method of Embodiment 72, wherein inserting the optical fiber into the groove comprises:

inserting an end of the optical fiber into the groove such that the end makes contact with the landing portion;

lowering the optical fiber into the groove until the optical fiber rests on the raised portion of the bottom surface; and moving the optical fiber along the first direction until the end of the optical fiber contacts the stop region.

Embodiment 74 is the method of Embodiment 73, wherein lowering the optical fiber into the groove creates a gap between the end of the optical fiber and the landing portion.

Embodiment 75 is the method of Embodiment 73 or 74, wherein inserting the end of the optical fiber into the groove, comprises disposing the optical fiber such that an axis of the optical fiber proximate the end of the optical fiber makes an oblique angle with the first direction.

Embodiment 76 is the method of any one of Embodiments 73 to 75, wherein at least one of the inserting an end of the optical fiber step or lowering the optical fiber step comprises skiving a portion of the landing portion of the bottom surface.

Embodiment 77 is the method of any one of Embodiments 73 to 76, wherein the moving the optical fiber step comprises skiving a portion of at least one of opposing first and second sidewalls of the groove in the landing region.

Embodiment 78 is the method of any one of Embodiments 73 to 77, wherein the groove comprises a first pinched region and the landing region is disposed between the first pinched region and the terminal end of the groove, a minimum width of the groove in the first pinched region being less than a width of the groove in an adjacent portion of the landing region.

Embodiment 79 is the method of any one of Embodiments 73 to 78, wherein the groove is a first groove in a plurality of substantially parallel grooves extending along the first direction and arranged along the second direction, the light coupling element comprising the plurality of substantially parallel grooves.

Embodiment 80 is the method of Embodiment 79, wherein the optical fiber is a first optical fiber in a plurality of optical fibers, the method comprising mounting the plurality of optical fibers to the light coupling element.

Embodiment 81 is the method of Embodiment 80, further comprising positioning the plurality of optical fibers in an alignment comb.

Embodiment 82 is the method of Embodiment 81, comprising:

inserting an end of each optical fiber in the plurality of optical fibers into a corresponding groove in the plurality of grooves such that each end makes contact with a landing portion of the corresponding groove; lowering each optical fiber into the corresponding groove until the optical fiber rests on a raised portion of a bottom surface of the corresponding groove by lowering the alignment comb; and moving each optical fiber along the first direction until the end of the optical fiber contacts a stop region of the corresponding groove.

Embodiment 83 is the method of Embodiment 82, further comprising inspecting the plurality of optical fibers positioned in the plurality of grooves for interference fringes during at least one of the lowering and moving steps.

Embodiment 84 is the method of Embodiment 83, further comprising adjusting a position of the alignment comb to reduce any observed interference fringes.

If the use of "about" as applied to quantities expressing feature sizes, amounts, and physical properties is not otherwise clear to one of ordinary skill in the art in the context in which it is used and described in the present description, "about" can be understood to mean within 10 percent of the specified quantity, but also includes exactly the specified quantity. For example, if it is not otherwise clear to one of ordinary skill in the art in the context in which it is used and described in the present description, a quantity having a value of about 1, means that the quantity has a value between 0.9 and 1.1, but also includes a value of exactly 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical coupling assembly comprising:
   a unitary light coupling element being a single piece construction and comprising a groove, an input side and a light directing side; and
   an optical fiber waveguide comprising an optical cladding surrounding an optical core, the optical fiber disposed in the groove such that an end face of the optical fiber waveguide faces the input side, the input side configured to receive light from the end face, the light redirecting side configured to change a direction of light received from the input side, a first portion of the optical cladding resting on the a bottom surface of the groove, a second portion of the optical cladding comprising the end face of the optical fiber waveguide and defining a gap between the optical cladding and the bottom surface of the groove, wherein the bottom surface of the groove comprises a raised bottom surface portion and an unraised bottom surface portion, the unraised bottom surface portion disposed between a perimeter of the raised bottom surface portion and the input side, and wherein the gap is smaller near the end face of the optical fiber than near the perimeter of the raised bottom surface portion.

2. The optical coupling assembly of claim 1, wherein the gap is substantially uniform.

3. The optical coupling assembly of claim 1, wherein a diameter of the first portion of the optical cladding has a first diameter, and the second portion of the optical cladding has a second diameter, the second diameter greater than the first diameter.

* * * * *

UNITED STATES PATENT AND TRADEMARK OFFICE
CERTIFICATE OF CORRECTION

| | | |
|---|---|---|
| PATENT NO. | : 11,906,786 B2 | Page 1 of 1 |
| APPLICATION NO. | : 18/102855 | |
| DATED | : February 20, 2024 | |
| INVENTOR(S) | : Haase et al. | |

It is certified that error appears in the above-identified patent and that said Letters Patent is hereby corrected as shown below:

In the Claims

<u>Column 34</u>
Line 23 (approx.), In Claim 1, delete "the", before "a bottom surface of the".

Signed and Sealed this
Eleventh Day of June, 2024

Katherine Kelly Vidal
*Director of the United States Patent and Trademark Office*